US012533044B2

(12) United States Patent
Guan et al.

(10) Patent No.: US 12,533,044 B2
(45) Date of Patent: Jan. 27, 2026

(54) MAGNETIC RESONANCE IMAGING APPARATUS

(71) Applicant: SHANGHAI UNITED IMAGING HEALTHCARE CO., LTD., Shanghai (CN)

(72) Inventors: Xiaolei Guan, Shanghai (CN); Zimeng Liu, Shanghai (CN); Fangyan Hou, Shanghai (CN); Wei Shi, Shanghai (CN); Zhen Yang, Shanghai (CN); Qingchang Chen, Shanghai (CN); Chunyan Zhang, Shanghai (CN); Bin Lu, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 337 days.

(21) Appl. No.: 17/809,268

(22) Filed: Jun. 27, 2022

(65) Prior Publication Data

US 2022/0322958 A1 Oct. 13, 2022

Related U.S. Application Data

(63) Continuation of application No. PCT/CN2020/140383, filed on Dec. 28, 2020.

(30) Foreign Application Priority Data

Dec. 27, 2019 (CN) .......................... 201911377006.X
Dec. 30, 2019 (CN) .......................... 201911402032.3

(51) Int. Cl.
*A61B 5/055* (2006.01)
*A61B 5/00* (2006.01)
*G01R 33/36* (2006.01)

(52) U.S. Cl.
CPC .............. *A61B 5/055* (2013.01); *A61B 5/704* (2013.01); *G01R 33/3692* (2013.01); *A61B 2560/0214* (2013.01); *G01R 33/3664* (2013.01)

(58) Field of Classification Search
CPC .............. G01R 33/3692; G01R 33/283; G01R 33/3642; G01R 33/422; A61B 5/055
(Continued)

(56) References Cited

U.S. PATENT DOCUMENTS 9,983,281 B2 5/2018 Tomiha et al.
10,267,874 B2 4/2019 Tomiha
(Continued)

FOREIGN PATENT DOCUMENTS

CN 101278837 A 10/2008
CN 106026237 A 10/2016
(Continued)

OTHER PUBLICATIONS

The Partial Supplementary European Search Report in European Application No. 20905703.3 mailed on Dec. 15, 2022, 11 pages.
(Continued)

*Primary Examiner* — Boniface N Nganga
(74) *Attorney, Agent, or Firm* — METIS IP LLC

(57) ABSTRACT

A magnetic resonance (MR) apparatus is provided. The MR apparatus may include at least one processor. The at least one processor may be configured to obtain an operating state of the MR apparatus; and select, from two or more power supply devices, a power supply device for supplying power for at least one coil of the MR apparatus according to the operating state of the MR apparatus. The at least one processor may be configured to obtain, through a relay component connected to a coil section, motion information of at least one component of the coil section; and generate, based on the motion information, control instructions for
(Continued)

adjusting communication parameters of a first directional communication module of the coil section and a second directional communication module of the relay component.

13 Claims, 25 Drawing Sheets

(58) Field of Classification Search
USPC .......................................................... 324/318
See application file for complete search history.

(56) References Cited

U.S. PATENT DOCUMENTS

| | | |
|---|---|---|
| 2005/0228267 A1 | 10/2005 | Bulkes et al. |
| 2010/0090699 A1* | 4/2010 | Haans ................ G01R 33/3664 |
| | | 324/322 |
| 2010/0188208 A1 | 7/2010 | Fisher et al. |
| 2011/0012598 A1* | 1/2011 | van Helvoort ..... G01R 33/3692 |
| | | 324/318 |
| 2011/0084694 A1 | 4/2011 | Waffenschmidt et al. |
| 2013/0200842 A1 | 8/2013 | Takahashi |
| 2013/0200894 A1* | 8/2013 | Albsmeier ......... G01R 33/3692 |
| | | 324/318 |
| 2014/0097844 A1 | 4/2014 | Tomiha |
| 2015/0087966 A1 | 3/2015 | Anderson et al. |
| 2017/0311802 A1 | 11/2017 | Bollenbeck et al. |
| 2018/0360410 A1 | 12/2018 | Sun |
| 2019/0027965 A1 | 1/2019 | Huang et al. |
| 2020/0021138 A1 | 1/2020 | Yeo et al. |
| 2020/0241091 A1 | 7/2020 | Ji |

FOREIGN PATENT DOCUMENTS

| | | |
|---|---|---|
| CN | 106357094 A | 1/2017 |
| CN | 108186232 A | 6/2018 |
| CN | 209107354 U | 7/2019 |
| CN | 209311666 U | 8/2019 |
| CN | 111060859 A | 4/2020 |
| CN | 111134676 A | 5/2020 |
| WO | 2009081378 A1 | 7/2009 |
| WO | 2009150575 A1 | 12/2009 |
| WO | 2015108683 A1 | 7/2015 |
| WO | 2018044055 A1 | 3/2018 |
| WO | 2021129880 A1 | 7/2021 |

OTHER PUBLICATIONS

International Search Report in PCT/CN2020/140383 mailed on Mar. 25, 2021, 5 pages.
Written Opinion in PCT/CN2020/140383 mailed on Mar. 25, 2021, 6 pages.
Kelly Byron et al., An RF-Gated Wireless Power Transfer System for Wireless MRI Receive Arrays, Concepts in Magnetic Resonance Part B, 2018, 16 pages.
First Office Action in Chinese Application No. 201911377006.X mailed on Mar. 3, 2021, 11 pages.
First Office Action in Chinese Application No. 201911402032.3 mailed on Mar. 26, 2021, 21 pages.
The Second Office Action in Chinese Application No. 201911402032.3 mailed on Nov. 1, 2021, 25 pages.
Sun, Jinghua et al., DIY Magnetically Coupled Resonant Wireless Power Transmission Experiment, College Physics Experiment Course, 2019, 15 pages.

* cited by examiner

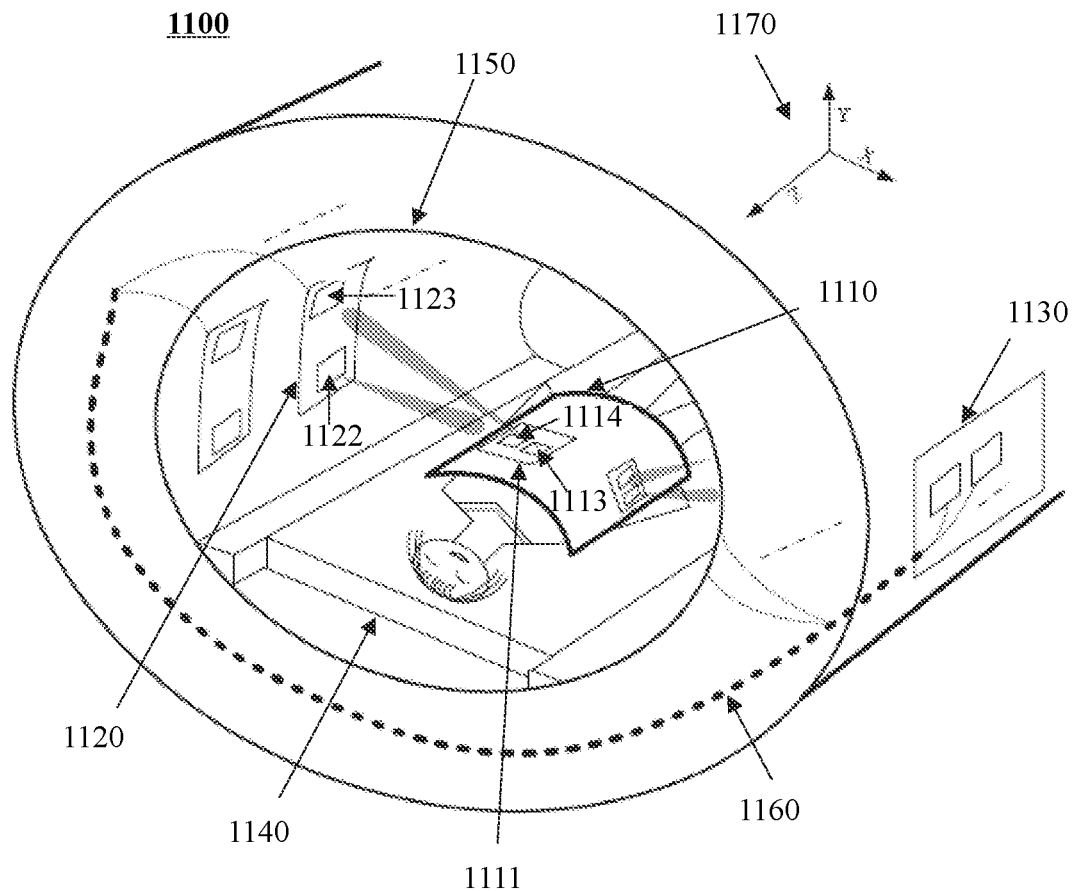
FIG. 11A
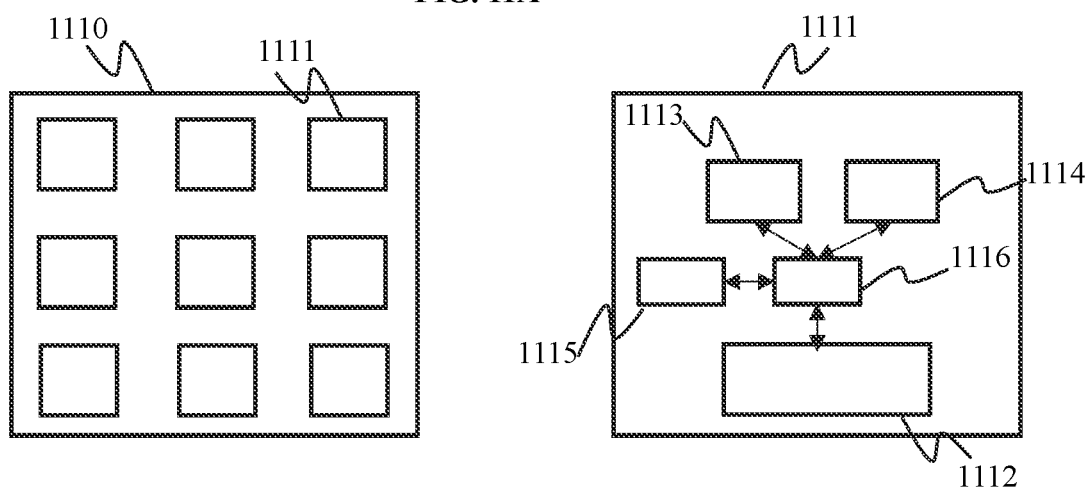
FIG. 11B  FIG. 11C

1200

1300

MAGNETIC RESONANCE IMAGING APPARATUS

CROSS-REFERENCE TO RELATED APPLICATIONS

This application is a Continuation of International Application No. PCT/CN2020/140383, filed on Dec. 28, 2020, which claims priority of Chinese Patent Application No. 201911377006.X filed on Dec. 27, 2019, and Chinese Patent Application No. 201911402032.3 filed on Dec. 30, 2019, the contents of each of which are hereby incorporated by reference.

TECHNICAL FIELD

The present disclosure generally relates to medical imaging apparatus, and more particularly to magnetic resonance (MR) apparatus configured with wireless local coils.

BACKGROUND

Magnetic resonance (MR) imaging is an imaging technology that has been widely used for noninvasive imaging of a patient body. Conventionally, data communication and/or power supply for coils (e.g., local coils) of MR apparatus are realized by wired connections. However, wired connections in a bore of the MR apparatus may interfere with electromagnetic fields generated by the MR apparatus during an imaging process of a subject, thus affecting the imaging quality of the MR apparatus. Therefore, it is desirable to develop an MR apparatus with better imaging quality.

SUMMARY

In a first aspect of the present disclosure, a method is provided. The method may be implemented on a computing device having a processor and a computer-readable storage device. The method may include obtaining an operating state of a magnetic resonance (MR) apparatus. The method may also include selecting, from two or more power supply devices, a power supply device for supplying power for at least one coil of the MR apparatus according to the operating state of the MR apparatus, wherein the two or more power supply devices include at least a battery, a wireless charging device, and a wired power source.

In some embodiments, the operating state may include a scanning state or a non-scanning state.

In some embodiments, the selecting, from two or more power supply devices, a power supply device for supplying power for the at least one coil of the MR apparatus according to the operating state of the MR apparatus may include determining the battery as the selected power supply device if the operating state of the MR apparatus is the scanning state; and generating an instruction for causing the battery to supply the power for the at least one coil of the MR apparatus.

In some embodiments, the selecting, from two or more power supply devices, a power supply device for supplying electric power for the at least one coil of the MR apparatus according to the operating state of the MR apparatus may include determining the wireless charging device as the selected power supply device if the operating state of the MR apparatus is the non-scanning state; and generating an instruction for causing the wireless charging device to supply power for the at least one coil of the MR apparatus.

In some embodiments, the instruction may further include causing the wireless charging device to charge the battery.

In some embodiments, the obtaining an operating state of an MR apparatus may include obtaining scanning information of the MR apparatus; and determining the operating state of the MR apparatus based on the scanning information.

In some embodiments, the scanning information may include scanning location information and scanning sequence information.

In some embodiments, the wireless charging device may include a plurality of power transmitting modules. The method may further include determining a scanning location of the MR apparatus; determining a coil of the MR apparatus corresponding to the scanning location based on the scanning location information; determining a power receiving module of the MR apparatus operably connected to the coil; and identifying, from the plurality of power transmitting modules, a power transmitting module of the wireless charging device for transmitting power to the power receiving module operably connected to the coil.

In some embodiments, the identifying, from the plurality of power transmitting modules, a power transmitting module of the wireless charging device for transmitting power to the power receiving module operably connected to the coil may include obtaining a location of the power receiving module operably connected to the coil; determining a distance between the location of the power receiving module and a location of each of the plurality of power transmitting modules of the wireless charging device; and identifying, from the plurality of power transmitting modules, the power transmitting module for transmitting the power to the power receiving module operably connected to the coil, the identified power transmitting module corresponding to a smallest distance among the plurality of power transmitting modules.

In a second aspect of the present disclosure, a magnetic resonance (MR) apparatus is provided. The MR apparatus may include at least one coil configured to receive MR signals from a subject and two or more power supply devices. The two or more power supply devices may include at least a battery, a wireless charging device, and a wired power source. At least one processor may be configured to obtain an operating state of the MR apparatus; and select, from the two or more power supply devices, a power supply device for supplying power for the at least one coil of the MR apparatus according to the operating state of the MR apparatus.

In some embodiments, the wireless charging device may include a plurality of power transmitting modules. The at least one processor may be configured to determine a scanning location of the MR apparatus; determine a coil of the MR apparatus corresponding to the scanning location based on the scanning location information; determine a power receiving module of the MR apparatus operably connected to the coil; and identify, from the plurality of power transmitting modules, a power transmitting module of the wireless charging device for transmitting power to the power receiving module operably connected to the coil.

In a third aspect of the present disclosure, a magnetic resonance (MR) system is provided. The system may include at least one storage device including a set of instructions; and at least one processor configured to communicate with the at least one storage device. When executing the set of instructions, the at least one processor may be configured to direct the system to perform operations. The operations may include obtaining an operating state of the MR apparatus. The operations may further include selecting, from the two or more power supply devices, a power supply device for supplying power for the at least one coil of the MR apparatus according to the operating state of the MR apparatus.

In a fourth aspect of the present disclosure, a non-transitory computer readable medium is provided. The non-transitory computer readable medium may include executable instructions. When executed by at least one processor, the at least one set of instructions may direct the at least one processor to perform a method. The method may include obtaining an operating state of the MR apparatus; and selecting, from the two or more power supply devices, a power supply device for supplying power for the at least one coil of the MR apparatus according to the operating state of the MR apparatus.

In a fifth aspect of the present disclosure, a magnetic resonance (MR) apparatus is provided. The MR apparatus may include at least one coil, a table, a supporting platform, one or more photoelectric converters, and one or more wireless power transfer (WPT) transmitting devices. The at least one coil may be configured to receive MR signals from a subject positioned in a bore of the MR apparatus and generate electric signals associated with the subject. The table may support the subject. The supporting platform may be arranged outside the bore of the MR apparatus, and the table may be movably mounted on the supporting platform. The one or more photoelectric converters may be configured to convert the electric signals into optical signals for transmission to a terminal device. The photoelectric converter may be set on or inside the table. The one or more WPT transmitting devices may be set on or inside the supporting platform, wherein at least one of the one or more WPT transmitting devices may supply power for at least one of the one or more photoelectric converters when the table moves to a target position.

In some embodiments, the at least one coil may include a local coil. The MR apparatus may further include a transceiving module operably coupled to the local coil, and configured to receive and process the electric signals associated with the subject. The transceiving module may be operably connected to one of the one or more photoelectric converters that are configured to receive the processed electric signals from the transceiving module and convert the processed electric signals into the optical signals for transmission to the terminal device.

In some embodiments, the local coil may include a fixed local coil. The fixed local coil may be set in a middle portion of the table along a width direction of the table. The one or more photoelectric converters may be set in one or more end portions of the table along the width direction of the table.

In some embodiments, the transceiving module may be integrated with the fixed local coil.

In some embodiments, the table may include one or more slots. Each of the one or more photoelectric converters may be disposed in one of the one or more slots. The transceiving module may be operably connected to a photoelectric converter when the transceiving module is set in a slot where the photoelectric converter is disposed.

In some embodiments, each of the one or more photoelectric converters may include an optical module, a first power source module, and a WPT receiving module. The optical module may be configured to convert electric signals into optical signals. The first power source module may be configured to supply power for the optical module. The WPT receiving module may be configured to charge the first power source module.

In some embodiments, the WPT receiving module may include a charging circuit and a WPT receiving coil. The WPT receiving coil may be configured to receive power from one of the one or more WPT transmitting devices when the table moves to the target position.

In some embodiments, each of the one or more photoelectric converters may further include a first switch and a first housing. The first switch may be configured between the optical module and the first power source module of the photoelectric converter. The first housing may form a first space accommodating the optical module, the first power source module, and the WPT receiving module. The first space may include a first opening for accommodating the first switch. The first switch may include a first switch control component configured to switch between a connection state and a disconnection state. Under the connection state of the first switch control component, the optical module may be operably connected to the first power source module. Under the disconnection state of the first switch control component, the optical module may be disconnected from the first power source module.

In some embodiments, the transceiving module may include an RF receiving module, a second power source module, a second switch, and a second housing. The RF receiving module may be electrically connected to the local coil. The second power source module may be configured to supply power for the RF receiving module. The second switch may be configured between the RF receiving module and the second power source module of the transceiving module. The second housing may form a second space accommodating the RF receiving module and the second power source module. The second space may include a second opening for accommodating the second switch. The second switch may include a second switch control component configured to switch between a connection state and a disconnection state. Under the connection state of the second switch control component, the RF receiving module may be operably connected to the second power source module. Under the disconnection state of the second switch control component, the RF receiving module may be disconnected from the second power source module.

In some embodiments, the first switch control component and the second switch control component may be elastic components.

In some embodiments, when the transceiving module is set in a slot where a photoelectric converter is disposed, the first switch and the second switch may press against each other. The first switch control component and the second switch control component may undergo a first elastic deformation and a second elastic deformation, respectively. The first switch control component may be set to the connection state by the first elastic deformation. The second switch control component may be set to the connection state by the second elastic deformation.

In some embodiments, the MR apparatus may further include a relay component operably connected to the one or more photoelectric converters. The relay component may be configured to convert the optical signals from at least one of the one or more photoelectric converters into original data.

In some embodiments, the terminal device may be configured to generate an MR image of the subject based on the original data.

In some embodiments, the MR apparatus may further include a driving device configured to drive the table to move to the target position.

In a sixth aspect of the present disclosure, a magnetic resonance (MR) apparatus is provided. The MR apparatus may include a local coil, a plurality of relay components, and a terminal device. The local coil may include one or more coil sections. Each of the one or more coil sections may include a coil element, a first directional communication module, and one or more sensors. The coil element may include at least one coil unit. The coil element may be configured to receive an MR signal from a subject. The first directional communication module may be configured to transmit or receive electromagnetic waves in a first direction. The one or more sensors may be configured to detect motion information of at least one component of the coil section. The plurality of relay components may be set on an inner surface of a bore of the MR apparatus. Each of the plurality of relay components may include a second directional communication module. The second directional communication module may be configured to transmit or receive electromagnetic waves in a second direction, wherein each of the one or more coil sections may be wirelessly connected to one of the plurality of relay components through a first directional communication module of the coil section and a second directional communication module of the one of the plurality of relay components. The terminal device may be connected to the plurality of relay components. The terminal device may include at least one processor. The at least one processor may be configured to, for each of the one or more coil sections, obtain, through a relay component connected to the coil section, motion information of at least one component of the coil section; and generate, based on the motion information, control instructions for adjusting communication parameters of a first directional communication module of the coil section and a second directional communication module of the relay component, so that the first direction of the first directional communication module of the coil section is consistent with the second direction of the second directional communication module of relay component.

In some embodiments, the coil element of each of the one or more coil sections may be configured to acquire MR signals from the subject. Each of the one or more coil sections may further include at least one transceiving module. At least one of the coil element or the one or more sensors of the coil section may connect to the first directional communication module of the coil section through the at least one transceiving module. The at least one first transceiving module may be configured to receive at least one of the MR signals from the coil element of the coil section or the motion information from the one or more sensors of the coil section, and transmit the at least one of the MR signals or the motion information to a relay component connected to the coil section.

In some embodiments, the at least one processor of the terminal device may be further configured to obtain the MR signals from one or more relay components connected to the one or more coil sections; and reconstruct an MR image of the subject based on the obtained MR signals.

In some embodiments, the at least one first transceiving module may include at least one of an analog-to-digital (AD) converter, a digital signal processor (DSP), a data modulator, or a synchronization unit. The AD converter may be configured to convert the MR signals into digital signals. The DSP may be configured to process the digital signals. The data modulator may be configured to modulate the processed digital signals of a first frequency into modulated signals of a second frequency. The synchronization unit may be configured to synchronize phases of the MR signals.

In some embodiments, the first directional communication module may include one or more first phased array antennae, and the second directional communication module may include one or more second phased array antennae.

In some embodiments, the one or more sensors may include at least one of an acceleration sensor or a gyroscope.

In some embodiments, each of the one or more coil sections may be wirelessly connected to one of the plurality of relay components via millimeter waves.

In some embodiments, a count of the plurality of relay components may be greater than a count of the one or more coil sections.

In some embodiments, each of the one or more coil sections may further include a power detector, a comparator, and a power supply control unit. The power detector may be configured to detect a power level of a first directional communication module of the coil section. The comparator may be configured to determine whether the power level of the first directional communication module exceeds a threshold. The power supply control unit may be configured to activate a first group of components of the coil section in response to determining that the power level of the first directional communication module exceeds a threshold; and activate a second group of components of the coil section in response to determining that the power value of the first directional communication module is below the threshold.

In some embodiments, before the local coil receives the MR signals from the subject, the at least one processor may be further configured to generate an initiation control instruction, and transmit the initiation control instruction to each of the plurality of relay components. The initiation control instruction may include directing a second directional communication module of each of the plurality of relay components to transmit electromagnetic waves in the second direction at a maximum power level to activate at least one of the one or more coil sections; and determining, according to a beam scanning algorithm, communication parameters of second directional communication modules of at least a portion of the plurality of relay components and first directional communication modules of the activated coil sections.

In some embodiments, the communication parameters may include one or more phase parameters and a gain factor.

In some embodiments, to generate, based on the motion information, control instructions for adjusting communication parameters of the first directional communication module of the coil section and the second directional communication module of the relay component, the at least one processor may be configured to obtain phase parameters of a second directional communication module of the relay component. The second directional communication module of the relay component may transmit electromagnetic waves to the first directional communication module of the coil section. The at least one processor may be configured to obtain the motion information of the at least one component of the coil section. The at least one processor may be also configured to determine a motion trend of the at least one component of the coil section based on the motion information. The at least one processor may be further configured to adjust phase parameters of the first directional communication module of the coil section and the second directional communication module of the relay component based on the motion trend of the at least one component of the coil section and phase parameters of the second directional communication module of the relay component.

In some embodiments, the at least one processor may be further configured to obtain a first energy amplitude of the electromagnetic waves transmitted from the second directional communication module of the relay component to the first directional communication module of the coil section; and determine a first gain factor of the first energy amplitude based on one or more amplitude adjustment parameters.

In some embodiments, the one or more amplitude adjustment parameters may include an upper threshold and a lower threshold. The determining a first gain factor of the first energy amplitude based on one or more amplitude adjustment parameters may include determining the first gain factor of the first energy amplitude so that a product of the first gain factor and the first energy amplitude is between the upper threshold and the lower threshold.

In some embodiments, the at least one processor may be further configured to obtain a second energy amplitude of electromagnetic waves transmitted from the first directional communication module of the coil section to the second directional communication module of the relay component; and determine a second gain factor of the second energy amplitude based on one or more amplitude adjustment parameters.

In some embodiments, the one or more amplitude adjustment parameters may include an upper threshold and a lower threshold. The determining a second gain factor of the second energy amplitude based on one or more amplitude adjustment parameters may include determining the second gain factor of the second energy amplitude so that a product of the second gain factor and the second energy amplitude is between the upper threshold and the lower threshold.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 11A is a schematic diagram illustrating an exemplary MR apparatus according to some embodiments of the present disclosure;

FIG. 11B is a schematic diagram of a local coil of an MR apparatus according to some embodiments of the present disclosure;

FIG. 11C is a schematic diagram of a coil section of a local coil according to some embodiments of the present disclosure;

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "engine," "unit," "module," and/or "block" used herein are one method to distinguish different components, elements, parts, sections, or assembly of different levels in ascending order. However, the terms may be displaced by other expression if they achieve the same purpose.

Figure 3:
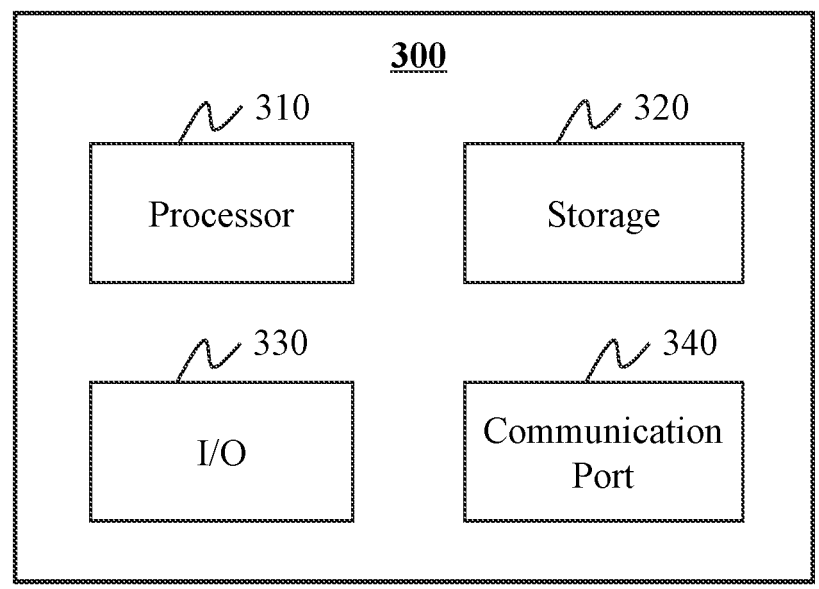
FIG. 3 is a schematic diagram illustrating exemplary hardware and/or software components of a computing device according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or other storage devices. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 310 as illustrated in FIG. 3) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in a firmware, such as an EPROM. It will be further appreciated that hardware modules/units/blocks may be included in operably connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module, or block is referred to as being "on," "connected to," or "coupled to," another unit, engine, module, or block, it may be directly on, operably connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

The flowcharts used in the present disclosure illustrate operations that systems implement according to some embodiments of the present disclosure. It is to be expressly understood the operations of the flowcharts may be implemented not in order. Conversely, the operations may be implemented in an inverted order, or simultaneously. Moreover, one or more other operations may be added to the flowcharts. One or more operations may be removed from the flowcharts.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

Provided herein are systems and methods for non-invasive imaging, such as for disease diagnosis, treatment, and/or research purposes. In some embodiments, the imaging system may include a single modality system and/or a multi-modality system. The term "modality" used herein broadly refers to an imaging or treatment method or technology that gathers, generates, processes, and/or analyzes imaging information of a subject or treatments the subject. The single modality system may include an ultrasound (US) imaging system. The multi-modality system may include an X-ray imaging-ultrasound imaging (X-ray-US) system, a positron emission tomography-ultrasound imaging (PET-US) system, a single-photon emission computed tomography-ultrasound imaging (SPECT-US) system, a computed tomography-ultrasound imaging (CT-US) system, a magnetic resonance-ultrasound imaging (MR-US) system, or the like, or any combination thereof.

In the present disclosure, the term "image" refers to a two-dimensional (2D) image, a three-dimensional (3D) image, or a four-dimensional (4D) image. In some embodiments, the term "image" refers to an image of a region (e.g., a region of interest (ROI)) of a subject. As described above, the image may be a CT image, a PET image, an MR image, a fluoroscopy image, an ultrasound image, an Electronic Portal Imaging Device (EPID) image, etc.

As used herein, a representation of a subject (e.g., a patient, or a portion thereof) in an image may be referred to as the subject for brevity. For instance, a representation of an organ or tissue (e.g., the heart, the liver, a lung, etc., of a patient) in an image may be referred to as the organ or tissue for brevity. An image including a representation of a subject may be referred to as an image of the subject or an image including the subject for brevity. As used herein, an operation on a representation of a subject in an image may be referred to as an operation on the subject for brevity. For instance, a segmentation of a portion of an image including a representation of an organ or tissue (e.g., the heart, the liver, a lung, etc., of a patient) from the image may be referred to as a segmentation of the organ or tissue for brevity.

An aspect of the present disclosure relates to an MR apparatus. The MR apparatus may include a local coil, a plurality of relay components, and a terminal device. The local coil may include one or more coil sections. For each of the one or more coil sections, a processor of the terminal device may obtain, through a relay component operably connected to the coil section, motion information of at least one component of the coil section. The motion information of at least one component of the coil section may relate to motions of a subject to be imaged. During the imaging process, the processor may generate, based on the motion information, control instructions for adjusting communication parameters of a first directional wireless communication module of the coil section and a second directional wireless communication module of a corresponding relay component in (substantially) real time. The first direction of the first directional communication module of the coil section may be consistent with the second direction of the second directional communication module of relay component. In this case, a stable and effective point-to-point wireless communication between the first directional communication module of the coil section and the second direction of the second directional communication module of relay component may be established.

As used herein, "operably connected" or 'operably coupled" indicates that two or more components (e.g., devices, units, modules, etc.) are connected or coupled in any suitable manner for operation and/or communication, including wired, wirelessly, or some combination thereof. As used herein, "operably connected" or "operably coupled" may be referred to as connected or coupled for brevity.

As used herein, "substantially" indicates that a deviation from a reference is below a threshold. For instance, "substantially in real time" indicates that the delay between event A and event B (e.g., a reference event) is shorter than a threshold (e.g., 1 second, 2 seconds, 0.5 seconds, etc.)

Figure 1:
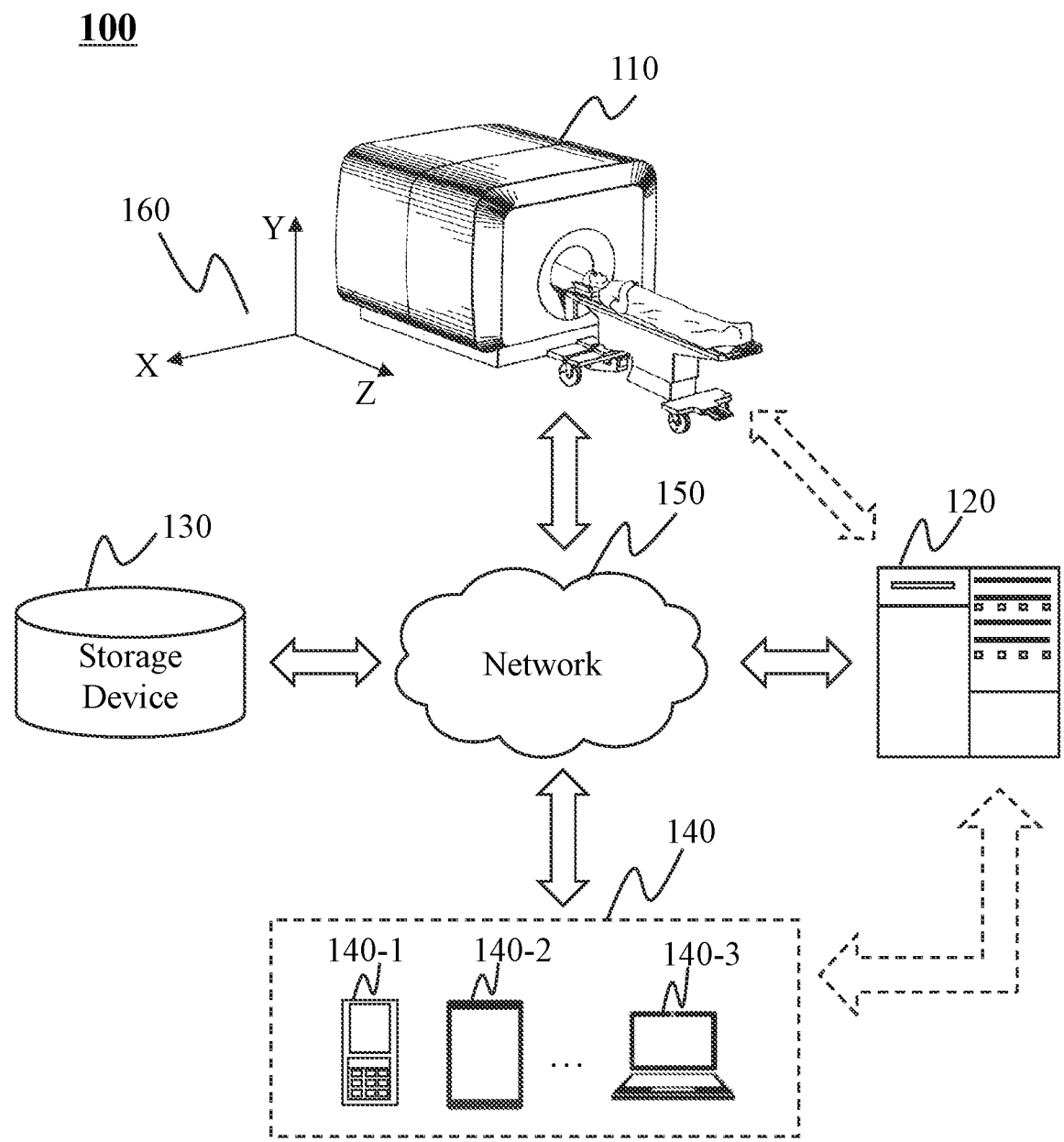
FIG. 1 is a schematic diagram illustrating an exemplary imaging system according to some embodiments of the present disclosure.

FIG. 1 is a schematic diagram illustrating an exemplary imaging system 100 according to some embodiments of the present disclosure. As shown in FIG. 1, the imaging system 100 may include a scanner 110, a processing device 120, a storage device 130, one or more terminals 140, and a network 150. In some embodiments, the scanner 110, the processing device 120, the storage device 130, and/or the terminal(s) 140 may be connected to and/or communicate with each other via a wireless connection, a wired connection, or a combination thereof. The connections between the components in the imaging system 100 may be variable. For example, the scanner 110 may be connected to the processing device 120 through the network 150. As another example, the scanner 110 may be connected to the processing device 120 directly.

The scanner 110 may be configured to scan a subject to acquire image data, such as echo signals (or MR signals) associated with the subject. For example, the scanner 110 may scan the subject by executing a plurality of protocols. In some embodiments, the scanner 110 may include, for example, a main magnet, a gradient coil (or also referred to a spatial encoding coil), a radio frequency (RF) coil, etc., as described in connection with FIG. 2. In some embodiments, the scanner 110 may be a permanent magnet MR scanner, a superconducting electromagnet MR scanner, or a resistive electromagnet MR scanner, etc., according to types of the main magnet. In some embodiments, the scanner 110 may be a high-field MR scanner, a mid-field MR scanner, and a low-field MR scanner, etc., according to the intensity of the magnetic field.

The subject scanned by the scanner 110 may be biological or non-biological. For example, the subject may include a patient, a man-made object, etc. As another example, the subject may include a specific portion, organ, tissue, and/or a physical point of the patient. Merely by way of example, the subject may include the head, the brain, the neck, the body, shoulders, arms, the thorax, the cardiac, the stomach, blood vessels, soft tissue, knees, feet, or the like, or a combination thereof.

For illustration purposes, a coordinate system 160 including an X axis, a Y axis, and a Z axis is provided in FIG. 1. The X axis and the Z axis shown in FIG. 1 may be horizontal, and the Y-axis may be vertical. As illustrated, the positive X direction along the X axis may be from the right side to the left side of the scanner 110 seen from the direction facing the front of the scanner 110; the positive Y direction along the Y axis shown in FIG. 1 may be from the lower part to the upper part of the scanner 110; the positive Z direction along the Z axis shown in FIG. 1 refers to a direction in which the subject is moved out of the scanning channel (or referred to as the bore) of the scanner 110.

In some embodiments, the scanner 110 may be directed to select an anatomical slice of the subject along a slice selection direction and scan the anatomical slice to acquire a plurality of echo signals from the slice. During the scan, spatial encoding within the slice may be implemented by spatial encoding coils (e.g., an X coil and a Y coil) along a phase encoding direction and a frequency encoding direction. The echo signals may be sampled and the corresponding sampled data may be stored into a K-space matrix for image reconstruction. For illustration purposes, the slice-selection direction herein may correspond to the Z direction defined by the coordinate system 160 and a Kz direction in K-space; the phase-encoding direction may correspond to the Y direction defined by the coordinate system 160 and a Ky direction in K-space; and the frequency-encoding direction may correspond to the X direction defined by the coordinate system 160 and a Kx direction in K-space. It should be noted that the slice-selection direction, the phase-encoding direction, and the frequency-encoding direction may be modified according to actual needs, and the modification may do not depart the scope of the present disclosure. More description of the scanner 110 may be found elsewhere in the present disclosure. See, e.g., FIG. 2 and the description thereof.

The processing device 120 may process data and/or information obtained from the scanner 110, the storage device 130, and/or the terminal(s) 140. For example, the processing device 120 may obtain a plurality of protocols for the imaging of the subject, and determine one or more imaging parameters of the scanner 110 based on the plurality of protocols. As another example, the processing device 120 may obtain echo signals from the scanner 110, and reconstruct one or more images of the subject based on the echo signals. In some embodiments, the processing device 120 may be a single server or a server group. The server group may be centralized or distributed. In some embodiments, the processing device 120 may be local or remote. For example, the processing device 120 may access information and/or data from the scanner 110, the storage device 130, and/or the terminal(s) 140 via the network 150. As another example, the processing device 120 may be directly connected to the scanner 110, the terminal(s) 140, and/or the storage device 130 to access information and/or data. In some embodiments, the processing device 120 may be implemented on a cloud platform. For example, the cloud platform may include a private cloud, a public cloud, a hybrid cloud, a community cloud, a distributed cloud, an inter-cloud, a multi-cloud, or the like, or a combination thereof. In some embodiments, the processing device 120 may be implemented by a computing device 300 having one or more components as described in connection with FIG. 3.

The storage device 130 may store data, instructions, and/or any other information. In some embodiments, the storage device 130 may store data obtained from the scanner 110, the processing device 120, the terminal(s) 140, etc. In some embodiments, the storage device 130 may store data and/or instructions that the processing device 120 may execute or use to perform exemplary methods described in the present disclosure. In some embodiments, the storage device 130 may include a mass storage device, a removable storage device, a volatile read-and-write memory, a read-only memory (ROM), or the like, or a combination thereof. Exemplary mass storage devices may include a magnetic disk, an optical disk, a solid-state drive, etc. Exemplary removable storage devices may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), a digital versatile disk ROM, etc. In some embodiments, the storage device 130 may be implemented on a cloud platform as described elsewhere in the disclosure.

In some embodiments, the storage device 130 may be connected to the network 150 to communicate with one or more other components in the imaging system 100 (e.g., the scanner 110, the processing device 120, and/or the terminal(s) 140). One or more components of the imaging system 100 may access the data or instructions stored in the storage device 130 via the network 150. In some embodiments, the storage device 130 may be part of the processing device 120 or the terminal(s) 140.

The terminal(s) 140 may be configured to enable a user interaction between a user and the imaging system 100. For example, the terminal(s) 140 may receive an instruction to cause the scanner 110 to scan the subject from the user. As another example, the terminal(s) 140 may receive a processing result (e.g., one or more images of the subject) from the processing device 120 and display the processing result to the user. In some embodiments, the terminal(s) 140 may be connected to and/or communicate with the scanner 110, the processing device 120, and/or the storage device 130. In some embodiments, the terminal(s) 140 may include a mobile device 140-1, a tablet computer 140-2, a laptop computer 140-3, or the like, or a combination thereof. For example, the mobile device 140-1 may include a mobile phone, a personal digital assistant (PDA), a laptop, a tablet computer, a desktop, or the like, or a combination thereof. In some embodiments, the terminal(s) 140 may include an input device, an output device, etc. The input device may include alphanumeric and other keys that may be input via a keyboard, a touch screen (for example, with haptics or tactile feedback), a speech input, an eye tracking input, a brain monitoring system, or any other comparable input mechanism. The input information received through the input device may be transmitted to the processing device 120 via, for example, a bus, for further processing. Other types of the input device may include a cursor control device, such as a mouse, a trackball, or cursor direction keys, etc. The output device may include a display, a speaker, a printer, or the like, or a combination thereof. In some embodiments, the terminal(s) 140 may be part of the processing device 120 or the scanner 110.

The network 150 may include any suitable network that can facilitate the exchange of information and/or data for the imaging system 100. In some embodiments, one or more components of the imaging system 100 (e.g., the scanner 110, the processing device 120, the storage device 130, the terminal(s) 140, etc.) may communicate information and/or data with one or more other components of the imaging system 100 via the network 150. For example, the processing device 120 may obtain a plurality of protocols from the storage device 130 via the network 150. As another example, the processing device 120 may obtain user instructions from the terminal(s) 140 via the network 150. The network 150 may include a public network (e.g., the Internet), a private network (e.g., a local area network (LAN), a wide area network (WAN)), etc.), a wired network (e.g., an Ethernet network), a wireless network (e.g., an 802.11 network, a Wi-Fi network, etc.), a cellular network (e.g., a Long Term Evolution (LTE) network), a frame relay network, a virtual private network ("VPN"), a satellite network, a telephone network, routers, hubs, switches, server computers, or the like, or a combination thereof. For example, the network 150 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or a combination thereof. In some embodiments, the network 150 may include one or more network access points. For example, the network 150 may include wired and/or wireless network access points such as base stations and/or internet exchange points through which one or more components of the imaging system 100 may be connected to the network 150 to exchange data and/or information.

This description is intended to be illustrative, and not to limit the scope of the present disclosure. Many alternatives, modifications, and variations will be apparent to those skilled in the art. The features, structures, methods, and characteristics of the exemplary embodiments described herein may be combined in various ways to obtain additional and/or alternative exemplary embodiments. In some embodiments, the imaging system 100 may include one or more additional components and/or one or more components described above may be omitted. Additionally or alternatively, two or more components of the imaging system 100 may be integrated into a single component. For example, the processing device 120 may be integrated into the scanner 110. As another example, a component of the imaging system 100 may be replaced by another component that can implement the functions of the component. In some embodiments, the storage device 130 may be a data storage including cloud computing platforms, such as a public cloud, a private cloud, a community and hybrid cloud, etc. However, those variations and modifications do not depart the scope of the present disclosure.

Figure 2:
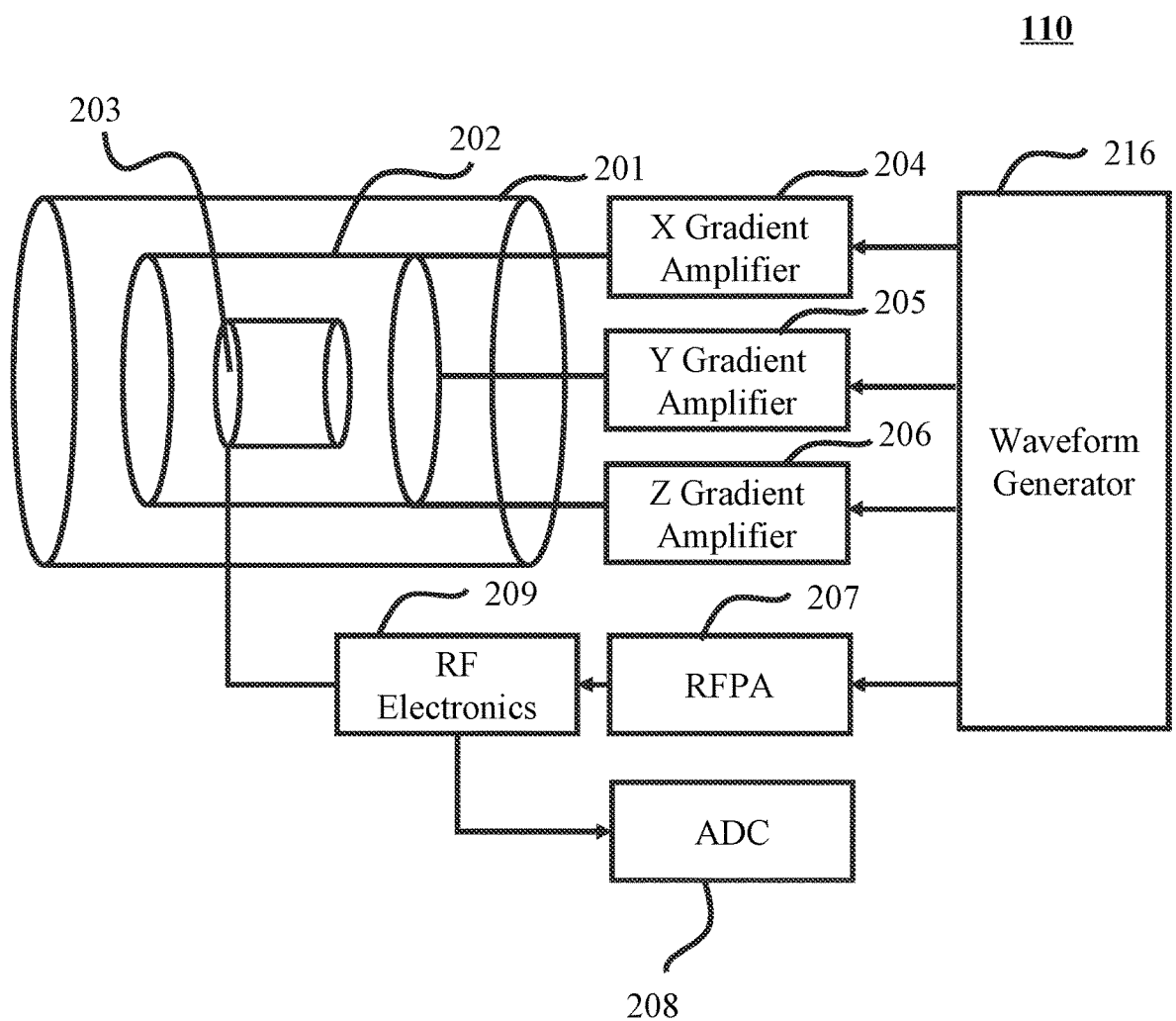
FIG. 2 is a schematic diagram illustrating an exemplary MR scanner according to some embodiments of the present disclosure.

FIG. 2 is a schematic diagram illustrating an exemplary scanner 110 according to some embodiments of the present disclosure. One or more components of the scanner 110 are illustrated in FIG. 2. As illustrated, a main magnet 201 may generate a first magnetic field (or referred to as a main magnetic field) that may be applied to a subject (also referred to as an object) exposed inside the field. The main magnet 201 may include a resistive magnet or a superconductive magnet that both need a power supply (not shown) for operation. Alternatively, the main magnet 201 may include a permanent magnet. The main magnet 201 may include a bore within which the subject is placed. The main magnet 201 may also control the homogeneity of the generated main magnetic field. Some shim coils may be in the main magnet 201. The shim coils placed in the gap of the main magnet 201 may compensate for the inhomogeneity of the magnetic field of the main magnet 201. The shim coils may be energized by a shim power supply.

Gradient coils 202 may be located inside the main magnet 201. The gradient coils 202 may generate a second magnetic field (or referred to as a gradient field, including gradient fields Gx, Gy, and Gz). The second magnetic field may be superimposed on the main field generated by the main magnet 201 and distort the main field so that the magnetic orientations of the protons of a subject may vary as a function of their positions inside the gradient field, thereby encoding spatial information into echo signals generated by the region of the subject being imaged. The gradient coils 202 may include X coils (e.g., configured to generate the gradient field Gx corresponding to the X direction), Y coils (e.g., configured to generate the gradient field Gy corresponding to the Y direction), and/or Z coils (e.g., configured to generate the gradient field Gz corresponding to the Z direction) (not shown in FIG. 2). In some embodiments, the Z coils may be designed based on circular (Maxwell) coils, while the X coils and the Y coils may be designed on the basis of the saddle (Golay) coil configuration. The three sets of coils may generate three different magnetic fields that are used for position encoding. The gradient coils 202 may allow spatial encoding of echo signals for image construction. The gradient coils 202 may be connected with one or more of an X gradient amplifier 204, a Y gradient amplifier 205, or a Z gradient amplifier 206. One or more of the three amplifiers may be connected to a waveform generator 216. The waveform generator 216 may generate gradient waveforms that are applied to the X gradient amplifier 204, the Y gradient amplifier 205, and/or the Z gradient amplifier 206. An amplifier may amplify a waveform. An amplified waveform may be applied to one of the coils in the gradient coils 202 to generate a magnetic field in the X-axis, the Y-axis, or the Z-axis, respectively. The gradient coils 202 may be designed for either a close-bore MR scanner or an open-bore MR scanner. In some instances, all three sets of coils of the gradient coils 202 may be energized and three gradient fields may be generated thereby. In some embodiments of the present disclosure, the X coils and Y coils may be energized to generate the gradient fields in the X direction and the Y direction. As used herein, the X-axis, the Y-axis, the Z-axis, the X direction, the Y direction, and the Z direction in the description of FIG. 2 are the same as or similar to those described in FIG. 1.

In some embodiments, radio frequency (RF) coils 203 may be located inside the main magnet 201 and serve as transmitters, receivers, or both. The RF coils 203 may be in connection with RF electronics 209 that may be configured or used as one or more integrated circuits (ICs) functioning as a waveform transmitter and/or a waveform receiver. The RF electronics 209 may be connected to a radiofrequency power amplifier (RFPA) 207 and an analog-to-digital converter (ADC) 208.

When used as transmitters, the RF coils 203 may generate RF signals that provide a third magnetic field that is utilized to generate echo signals related to the region of the subject being imaged. The third magnetic field may be perpendicular to the main magnetic field. The waveform generator 216 may generate an RF pulse. The RF pulse may be amplified by the RFPA 207, processed by the RF electronics 209, and applied to the RF coils 203 to generate the RF signals in response to a powerful current generated by the RF electronics 209 based on the amplified RF pulse.

When used as receivers, the RF coils may be responsible for detecting echo signals. After excitation, the echo signals generated by the subject may be sensed by the RF coils 203. The receive amplifier then may receive the sensed echo signals from the RF coils 203, amplify the sensed echo signals, and provide the amplified echo signals to the ADC 208. The ADC 208 may transform the echo signals from analog signals to digital signals. The digital echo signals then may be sent to the processing device 120 for sampling.

In some embodiments, the gradient coils 202 and the RF coils 203 may be circumferentially positioned with respect to the subject. It is understood by those skilled in the art that the main magnet 201, the gradient coils 202, and the RF coils 203 may be situated in a variety of configurations around the subject.

In some embodiments, the RFPA 207 may amplify an RF pulse (e.g., the power of the RF pulse, the voltage of the RF pulse) such that an amplified RF pulse is generated to drive the RF coils 203. The RFPA 207 may include a transistor-based RFPA, a vacuum tube-based RFPA, or the like, or any combination thereof. The transistor-based RFPA may include one or more transistors. The vacuum tube-based RFPA may include a triode, a tetrode, a klystron, or the like, or any combination thereof. In some embodiments, the RFPA 207 may include a linear RFPA, or a nonlinear RFPA. In some embodiments, the RFPA 207 may include one or more RFPAs.

In some embodiments, the scanner 110 may further include a subject positioning system (not shown). The subject positioning system may include a subject cradle and a transport device. The subject may be placed on the subject cradle and be positioned by the transport device within the bore of the main magnet 201.

MRI systems (e.g., the imaging system 100 disclosed in the present disclosure) may be commonly used to obtain an interior image from a patient for a particular region of interest (ROI) that can be used for the purposes of, e.g., diagnosis, treatment, or the like, or a combination thereof. MRI systems include a main magnet (e.g., the main magnet 201) assembly for providing a strong uniform main magnetic field to align the individual magnetic moments of the H atoms within the patient's body. During this process, the H atoms oscillate around their magnetic poles at their characteristic Larmor frequency. If the tissue is subjected to an additional magnetic field, which is tuned to the Larmor frequency, the H atoms absorb additional energy, which rotates the net aligned moment of the H atoms. The additional magnetic field may be provided by an RF excitation signal (e.g., the RF signal generated by the RF coils 203). When the additional magnetic field is removed, the magnetic moments of the H atoms rotate back into alignment with the main magnetic field thereby emitting an echo signal. The echo signal is received and processed to form an MR image. T1 relaxation may be the process by which the net magnetization grows/returns to its initial maximum value parallel to the main magnetic field. T1 may be the time constant for regrowth of longitudinal magnetization (e.g., along the main magnetic field). T2 relaxation may be the process by which the transverse components of magnetization decay or dephase. T2 may be the time constant for decay/dephasing of transverse magnetization.

If the main magnetic field is uniform across the entire body of the patient, then the RF excitation signal may excite all of the H atoms in the sample non-selectively. Accordingly, in order to image a particular portion of the patient's body, magnetic field gradients Gx, Gy, and Gz (e.g., generated by the gradient coils 202) in the x, y, and z directions, having a particular timing, frequency, and phase may be superimposed on the uniform magnetic field such that the RF excitation signal excites the H atoms in a desired slice of the patient's body, and unique phase and frequency information are encoded in the echo signal depending on the location of the H atoms in the "image slice."

Typically, one or more portions of the patient's body to be imaged are scanned by a sequence of measurement cycles in which the RF excitation signals and the magnetic field gradients Gx, Gy, and Gz vary according to an MRI imaging protocol that is being used. A protocol may be designed for each of the one or more portions of the patient's body to be imaged. A protocol may include a certain number of pulse sequences oriented in different planes and/or with different parameters. The pulse sequences may include spin echo sequences, gradient echo sequences, diffusion sequences, inversion recovery sequences, or the like, or any combination thereof. For instance, the spin echo sequences may include a fast spin echo (FSE) pulse sequence, a turbo spin echo (TSE) pulse sequence, a rapid acquisition with relaxation enhancement (RARE) pulse sequence, a half-Fourier acquisition single-shot turbo spin-echo (HASTE) pulse sequence, a turbo gradient spin echo (TGSE) pulse sequence, or the like, or any combination thereof. As another example, the gradient echo sequences may include a balanced steady-state free precession (bSSFP) pulse sequence, a spoiled gradient echo (GRE) pulse sequence, and an echo planar imaging (EPI) pulse sequence, a steady state free precession (SSFP), or the like, or any combination thereof. The protocol may also include information regarding image contrast and/or ratio, an ROI, slice thickness, an imaging type (e.g., T1 weighted imaging, T2 weighted imaging, proton density weighted imaging, etc.), T1, T2, an echo type (spin echo, fast spin echo (FSE), fast recovery FSE, single shot FSE, gradient recalled echo, fast imaging with steadstate procession, and so on), a flip angle value, acquisition time (TA), echo time (TE), repetition time (TR), echo train length (ETL), the number of phases, the number of excitations (NEX), inversion time, bandwidth (e.g., RF receiver bandwidth, RF transmitter bandwidth, etc.), or the like, or any combination thereof. For each MRI scan, the resulting echo signals may be digitized and processed to reconstruct one or more images in accordance with the protocols that are used.

FIG. 3 is a schematic diagram illustrating exemplary hardware and/or software components of a computing device 300 according to some embodiments of the present disclosure. The computing device 300 may be used to implement any component of the imaging system 100 as described herein. For example, the processing device 120 and/or the terminal 140 may be implemented on the computing device 300, respectively, via its hardware, software program, firmware, or a combination thereof. Although only one such computing device is shown, for convenience, the computer functions relating to the imaging system 100 as described herein may be implemented in a distributed fashion on a number of similar platforms, to distribute the processing load. As illustrated in FIG. 3, the computing device 300 may include a processor 310, a storage 320, an input/output (I/O) 330, and a communication port 340.

The processor 310 may execute computer instructions (e.g., program code) and perform functions of the processing device 120 in accordance with techniques described herein. The computer instructions may include, for example, routines, programs, objects, components, data structures, procedures, modules, and functions, which perform particular functions described herein. For example, the processor 310 may process data obtained from the scanner 110, the terminal(s) 140, the storage device 130, and/or any other component of the imaging system 100. In some embodiments, the processor 310 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 300. However, it should be noted that the computing device 300 in the present disclosure may also include multiple processors, thus operations and/or method operations that are performed by one processor as described in the present disclosure may also be jointly or separately performed by the multiple processors. For example, if in the present disclosure the processor of the computing device 300 executes both operation A and operation B, it should be understood that operation A and operation B may also be performed by two or more different processors jointly or separately in the computing device 300 (e.g., a first processor executes operation A and a second processor executes operation B, or the first and second processors jointly execute operations A and B).

The storage 320 may store data/information obtained from the scanner 110, the terminal(s) 140, the storage device 130, and/or any other component of the imaging system 100. In some embodiments, the storage 320 may include a mass storage device, a removable storage device, a volatile read-and-write memory, a read-only memory (ROM), or the like, or any combination thereof. In some embodiments, the storage 320 may store one or more programs and/or instructions to perform exemplary methods described in the present disclosure. For example, the storage 320 may store a program for the processing device 120 to execute for determining whether an overall image of the subject can be generated by stitching images of a plurality of regions of the subject.

The I/O 330 may input and/or output signals, data, information, etc. In some embodiments, the I/O 330 may enable a user interaction with the processing device 120. In some embodiments, the I/O 330 may include an input device and an output device. The input device may include alphanumeric and other keys that may be input via a keyboard, a touch screen (for example, with haptics or tactile feedback), a speech input, an eye tracking input, a brain monitoring system, or any other comparable input mechanism. The input information received through the input device may be transmitted to another component (e.g., the processing device 120) via, for example, a bus, for further processing. Other types of the input device may include a cursor control device, such as a mouse, a trackball, or cursor direction keys, etc. The output device may include a display (e.g., a liquid crystal display (LCD), a light-emitting diode (LED)-based display, a flat panel display, a curved screen, a television device, a cathode ray tube (CRT), a touch screen), a speaker, a printer, or the like, or a combination thereof.

The communication port 340 may be connected to a network (e.g., the network 150) to facilitate data communications. The communication port 340 may establish connections between the processing device 120 and the scanner 110, the terminal(s) 140, and/or the storage device 130. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee™ link, a mobile network link (e.g., 3G, 4G, 5G), or the like, or a combination thereof. In some embodiments, the communication port 340 may be and/or include a standardized communication port, such as RS232, RS485, etc. In some embodiments, the communication port 340 may be a specially designed communication port. For example, the communication port 340 may be designed in accordance with the digital imaging and communications in medicine (DICOM) protocol.

Figure 4:
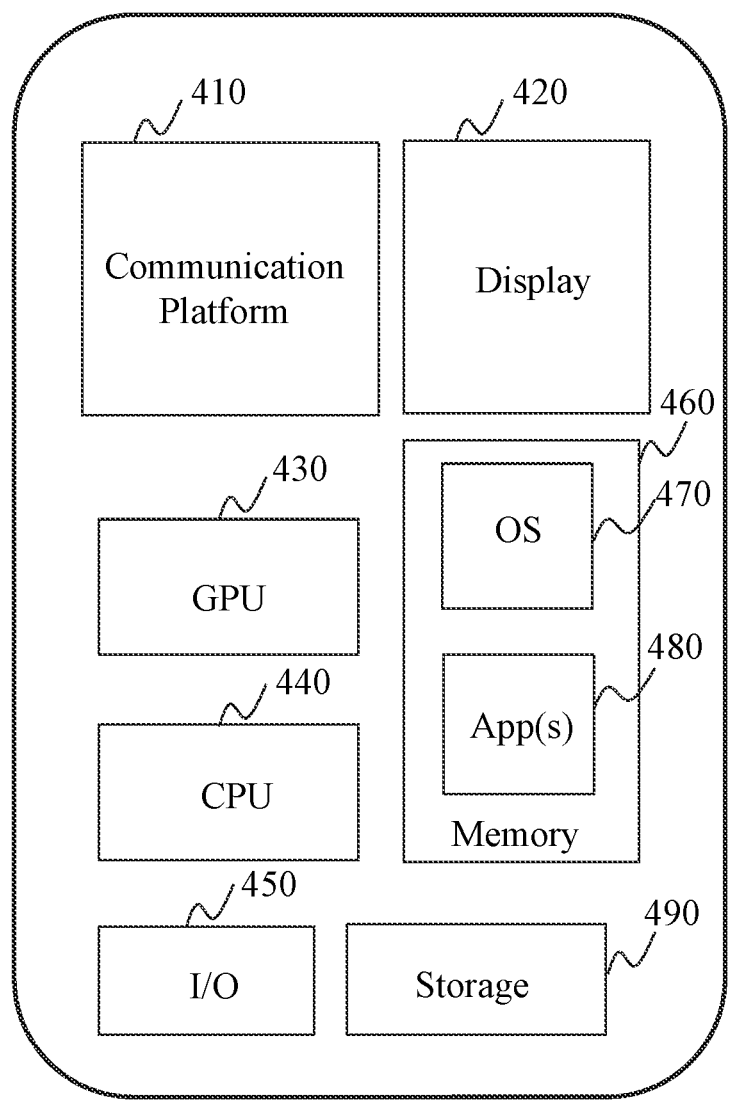
FIG. 4 is a schematic diagram illustrating exemplary hardware and/or software components of a mobile device according to some embodiments of the present disclosure.

FIG. 4 is a schematic diagram illustrating exemplary hardware and/or software components of a mobile device 400 according to some embodiments of the present disclosure. In some embodiments, one or more components (e.g., a terminal 140 and/or the processing device 120) of the imaging system 100 may be implemented on the mobile device 400.

As illustrated in FIG. 4, the mobile device 400 may include a communication platform 410, a display 420, a graphics processing unit (GPU) 430, a central processing unit (CPU) 440, an I/O 450, a memory 460, and a storage 490. In some embodiments, any other suitable component, including but not limited to a system bus or a controller (not shown), may also be included in the mobile device 400. In some embodiments, a mobile operating system 470 (e.g., iOS™, Android™, Windows Phone™) and one or more applications 480 may be loaded into the memory 460 from the storage 490 in order to be executed by the CPU 440. The applications 480 may include a browser or any other suitable mobile apps for receiving and rendering information relating to the imaging system 100. User interactions with the information stream may be achieved via the I/O 450 and provided to the processing device 120 and/or other components of the imaging system 100 via the network 150.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Figure 5:
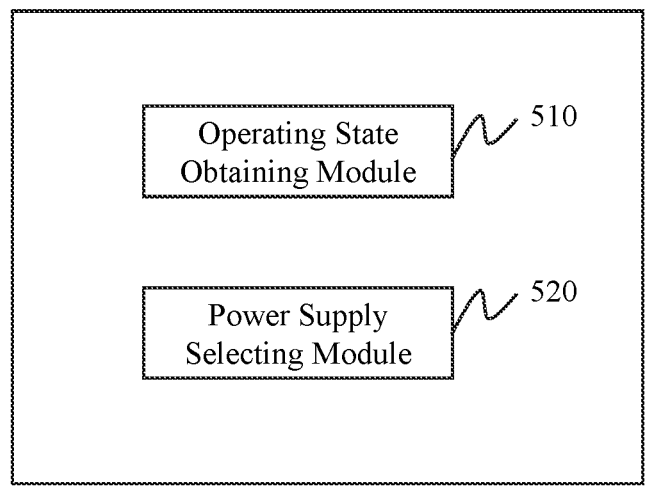
FIG. 5 is a block diagram illustrating an exemplary processing device according to some embodiments of the present disclosure.

FIG. 5 is a block diagram illustrating an exemplary processing device according to some embodiments of the present disclosure. In some embodiments, processing device 120 may be implemented on a computing device 300 (e.g., the processor 310) illustrated in FIG. 3 or a CPU 440 as illustrated in FIG. 4. As illustrated in FIG. 5, the processing device 120 may include an operating state obtaining module 510 and a power supply selecting module 520. Each of the modules described above may be a hardware circuit that is designed to perform certain actions, e.g., according to a set of instructions stored in one or more storage media, and/or any combination of the hardware circuit and the one or more storage media.

The operating state obtaining module 510 may obtain an operating state of an MR apparatus. In some embodiments, the plurality of operating states may include a scanning state, a non-scanning state, etc. In some embodiments, the operating state obtaining module 510 may obtain scanning information of the MR apparatus. The operating state obtaining module 510 may determine the operating state of the MR apparatus based on the scanning information. The operating state obtaining module 510 may store the scanning information of the MR apparatus in a storage device (e.g., the storage device 130, the storage 320, the storage 490, etc.). In some embodiments, before the MR apparatus performs an MR signal receiving operation, the operating state obtaining module 510 may obtain the scanning information of the MR apparatus. In some embodiments, when the MR apparatus is in the scanning state, at least one MR signal may be generated. When the MR apparatus is in the non-scanning state, no MR signal may be generated.

The power supply selecting module 520 may be select, from two or more power supply devices, a power supply device for supplying power for at least one coil of the MR apparatus according to the operating state of the MR apparatus. In some embodiments, the two or more power supply devices may include a battery, a wireless charging device, and/or a wired power source. In some embodiments, the power supply selecting module 520 may determine the battery as the determined power supply device if the operating state of the MR apparatus is the scanning state. The power supply selecting module 520 may generate battery charging instructions. The battery charging instructions may cause the battery to supply power for the at least one coil of the MR apparatus. In some embodiments, the power supply selecting module 520 may determine the wireless charging device or the wired power source as the power supply device if the operating state of the MR apparatus is the non-scanning state. The power supply selecting module 520 may generate wireless charging instructions. The wireless charging instructions may cause the wireless charging device to supply power for the at least one coil of the MR apparatus. In some embodiments, the wireless charging device may include a plurality of power transmitting modules. If the operating state of the MR apparatus is the non-scanning state, the power supply selecting module 520 may determine a power receiving module of the MR apparatus connecting to the at least one coil of the MR apparatus and identify, from the plurality of power transmitting modules, a power transmitting module of the wireless charging device for transmitting power to a power receiving module connected to the at least one coil of the MR apparatus. In some embodiments, the battery may be a rechargeable battery. The wireless charging instructions may also cause the wireless charging device to charge the battery. The wireless charging device may supply power for both the at least one coil of the MR apparatus and the battery.

In some embodiments, the power supply selecting module 520 may further determine a scanning location of the MR apparatus and a coil of the MR apparatus corresponding to the scanning location based on the scanning location information. The scanning location information may include information relating to a scanning location (e.g., a leg, the chest, etc.) of a subject. The power supply selecting module 520 may determine a power receiving module operably connected to the coil. In some embodiments, the wireless charging device may include a plurality of power transmitting modules. Each of the plurality of power transmitting modules may correspond to a scanning location. The wireless charging device may also include a plurality of power receiving modules. Each of the plurality of power receiving modules may be electrically connected to one of the at least one coil. After the coil of the MR apparatus corresponding to the scanning location is determined, the power supply selecting module 520 may determine the power receiving module operably connected to the coil. The power supply selecting module 520 may identify, from the plurality of power transmitting modules, a power transmitting module of the wireless charging device for transmitting power to the power receiving module connected to the coil. In some embodiment, the power supply selecting module 520 may obtain a location of the power receiving module operably connected to the coil (i.e., the target power receiving module). In some embodiments, the power supply selecting module 520 may store information of the plurality of power receiving modules in a table in advance. After the target power receiving module is determined, the power supply selecting module 520 may obtain the coordinates of the target power receiving module from the table, which represents the location of the target power receiving module. The power supply selecting module 520 may determine a distance between the location of the target power receiving module and a location of each of the plurality of power transmitting modules of the wireless charging device. In some embodiments, the power supply selecting module 520 may identify, from the plurality of power transmitting modules, a power transmitting module for transmitting the power to the target power receiving module based on the distances between the target power receiving module and the plurality of power transmitting modules. In some embodiments, the power supply selecting module 520 may further determine whether a count of the power transmitting module(s) corresponding to the smallest distance equals to 1. If there are two or more power transmitting modules corresponding to the smallest distance, the power supply selecting module 520 may obtain coil model information of the two or more power transmitting modules and the target power receiving module. A model matching degree between each of the two or more power transmitting modules and the target power receiving module may be determined based on the coil model information of the two or more power transmitting modules and the target power receiving module. The larger the model matching degree between a power transmitting module and the target power receiving module is, the better the wireless charging effect and a stability of a charging current induced in the target power receiving module may be. Thus, the power supply selecting module 520 may determine the power transmitting module among the two or more power transmitting modules corresponding to a largest model matching degree as the identified power transmitting module for transmitting the power to the target power receiving module.

The modules in the processing device 120 may be connected to or communicated with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units.

Figure 6A:
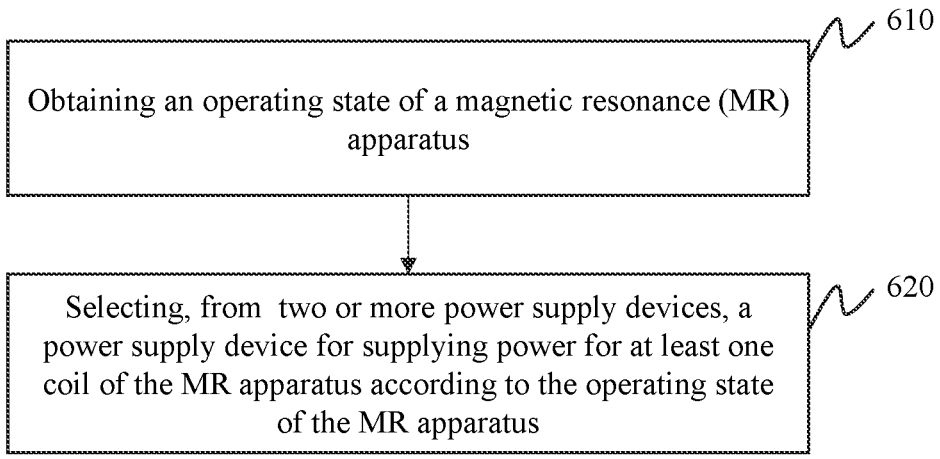
FIG. 6A is a schematic flowchart illustrating an exemplary process for selecting, from two or more power supply devices, a power supply device for supplying power for at least one coil of an MR apparatus according to some embodiments of the present disclosure.

FIG. 6A is a schematic flowchart illustrating an exemplary process for selecting, from two or more power supply devices, a power supply device for supplying power for at least one coil of an MR apparatus according to some embodiments of the present disclosure. In some embodiments, process 600 may be implemented as a set of instructions (e.g., an application) stored in the storage device 130, storage 320, or storage 490. The processing device 120, the processor 310, and/or the CPU 440 may execute the set of instructions, and when executing the instructions, the processing device 120, the processor 310, and/or the CPU 440 may be configured to perform the process 600. The operations of the illustrated process presented below are intended to be illustrative. In some embodiments, the process 600 may be accomplished with one or more additional operations not described and/or without one or more of the operations discussed. Additionally, the order of the operations of the process 600 illustrated in FIG. 6 and described below is not intended to be limiting.

In 610, the processing device 120 (e.g., the operating state obtaining module 510, the processor 310) may obtain an operating state of an MR apparatus.

In some embodiments, the MR apparatus (e.g., the scanner 110) may include a plurality of operating states. An operating state refers to a state in which the MR apparatus performs specific operations. The specific operations may include an MR signal receiving operation, a pause operation, a stop operation, a power on operation, a power off operation, or the like, or any combination thereof. In some embodiments, the plurality of operating states may include a scanning state, a non-scanning state, etc. The plurality of operating states may include different operations. For example, the scanning state may include an MR signal receiving operation. The non-scanning state may include a pause operation, a stop operation, a power on operation, a power off operation, etc.

In some embodiments, the processing device 120 may obtain scanning information of the MR apparatus. The scanning information may indicate an operating state of the MR apparatus at one or more time nodes in a time period (e.g., during the imaging process). In some embodiments, the scanning information of the MR apparatus may include scanning location information, scanning sequence information, or the like, or any combination thereof. The scanning location information may include information relating to a scanning location (e.g., a leg, the chest, etc.) of a subject. The subject may include a biological subject and/or a non-biological subject. The biological subject may be a human being, an animal, a plant, or a specific portion, organ, and/or tissue thereof. For example, the subject may include a spine of a human being or an animal, or a portion thereof. In some embodiments, the subject may be a man-made composition of organic and/or inorganic matters that are with or without life. For example, the subject may include a phantom of a spine of a human being or an animal, or a portion thereof. The scanning sequence information may include at least one operation performed by the MR apparatus at one or more time nodes (e.g., a first time node, a second time node, etc.) during the imaging process. The at least one operation may include an MR signal receiving operation, a pause operation, a stop operation, a power on operation, etc. By obtaining the scanning information including the scanning location information and/or the scanning sequence information, a comprehensive data basis of the MR apparatus may be provided for selecting a suitable power supply device for one or more components of the MR apparatus.

In some embodiments, the processing device 120 may determine the operating state of the MR apparatus based on the scanning information. For example, if a current operation of the MR apparatus is an MR signal receiving operation, the processing device 120 may determine the operating state of the MR apparatus as the scanning state. As another example, if the current operation of the MR apparatus is a pause operation, the processing device 120 may determine the operating state of the MR apparatus as the non-scanning state.

The processing device 120 may store the scanning information of the MR apparatus in a storage device (e.g., the storage device 130, the storage 320, the storage 490, etc.). In some embodiments, before the MR apparatus performs an MR signal receiving operation, the processing device 120 may obtain the scanning information of the MR apparatus.

The processing device 120 may determine the operating state of the MR apparatus based on the scanning information. In this way, the operations of the MR apparatus may be obtained easily in real-time without querying the operating state of the MR apparatus by sending instructions to the MR apparatus.

In some embodiments, when the MR apparatus is in the scanning state, at least one MR signal may be generated. When the MR apparatus is in the non-scanning state, no MR signal may be generated. In some embodiments, the non-scanning state may include one or more sub-states such as a hibernation sub-state, a standby sub-state, etc. By dividing the operating state of the MR apparatus into the scanning state and the non-scanning state, it may be convenient to select a power supply device for providing power for one or more components of the MR apparatus (e.g., at least one coil of the MR apparatus) according to the operating state of the MR apparatus.

In 620, the processing device 120 (e.g., the power supply selecting module 520, the processor 310) may select, from two or more power supply devices, a power supply device for supplying power for at least one coil of the MR apparatus according to the operating state of the MR apparatus. In some embodiments, the two or more power supply devices may include a battery, a wireless charging device, and/or a wired power source.

In some embodiments, the wireless charging device may be or include a coil-induced wireless charging device. In some embodiments, the wireless charging device may include a plurality of power transmitting modules and a plurality of power receiving modules. Each of the plurality of power transmitting modules may include a power transmitting coil and a power supply analog switch. When the power supply analog switch is in a connection state, the power supply analog switch and the power transmitting coil may form a switch driving circuit which generates an alternating electromagnetic field. Each of the plurality of power receiving modules may include a power receiving coil connected to the at least one coil of the MR apparatus. The power receiving coil may generate an induced electromagnetic field in response to the alternating electromagnetic field, thereby generating an induced current. The induced current may be supplied to the at least one coil of the MR apparatus. The battery may include a nickel-cadmium battery, a nickel-hydrogen battery, a lithium-ion battery, a lead battery, a lithium polymer battery, or the like, or any combination thereof. The battery may supply power for the at least one coil of the MR apparatus directly. The wired power source refers to an external power source that supplies power for the at least one coil of the MR apparatus via a wire. The external power source may include an alternating current, a battery, etc. Detailed descriptions regarding the power supply device can be found elsewhere in the present disclosure. See, for example, FIGS. 7A-7D and the descriptions thereof.

The at least one coil of the MR apparatus may be used to obtain MR signals from the subject. In some embodiments, the at least one coil of the MR apparatus may be or include a local coil. In order to satisfy requirements corresponding to different scanning locations, different coils may be used for receiving MR signals of different scanning locations. For example, when the MR apparatus scans a leg of the subject, a coil customized for scanning the leg may be used. In some embodiments, the at least one coil may be placed close to an imaging region (e.g., the scanning location such as a leg, the chest, the abdomen, etc., of the subject). Merely by way of example, during an imaging process of the leg of the subject, the coil may be attached to the leg.

In some embodiments, the power supply device selected from the two or more power supply devices may supply power for the at least one coil of the MR apparatus according to the operating state of the MR apparatus. When the MR apparatus is in the scanning state, the MR signals may be generated, which may cause the electromagnetic interference with the wireless charging device. Therefore, based on the different operating states, the processing device 120 may determine the different power supply devices, which may eliminate a problem that the electromagnetic interference occurs when the coil of the MR apparatus and the wireless charging device work simultaneously.

In some embodiments, the processing device 120 may determine the battery as the determined power supply device if the operating state of the MR apparatus is the scanning state. The processing device 120 (e.g., the power supply selecting module 520) may generate battery charging instructions. The battery charging instructions may cause the battery to supply power for the at least one coil of the MR apparatus.

If the operating state of the MR apparatus is the scanning state, the power supply analog switch may be turned off. The wireless charging device may not work and additional electromagnetic signals relative to electromagnetic signals produced by one or more coils of the MR apparatus may not be generated. The processing device 120 may generate the instructions for causing the battery to supply the electric power for the at least one coil of the MR apparatus. The battery may enter into a discharging state. Electric power stored in the battery may be supplied to the at least one coil of the MR apparatus. At this time, the power supply to the at least one coil may not affect electromagnetic signals and electromagnetic fields excited by the MR apparatus during the imaging process, and the imaging quality may be improved.

In some embodiments, the processing device 120 may determine the wireless charging device or the wired power source as the power supply device if the operating state of the MR apparatus is the non-scanning state. The processing device 120 may generate wireless charging instructions. The wireless charging instructions may cause the wireless charging device to supply power for the at least one coil of the MR apparatus.

If the operating state of the MR apparatus is the non-scanning state, the at least one coil of the MR apparatus may not generate electromagnetic signals and the electromagnetic fields. In some embodiments, the MR apparatus may enter a hibernation sub-state, a standby sub-state, etc. The wireless charging instructions may cause the wireless charging device or the wired power source to supply power for the at least one coil of the MR apparatus. For example, the power supply analog switch may be on, the power transmitting coil and the power supply analog switch may form a switch driving circuit which generates an alternating electromagnetic field. The power receiving coil connected to the at least one coil of the MR apparatus may generate an induced electromagnetic field in response to the alternating electromagnetic field, thereby generating an induced current. The induced current may be supplied to the at least one coil of the MR apparatus.

The wired power source may be an external power source that supplies power for the at least one coil of the MR apparatus via a wire. The external power source may include an alternating current, a battery, etc. If the operating state of the MR apparatus is the non-scanning state, the alternating current, the external battery, etc., may be connected to and supply power for the at least one coil of the MR apparatus.

In some embodiments, the wireless charging device may include a plurality of power transmitting modules. If the operating state of the MR apparatus is the non-scanning state, the processing device 120 may determine a power receiving module of the MR apparatus connecting to the at least one coil of the MR apparatus and identify, from the plurality of power transmitting modules, a power transmitting module of the wireless charging device for transmitting power to a power receiving module connected to the at least one coil of the MR apparatus. More descriptions regarding the determination of the power receiving module of the MR apparatus may be found in FIGS. 7A-7D and the descriptions thereof.

In some embodiments, the battery may be a rechargeable battery. The wireless charging instructions may also cause the wireless charging device to charge the battery. The wireless charging device may supply power for both the at least one coil of the MR apparatus and the battery. The battery may be fully charged so that a battery life of the battery may be extended, thus reducing the frequency of replacing batteries.

It should be noted that the above description is provided for the purposes of illustration, not intended to limit the scope of the present disclosure. For persons having ordinary skills in the art, multiple variations and modifications may be reduced to practice in the light of the present disclosure. However, those variations and modifications do not depart from the scope of the present disclosure. For example, the operating state of the MR apparatus may be output, for example, to the I/O 330, the terminal device 140, or other devices in the present disclosure). As another example, the scanning information of the MR apparatus may be stored in a storage device (e.g., the storage device 130, the storage 320, etc.) before the operating state of the MR apparatus is determined.

Figure 6B:
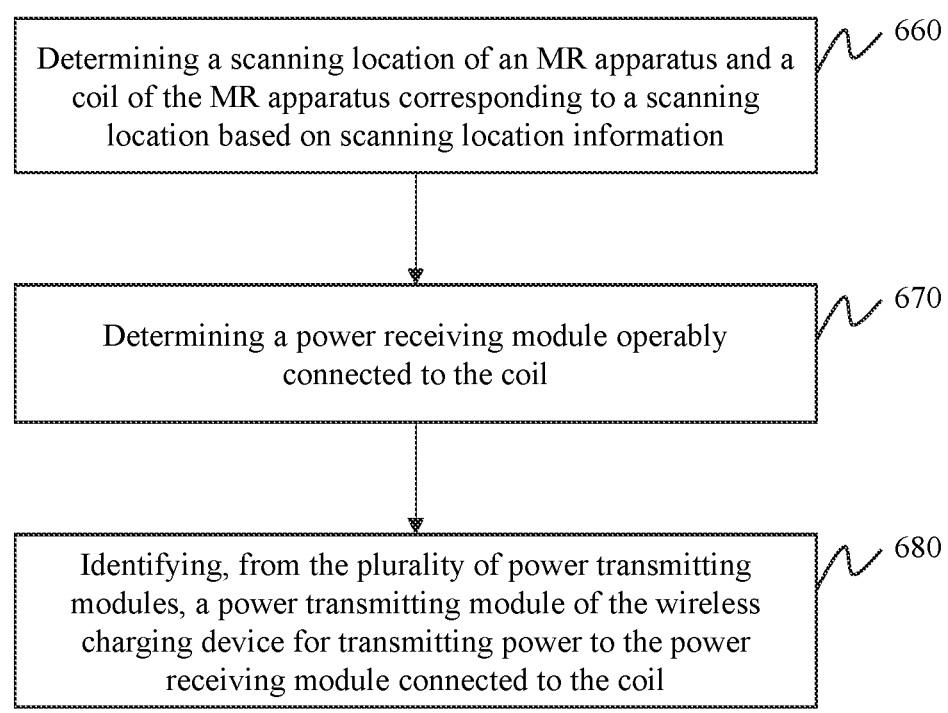
FIG. 6B is a schematic flowchart illustrating an exemplary process for selecting, from two or more power supply devices, a power supply device for supplying power for at least one coil of an MR apparatus according to some embodiments of the present disclosure.

FIG. 6B is a schematic flowchart illustrating an exemplary process for selecting, from two or more power supply devices, a power supply device for supplying power for at least one coil of an MR apparatus according to some embodiments of the present disclosure. In some embodiments, process 650 may be implemented as a set of instructions (e.g., an application) stored in the storage device 130, storage 320, or storage 490. The processing device 120, the processor 310, and/or the CPU 440 may execute the set of instructions, and when executing the instructions, the processing device 120, the processor 310, and/or the CPU 440 may be configured to perform the process 650. The operations of the illustrated process presented below are intended to be illustrative. In some embodiments, the process 650 may be accomplished with one or more additional operations not described and/or without one or more of the operations discussed. Additionally, the order of the operations of the process 650 illustrated in FIG. 6B and described below is not intended to be limiting.

In 660, the processing device 120 (e.g., the power supply selecting module 520, the processor 310) may determine a scanning location of the MR apparatus and a coil of the MR apparatus corresponding to the scanning location based on the scanning location information.

The scanning location information may include information relating to a scanning location (e.g., a leg, the chest, etc.) of a subject. The processing device 120 may determine the scanning location of the MR apparatus based on the scanning location information.

In some embodiments, the at least one coil may be placed close to the scanning location such as a leg, the chest, the abdomen, etc., of the subject. Merely by way of example, during a scanning process of the leg of the subject, the coil may be attached to the leg. In some embodiments, different coils may be used for scanning different scanning locations. Each the at least one coil of the MR apparatus may be used for receiving MR signals of a specific scanning location. For example, when the MR apparatus scans a leg of the subject, a coil customized for receiving MR signals of the leg may be used.

In 670, the processing device 120 (e.g., the power supply selecting module 520, the processor 310) may determine a power receiving module operably connected to the coil.

In some embodiments, the wireless charging device may include a plurality of power transmitting modules. Each of the plurality of power transmitting modules may correspond to a scanning location. The wireless charging device may also include a plurality of power receiving modules. Each of the plurality of power receiving modules may be electrically connected to one of the at least one coil. After the coil of the MR apparatus corresponding to the scanning location is determined, the processing device 120 may determine the power receiving module operably connected to the coil. The power receiving module operably connected to the coil may also be referred to as target power receiving module.

In 680, the processing device 120 (e.g., the power supply selecting module 520, the processor 310) may identify, from the plurality of power transmitting modules, a power transmitting module of the wireless charging device for transmitting power to the power receiving module connected to the coil.

In some embodiments, the plurality of power transmitting modules may be arranged at different locations. Merely by way of example, the plurality of power transmitting modules may be arranged on an upper surface of a table supporting the subject, a side surface of the table, a wall of a room accommodating the MR apparatus, etc. In some embodiments, the plurality of power transmitting modules may be arranged at suitable locations so as to maintain a stable connection and an appropriate distance between at least one of the plurality of power transmitting modules and the target power receiving module. After the target power receiving module is determined, a position of the target power receiving module may be determined. A power transmitting module of the wireless charging device that has better power transmission effect with the target power receiving module may be identified from the plurality of power transmitting modules. In some embodiments, the power transmitting module may be identified by comparing distances between different power transmitting modules and the target power receiving module. A connection may be established between the identified power transmitting module and the target power receiving module, thus optimizing the stability of the power supply process of the wireless charging process.

In some embodiment, the processing device 120 (e.g., the power supply selecting module 520) may obtain a location of the power receiving module operably connected to the coil (i.e., the target power receiving module). In some embodiments, the location of the target power receiving module may be represented by coordinates of the target power receiving module with reference to a coordinate system (e.g., the coordinate system 160). In some embodiments, the coordinate system 160 may be the same as or in consistent with a coordinate system customized for the imaging room accommodating the MR apparatus.

In some embodiments, the processing device 120 may store information of the plurality of power receiving modules in a table (e.g., Table 1 provided below as an example) in advance.

TABLE 1

Information table of power receiving modules of the wireless charging device

| Receiving coil modules | No. 1 | No. 2 | No. 3 | ... |
|---|---|---|---|---|
| Scanning locations | Leg | Chest | Lung | ... |
| Coordinates of the receiving coil modules | $(X_1, Y_1, Z_1)$ | $(X_2, Y_2, Z_2)$ | $(X_3, Y_3, Z_3)$ | ... |
| Coil model information | Model A | Model A | Model B | ... |

After the target power receiving module is determined, the processing device 120 may obtain the coordinates of the target power receiving module from Table 1, which represents the location of the target power receiving module.

In some embodiments, the processing device 120 may determine a distance between the location of the target power receiving module and a location of each of the plurality of power transmitting modules of the wireless charging device. Distances between the target power receiving module and the plurality of power transmitting modules may be determined based on coordinates of the target power receiving module in Table 1 and coordinates of the plurality of power transmitting modules.

In some embodiments, the processing device 120 may identify, from the plurality of power transmitting modules, a power transmitting module for transmitting the power to the target power receiving module based on the distances between the target power receiving module and the plurality of power transmitting modules. In some embodiments, the identified power transmitting module may correspond to a smallest distance among the plurality of power transmitting modules. The power transmitting module corresponding to the smallest distance may have better power supply effect. Thus, the power transmitting module corresponding to the smallest distance may be determined as the identified power transmitting module for transmitting the power to the target power receiving module.

In some embodiments, the processing device 120 may further determine whether a count of the power transmitting module(s) corresponding to the smallest distance equals to 1. In some embodiments, it is possible that there are two or more power transmitting modules corresponding to the smallest distance. If there are two or more power transmitting modules corresponding to the smallest distance, the processing device 120 may obtain coil model information of the two or more power transmitting modules and the target power receiving module. As used herein, coil model information of a power transmitting module or a power receiving module refers to product information related to the power transmitting module or the power receiving module. The coil model information of the two or more power transmitting modules may include, for example, a model number, a manufacturer, a device type, a count and/or types of one or more components arranged therein, etc., of each of the two or more power transmitting modules. Similarly, the coil model information of the target power receiving module may include, for example, a model number, a manufacturer, a device type, a count and/or types of one or more components arranged therein, etc., of the target power receiving module.

A model matching degree between each of the two or more power transmitting modules and the target power receiving module may be determined based on the coil model information of the two or more power transmitting modules and the target power receiving module. A model matching degree refer to a degree of matching regarding coil model information between a power transmitting module and a power receiving module. Merely by way of example, a power transmitting module and a power receiving module produced by a same manufacturer may have a relatively higher model matching degree.

In some embodiments, the model matching degree between each of the two or more power transmitting modules and the target power receiving module may be determined according to a preset model matching degree algorithm. Merely for illustration, each item (e.g., the manufacturer, the device type, etc.) of coil model information of a power transmitting module or a power receiving module may be assigned with a certain weight (e.g., 10%, 15%, 20%, 25%, 30%, etc.). If an item of coil model information of one of the two or more power transmitting modules and the target power receiving module is the same, a weight corresponding to the item may be counted into the model matching degree between the one of the two or more power transmitting modules and the target power receiving module. Otherwise, the weight corresponding to the item may not be counted into the model matching degree. In some embodiments, the model matching degree between each of the two or more power transmitting modules and the target power receiving module may be represented as a percentage, for example, 90%, 80%, 70%, 60%, 50%, etc. The larger the model matching degree between a power transmitting module and the target power receiving module is, the better the wireless charging effect and a stability of a charging current induced in the target power receiving module may be. In some embodiments, a power transmitting module among the two or more power transmitting modules corresponding to a largest model matching degree may have better power supply effect. Thus, the power transmitting module among the two or more power transmitting modules corresponding to a largest model matching degree may be determined as the identified power transmitting module for transmitting the power to the target power receiving module.

According to the embodiments set forth above, at least one power transmitting module among the plurality of power transmitting modules corresponding to a minimum distance may have relatively better power supply effect. If the count of the at least one power transmitting module corresponding to the smallest distance exceeds 1 (e.g., there are two or more power transmitting modules correspond to the smallest distance), a model matching degree between each of the two or more power transmitting modules and the target power receiving module may be determined. The processing device 120 may determine the power transmitting module corresponding to a maximum model matching degree as the power transmitting module for transmitting the power to the target power receiving module. In this case, a stability of a charging current during the wireless charging process may be optimized to a largest extent.

FIGS. 7A-7D are schematic diagrams illustrating exemplary power supply devices of the MR apparatus according to some embodiments of the present disclosure.

Figure 7A:
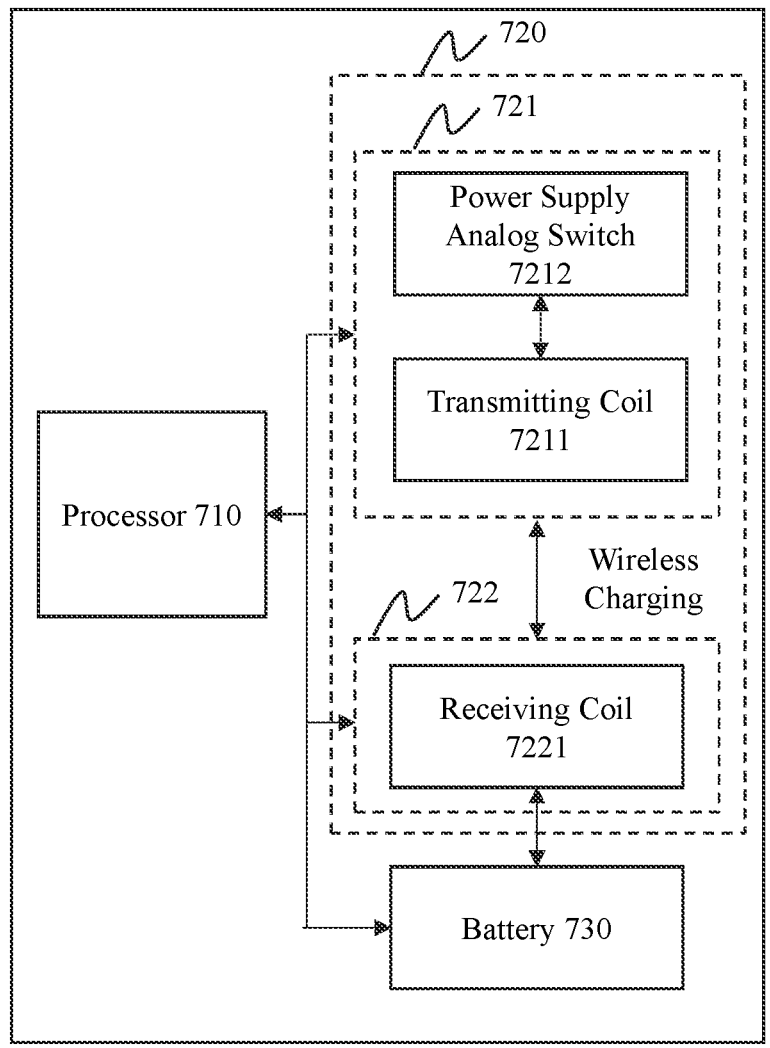
FIGS. 7A-7D are schematic diagrams illustrating exemplary power supply devices of MR apparatus according to some embodiments of the present disclosure.
Figure 7B:
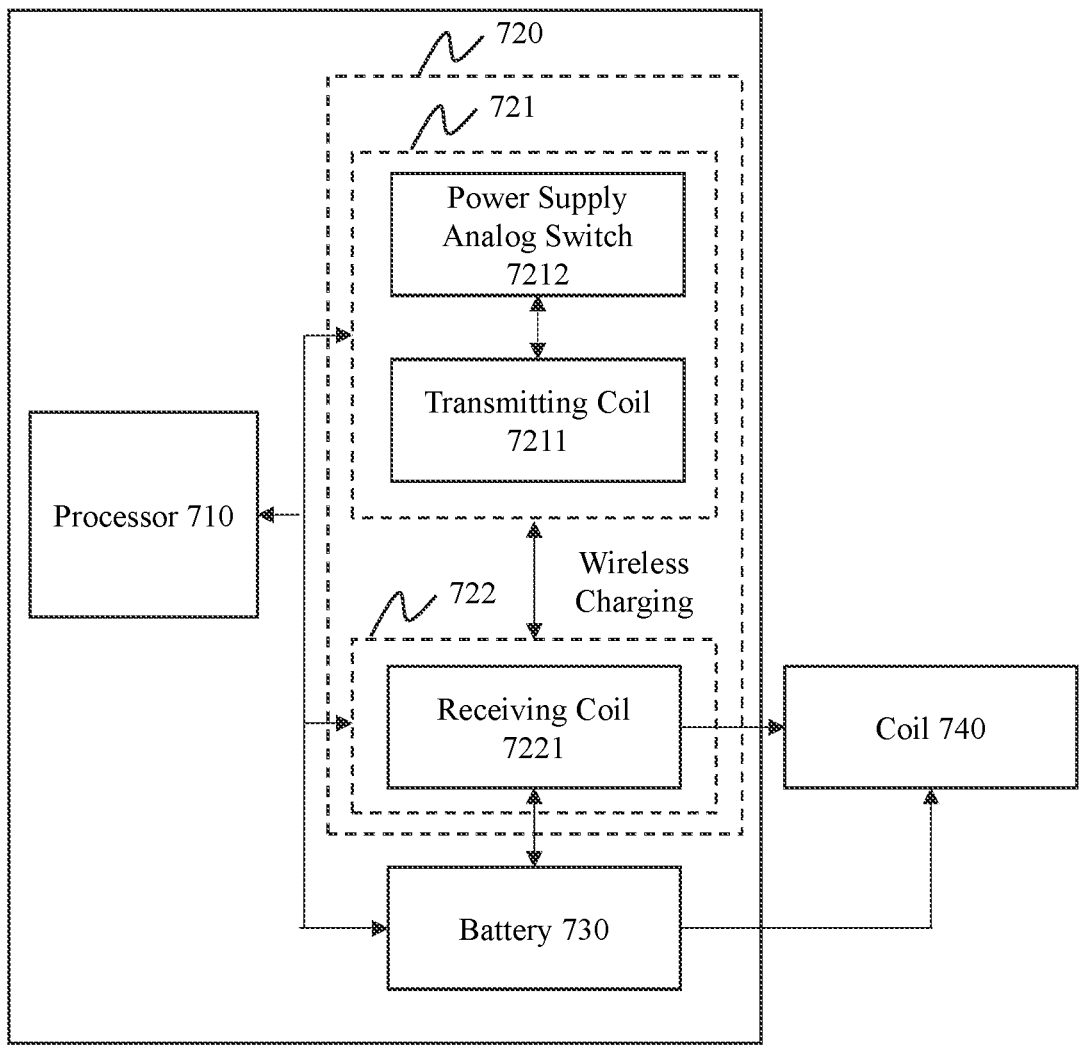

As shown in FIG. 7A and FIG. 7B, the power supply device 700 may include a processor 710, a wireless charging device 720, and a battery 730. The wireless charging device 720 may include a plurality of power transmitting modules and a plurality of power receiving modules. Illustratively, one power transmitting module 721 and one power receiving modules 722 are shown in the figures. The power transmitting module 721 may include a transmitting coil 7211 and a power supply analog switch 7212 electrically connected to the transmitting coil 7211. The power receiving module 722 may include a receiving coil 7221. The power receiving module 722 may be electrically connected to a coil 740 (e.g., a local coil) of the MR apparatus. For instance, the receiving coil 7221 may be electrically connected to the coil 740. The battery 730 may also be electrically connected to the coil 740. The processor 710 may be operably connected to the power transmitting module 721, the power receiving module 722, and the battery 730, respectively.

The power receiving module 722 may be electrically connected to the battery 730. There may be an appropriate distance between the power transmitting module 721 and the power receiving module 722. If an operating state of the MR apparatus is a non-scanning state, the power supply analog switch 7212 may be in a connection state. The power supply analog switch 7212 and the transmitting coil 7211 may form a switch driving circuit which generates an alternating electromagnetic field. The receiving coil 7221 may generate an induced electromagnetic field accordingly, thereby generating an induced current, which may supply power to both the coil 740 and the battery 730.

If the operating state of the MR apparatus is a scanning state, the processor 710 may generate instructions causing the power supply analog switch 7212 to be in a disconnection state. At this time, the wireless charging device 720 may not work. Additional electromagnetic signals relative to electromagnetic signals produced by one or more coils of the MR apparatus may not be generated. The battery 730 may be in a discharging state. Power stored in the battery 730 may be supplied to the coil 740. At this time, the power supply to the coil 740 may not affect electromagnetic signals and electromagnetic fields excited by the MR apparatus during the imaging process, and the imaging quality may be improved.

Figure 7C:
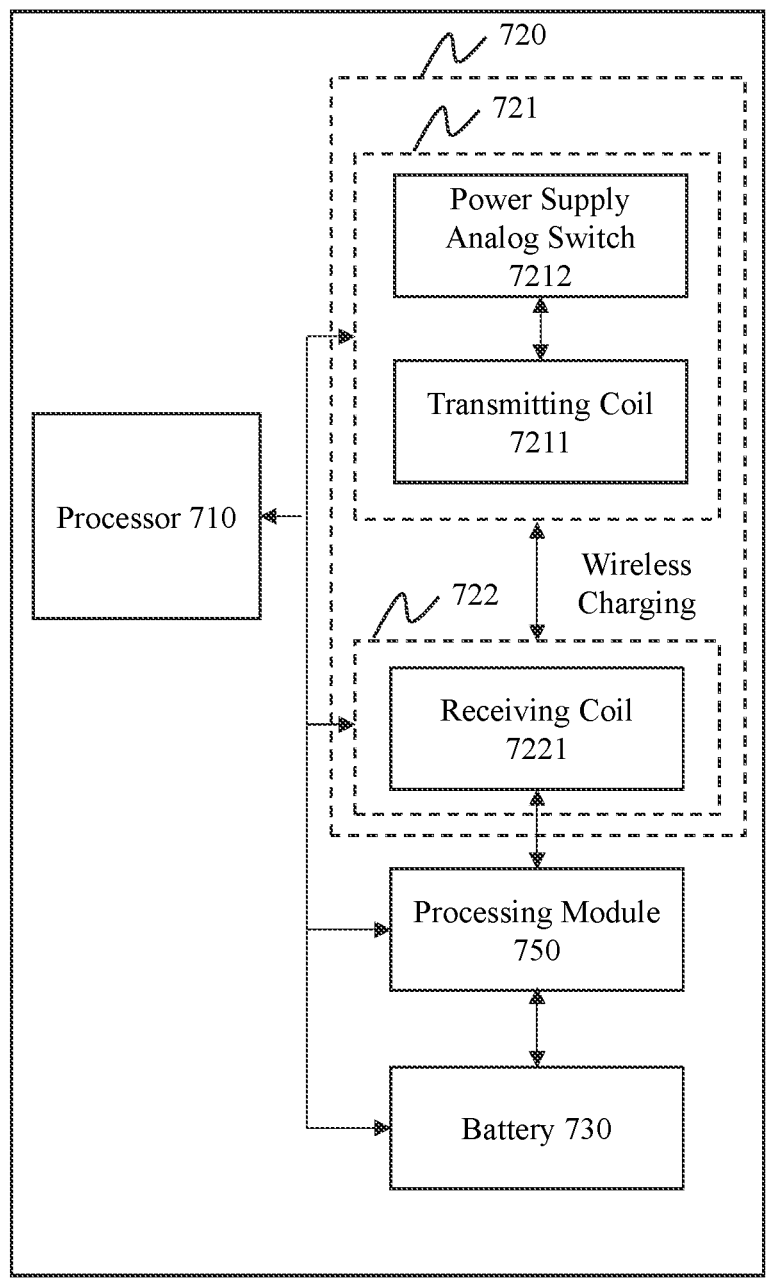
Figure 7D:
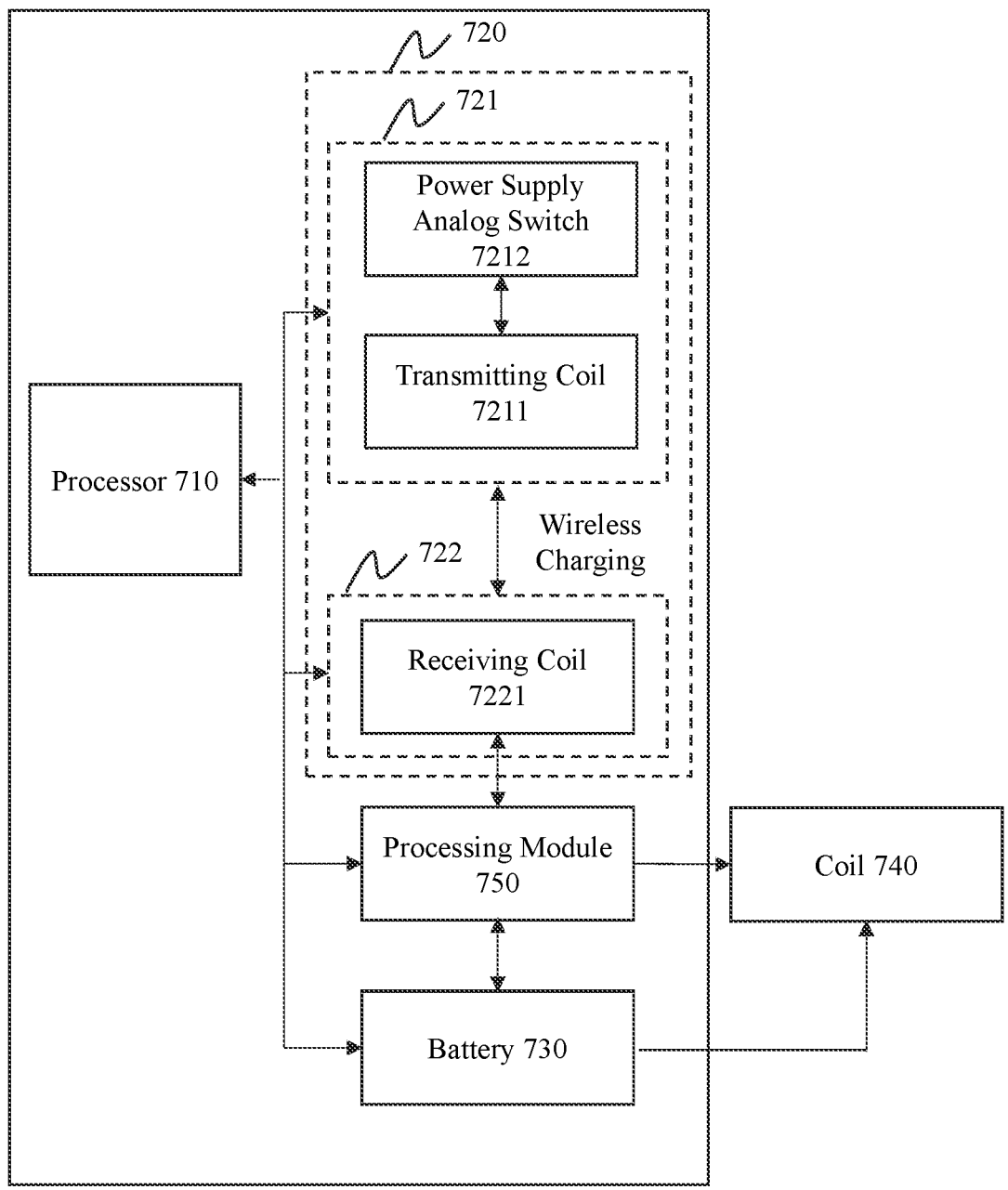

As shown in FIG. 7C and FIG. 7D, the power supply device 700 may further include a signal processing module 750, which is disposed between the power receiving module 722 and the battery 730. The signal processing module 750 may be configured to perform a filtering operation and/or a rectification operation on the induced charging current from the receiving coil 7221. The signal processing module 750 may also be electrically connected to the coil 740. The processed charging current may be output to the battery 730 and/or the coil 740 of the MR apparatus.

FIGS. 8A-8F are schematic diagrams illustrating an exemplary MR apparatus 800 according to some embodiments of the present disclosure.

Figure 8A:
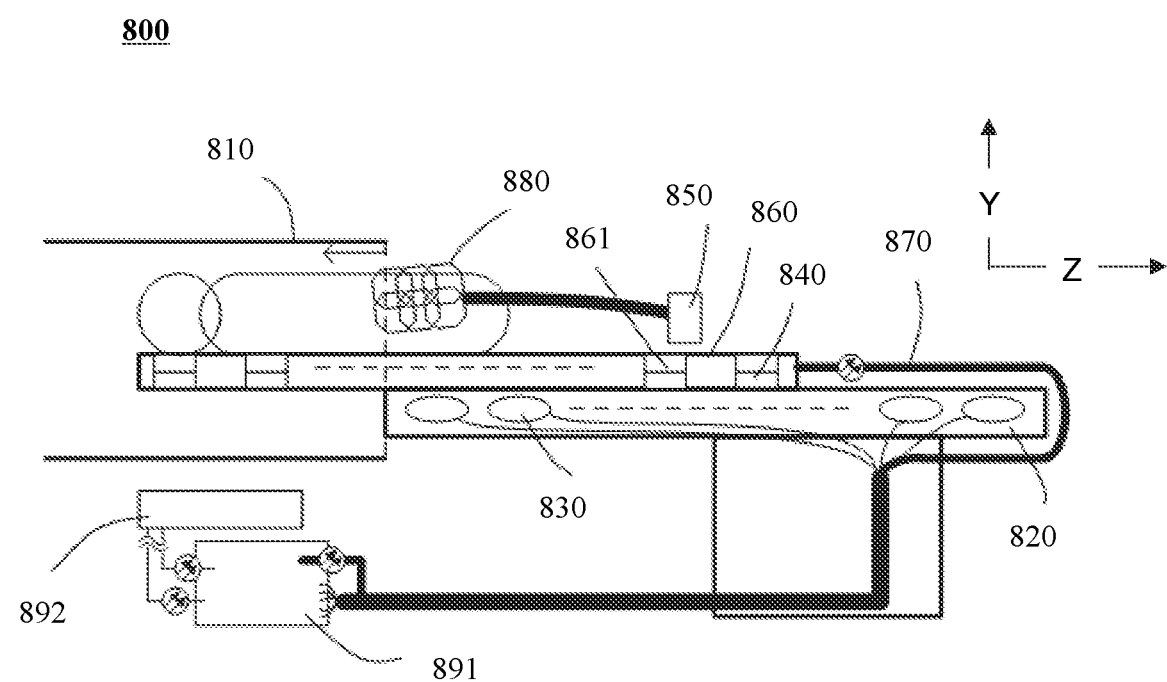
FIGS. 8A-8F are schematic diagrams illustrating exemplary MR apparatus according to some embodiments of the present disclosure.
Figure 8B:
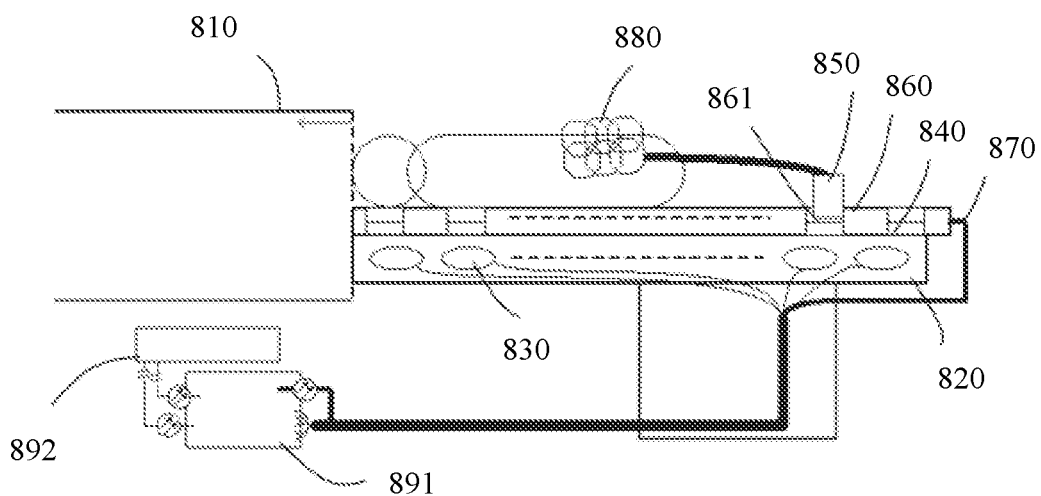

As shown in FIGS. 8A and 8B, the MR apparatus 800 may include a supporting platform 820, a table 860, one or more wireless power transfer (WPT) transmitting devices 830, one or more photoelectric converter 840, a driving device 870, and at least one local coil 880.

The at least one local coil 880 may be configured to receive MR signals from a subject positioned in a bore 810 of the MR apparatus 800 and generate electric signals associated with the subject. The table 860 may be configured to support the subject. The supporting platform 820 may be arranged outside the bore 810 of the MR apparatus 800. The supporting platform 820 may be a framework for supporting the table 860 and accommodating one or more components (e.g., the one or more WPT transmitting devices 830) of the MR apparatus 800. The table 860 may be movably mounted on the supporting platform 820. The one or more WPT transmitting devices may be set on or inside the supporting platform 820. For example, the one or more WPT transmitting devices may be set on an upper surface, a side surface, a lower surface, etc., of the supporting platform 820. At least one of the one or more WPT transmitting devices may be configured to supply power for at least one WPT receiving device wirelessly. The one or more photoelectric converters 840 may convert electric signals into optical signals for transmission to a terminal device. The one or more photoelectric converters 840 may be set on or inside the table 860. For example, a photoelectric converter 840 may be set on an upper surface, a side surface, a lower surface, etc., of the table 860. The driving device 870 may be connected with the table 860. In some embodiments, the driving device 870 may be configured to drive the table 860 to move, relative to the supporting platform 820, to a designated position (also referred to as target position). At least one of the one or more WPT transmitting devices 830 may supply power for at least one of the one or more photoelectric converters 840 when the driving device 870 drives the table 860 to the designated position.

In some embodiments, the driving device 870 may drive the table 860 to move relative to the supporting platform 820 along a certain direction (e.g., the Z direction, the X direction perpendicular to the Y-Z plane, or a combination of both, etc.) so that at least one of the one or more WPT transmitting devices 830 may be aligned with at least one of the one or more photoelectric converters 840. Then the at least one of the one or more WPT transmitting devices 830 may charge the at least one of the one or more photoelectric converters 840 wirelessly. The wireless charging of the at least one of the one or more photoelectric converters 840 may be performed outside a bore 810 of the MR apparatus 800. In this case, cables for charging the one or more photoelectric converters 840 may be left out of the table 860, thus avoiding the interference of the cable on electromagnetic fields inside the bore 810 of the MR apparatus 800, and improve the uniformity of the electromagnetic fields inside the bore 810 of the MR apparatus 800. Therefore, the accuracy of the MR signal acquisition performed by the at least one local coil 880 may be improved. In addition, an embedded radio frequency (RF) trapper for a specific transmitting frequency may not be needed, thus reducing the effect of gamma photon scattering, optimizing attenuation correction effect in a PET image reconstruction, and improving the imaging quality of the MR apparatus. Accordingly, the table 860 may be compatible with MR scans with a variety of field intensities.

The supporting platform 820 may be arranged outside the bore 810. The subject may be placed on the table 860. The driving device 870 may drive the table 860 to move into the bore 810 of the MR apparatus 800. For instance, the table 860 may be driven to move from a first location as illustrated in FIG. 8A to a second location as illustrated in FIG. 8B. The at least one local coil 880 may receive MR signals of the subject in magnetic fields (e.g., the main magnetic field generated by the main magnet 201, the gradient fields generated by the gradient coils 202, etc.) within the bore 810 of the MR apparatus 800. After the imaging process is complete, the driving device 870 may drive the table 860 to move out of the bore 810 of the MR apparatus 800. For instance, the table 860 may be driven to move from the second location as illustrated in FIG. 8B to the first location as illustrated in FIG. 8A.

The at least one of the one or more WPT transmitting devices 830 may be operably connected to an external power source 892. The external power source 892 may supply power for the at least one of the one or more WPT transmitting devices 830. A WPT driver 891 may be set between the external power source 892 and the at least one of the one or more WPT transmitting devices 830. The WPT driver 891 may control the external power source 892 to supply power for the at least one of the one or more WPT transmitting devices 830 and/or control the at least one of the one or more WPT transmitting devices 830 to supply power for at least one of the one or more WPT receiving devices.

When the driving device 870 drives the table 860 to move to the target location, the at least one of the one or more WPT transmitting devices 830 may be aligned with the at least one of the one or more photoelectric converters 840. For example, a count of the one or more photoelectric converters 840 may be the same as a count of the one or more WPT transmitting devices 830. When the table 860 arrives the target location, each of the one or more WPT transmitting devices 830 may be aligned with a corresponding photoelectric converter 840 of the one or more photoelectric converters 840. The at least one of the one or more WPT transmitting devices 830 may charge the at least one of the one or more photoelectric converters 840 wirelessly.

In some embodiments, the MR apparatus 800 may further include a transceiving module 850. The transceiving module 850 may be operably coupled to the local coil 880. For example, the transceiving module 850 may be operably connected to the local coil 880 via a cable or be integrated to the transceiving module 850. During the imaging process, the at least one local coil 880 may receive MR signals from the subject positioned in the bore 810, and generate electric signals associated with the subject. The transceiving module 850 may receive and process the electric signals associated with the subject. The transceiving module 850 may also be referred to as RF receiver.

The transceiving module 850 may be operably connected to one of the one or more photoelectric converters 840. The photoelectric converter 840 connected to the transceiving module 850 may receive the processed electric signals from the transceiving module 850, and convert the processed electric signals into optical signals for transmission to a terminal device (e.g., the terminal device 140) or the processing device 120. In some embodiments, the connection between the transceiving module 850 and the photoelectric converter 840 may be a wireless connection or a wired connection. The wireless connection may include a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units. The wired connection may include a metal cable, an optical cable, a hybrid cable, or the like, or any combination thereof. In some embodiments, the connection between the transceiving module 850 and the photoelectric converter 840 may be a near-field wireless connection, such as a non-contact signal coupling (penetrating) for an ultra-short range, a short-range wireless transmission, a directional antenna transmission with a frequency of tens of GHz (e.g., similar to millimeter radar wave). The near-field wireless connection between the transceiving module 850 and the photoelectric converter 840 may reduce or eliminate a risk of coupling RF transmission of high power from the MR apparatus 800, and improve the uniformity of the transmission field.

In some embodiment, the transceiving module 850 may perform various processing operations, such as an analog processing, an analog-to-digital (AD) sampling, a filtering operation, a data packing operation, or the like, or any combination thereof, on the electrical signal.

Figure 8C:
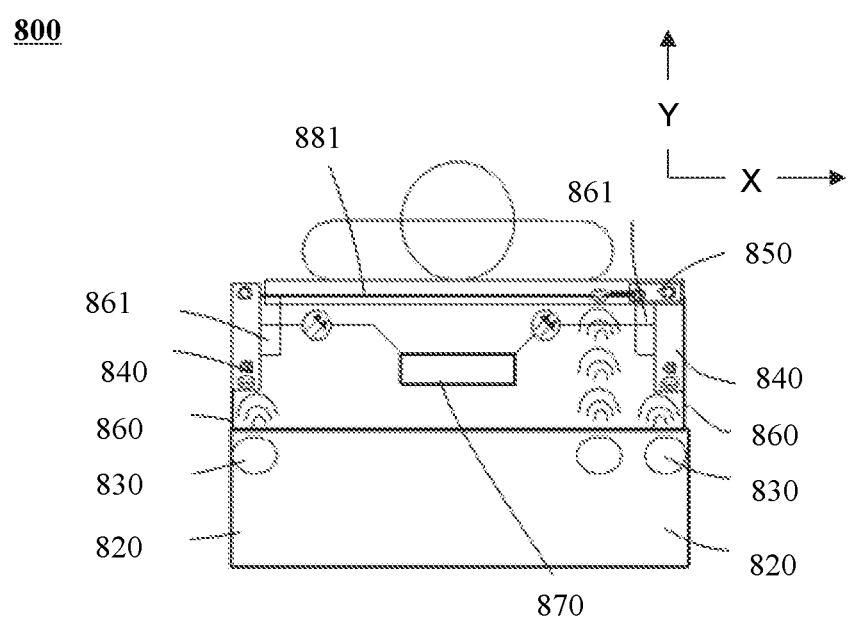

In some embodiments, the transceiving module 850 may be integrated with the local coil 880. In some embodiment, the local coil 880 may include a fixed local coil 881. The fixed local coil 881 may include a head coil, a neck coil, a spine coil, etc. In some embodiments, the transceiving module 850 may be integrated with the fixed local coil 881. Referring to FIG. 8C, the fixed local coil 881 may be set on an upper surface of the table 860. The fixed local coil 881 may be positioned at a middle portion of the table 860 in a width direction (e.g., the X direction perpendicular to the Y-Z plane defined by the Y and Z axes illustrated in FIG. 8) of the table 860. The one or more photoelectric converters 840 may be set at end portions of the table 860 in the width direction of the table 860. In some embodiments, the one or more photoelectric converters 840 may be spaced apart from the fixed local coil 881. For example, the one or more photoelectric converters 840 may be spaced apart from the fixed local coil 881 by one or more threshold distances. The threshold distances may be designated by a user (e.g., a manufacturer, a designer, etc.), according to default settings of the MR apparatus 800, etc. For example, the threshold distances may be determined according to a size of the table 860 and/or a size or structure of the supporting platform 820. The fixed receiving coil 881 may be connected to the transceiving module 850. By integrating the transceiving module 850 with the fixed local coil 881, a signal-to-noise ratio and accuracy of the MR signals detected by the fixed local coil 881 may be improved.

Figure 8D:
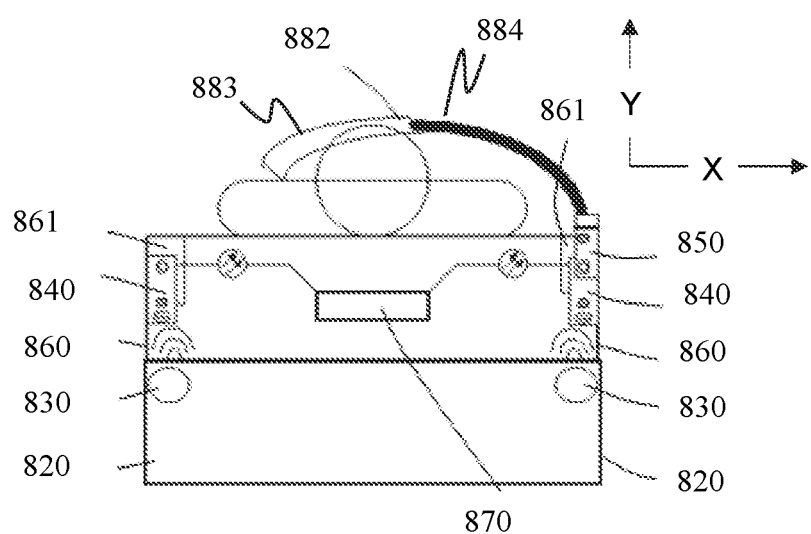

In some embodiments, the local coil 880 and the transceiving module 850 may be mechanically connected. The mechanical connection may realized by using bolts, pins, snap joints, welding, adhesives, or the like, or a combination thereof. In some embodiments, the local coil 880 and the transceiving module 850 may be detachably connected (e.g., via bolts, pins, snap joints, etc.). In some embodiments, the local coil 880 may include a movable local coil 882. The movable local coil 882 may include a hand coil, a chest coil, a leg coil, etc. Referring to FIG. 8D, the movable local coil 882 may be detachably connected to the transceiving module 850. The movable local coil 882 may be positioned flexibly, thus improving the operability of the local coil and the efficiency of clinical diagnosis or treatment.

In some embodiment, the movable local coil 882 may include a flexible part 883 and a rigid part 884. The flexible part 883 may include a coil body (not shown in the figure) and a tube. The rigid part 884 may include a coil plug and the transceiving module 850. The coil plug of the rigid part 884 may include a coil information storage unit for storing information of the movable local coil 882. The information of the movable local coil 882 stored in the coil information storage unit may include a type, a serial number, etc., of the movable local coil 882. The movable local coil 882 may include one or more coil units. A connection wire between a coil unit of the coil body and the transceiving module 850 may be set in the tube. The transceiving module 850 may be detachably connected to the movable local coil 882. In some embodiments, the transceiving module 850 may be detached from the movable local coil 882, and connected to an external charging device for charging conveniently via the coil plug.

In some embodiments, the transceiving module 850 may have specific distances (e.g., safe distances) from the local coil 880 and/or the subject. In this case, risks of the heating of the transceiving module 850 and damaging the uniformity of the main magnetic field, the gradient fields, and/or RF transmission fields in an imaging region of the MR scanner.

Figure 8E:
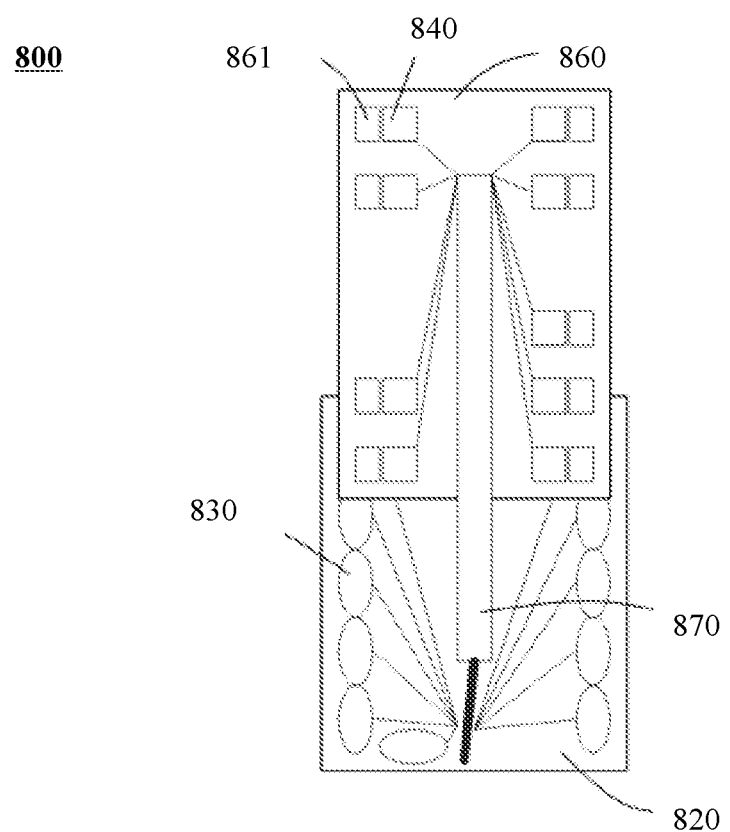
Figure 8F:
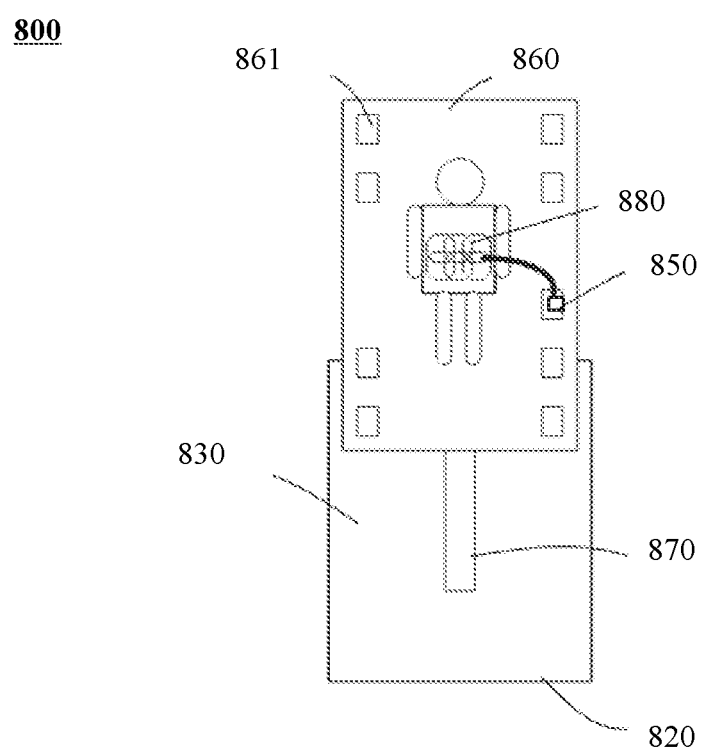

Referring to FIGS. 8E and 8F, in some embodiments, the table 860 may include one or more slots 861. Each of the one or more photoelectric converters 840 may be disposed in one of the one or more slots 861. The transceiving module 850 may be operably connected to one of the one or more photoelectric converters 840 when the transceiving module 850 is set (e.g., plugged) in a slot 861 where the photoelectric converter 840 is disposed.

In some embodiments, the one or more WPT transmitting devices 830 may be fixed in the slots 861. During the imaging process, the transceiving module 850 may be set in a slot 861. For example, the transceiving module 850 may be pressed or pushed into the slot 861. The transceiving module 850 and one of the one or more WPT transmitting devices 830 may be operably connected when the in the transceiving module 850 is set in the slot 861. The connection between the transceiving module 850 and the WPT transmitting device 830 set in the slot 861 may be near field connection. The near field connection may be direct inductive coupling without additional protocols.

Figure 9:
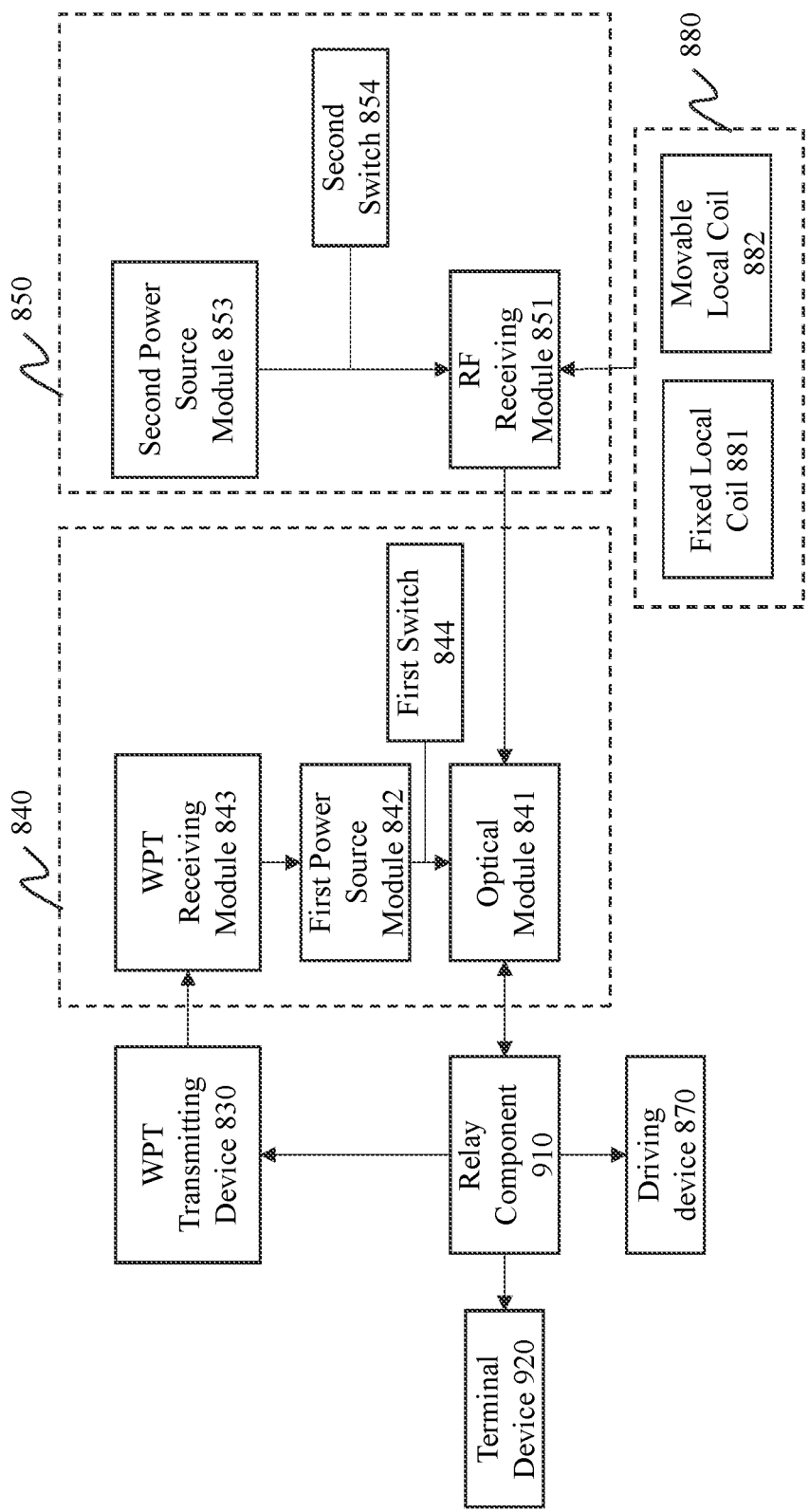
FIG. 9 is a block diagram illustrating an exemplary MR apparatus according to some embodiments of the present disclosure.

FIG. 9 is a block diagram illustrating an exemplary MR apparatus 800 according to some embodiments of the present disclosure.

In some embodiments, each of the one or more photoelectric converters may include an optical module, a first power source module, and a WPT receiving module. Illustratively, referring to FIG. 9, a photoelectric converter 840 may include an optical module 841, a first power source module 842, and a WPT receiving module 843. The optical module 841 may be a circuit or a component for converting electric signals (e.g., the electric signals received from the transceiving module 850) into optical signals. The optical signals may be transmitted to, for example, the processing device 120 or the terminal device 920 via a relay component 910. The relay component 910 may serve as transfer nodes between the optical module 841 and the terminal device 920. The relay component 910 may be configured to convert the optical signals from at least one of the one or more photoelectric converters (e.g., the optical module 841) into original data. The terminal device 920 may generate an MR image of the subject based on the original data.

The first power source module 842 may be connected to the optical module 841 and supply power for the optical module 841. In some embodiments, the first power source module 842 may be a rechargeable battery, a capacitance, etc. The WPT receiving module 843 may be implemented by a WPT receiving device. The WPT receiving module 843 may be connected to the first power source module 842. The WPT receiving module 843 may be electrically connected to one of the one or more WPT transmitting devices 830 when the driving device 870 drives the table 860 to the target position. The WPT receiving module 843 may generate induced current and charge the first power source module 842. In some embodiments, the WPT receiving module 843 may include a charging circuit and a WPT receiving coil. The WPT receiving coil may receive power from a WPT transmitting device among the one or more WPT transmitting devices when the table moves to the target position. The charging circuit may control the WPT receiving coil to supply power for the first power source module 842 and/or the optical module 841.

In some embodiments, the photoelectric converter 840 may further include a first switch 844. The first switch 844 may be configured between the optical module 841 and the first power source module 842 of the photoelectric converter 840. The first switch 844 may include a first switch control component. In some embodiments, the first switch control component may be a mechanical structure. The first switch control component may control a connection state or a disconnection state between the first power source module 842 and the optical module 841. The first switch control component may switch between a connection state of the first switch control component and a disconnection state of the first switch control component. The connection state may be a state under which the optical module 841 being operably connected to the first power source module 842. The disconnection state may be a state under which the optical module 841 being disconnected from the first power source module 842. And the first power source module 842 may not supply power for the optical module 841. By setting the first switch 844 between the optical module 841 and the first power source module 842, the optical module 841 being disconnected from the first power source module 842 when the optical module 841 does not work, thereby prolonging a battery life of the first power source module 842.

Figure 10A:
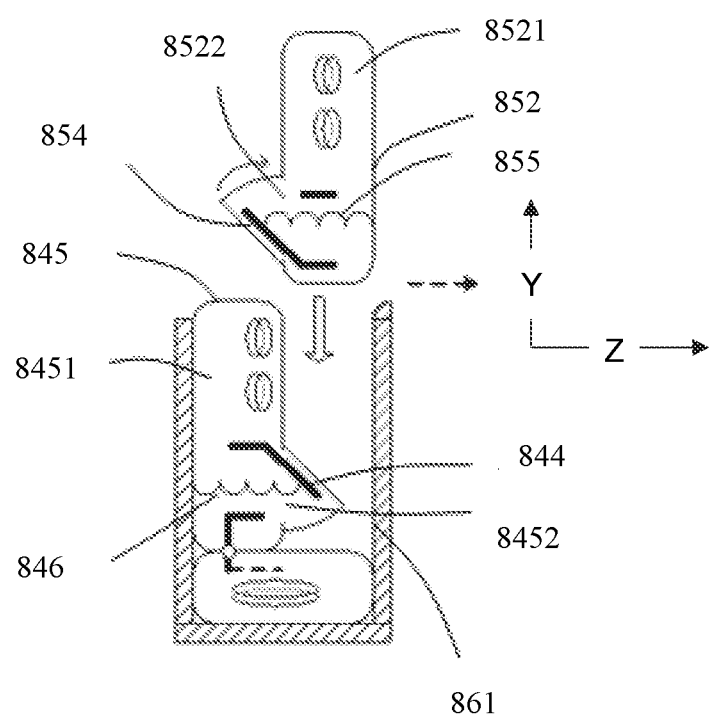
FIGS. 10A-10C are schematic diagrams illustrating an exemplary slot on a table of an MR apparatus 800 according to some embodiments of the present disclosure.
Figure 10B:
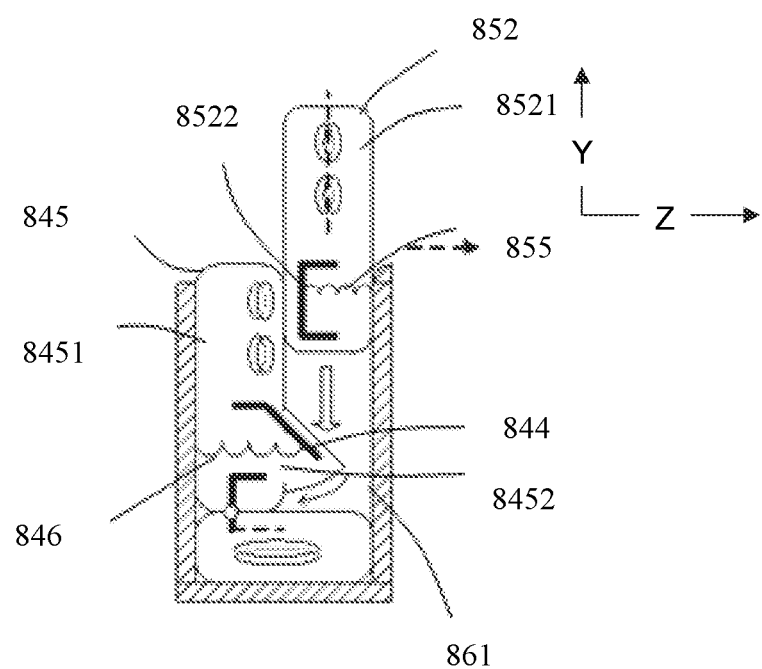
Figure 10C:
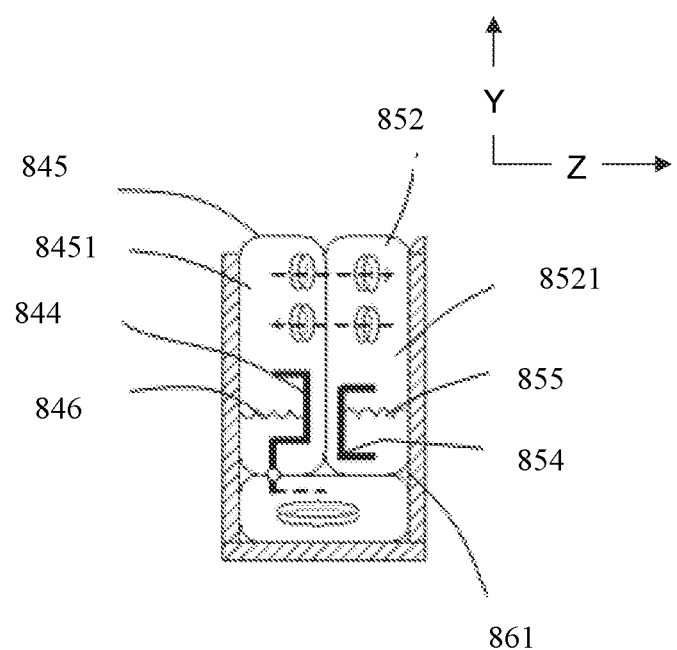

FIGS. 10A-10C are schematic diagrams illustrating an exemplary slot on a table of an MR apparatus 800 according to some embodiments of the present disclosure.

In some embodiments, the photoelectric converter 840 may further include a first housing 845. The first housing 845 may form a first space 8451 accommodating the optical module 841, the first power source module 842, and the WPT receiving module 843. The first space 8451 may include a first opening 8452. The first switch 844 may be configured at the first opening 8452. The first switch 844 may include a first switch control component 846. The first switch control component 846 may be an elastic component. Both ends of the first switch control component 846 may be abutted against the first switch 844 and an inner side of the first housing 845, respectively.

When the first switch 844 is pressed (e.g., by an external force), the first switch control component 846 may be compressed and undergo a first elastic deformation. The first switch control component 846 is set to the connection state by the first elastic deformation and the first power source module 842 may supply power to the optical module 841.

When the external force on the first switch 844 is removed, the first switch control component 846 may bound back, and the first switch 844 is switched to a disconnection state. Under the disconnection state, the optical module 841 being disconnected from the first power source module 842.

In some embodiments, the first switch 844 may be a button. A turning-off of the first switch 844 may be controlled by a mechanical contact on the button.

In some embodiment, the photoelectric converter 840 may include a first circuit board and a second circuit board. The first circuit board may include the first power source module 842 and the WPT receiving module 843. A plane of the first circuit board may be perpendicular to a plane of the second circuit board. The second circuit board may include the optical module 841 and the first switch 844. The optical module 841 may include a near-field sensing device. In some embodiments, the near-field sensing device may include a capacitive sensing device, an inductive sensing device, etc.

In some embodiments, the transceiving module 850 may include a RF receiving module 851, a second power source module 853, a second switch 854, and a second housing 852. The RF receiving module 851 may be electrically connected to the local coil. The second power source module 853 may be connected to the RF receiving module 851 and configured to supply power for the RF receiving module 851. The second switch 854 may be configured between the RF receiving module 851 and the second power source module 853 of the transceiving module 850. The second housing 852 may form a second space 8521 accommodating the RF receiving module 851 and the second power source module 853. The second space 8521 may include a second opening 8522. The second switch 854 may be configured at the second opening 8522. The second switch 854 may include a second switch control component 855. The second switch control component 855 may be an elastic component. The second switch control component 855 may switch between a connection state and a disconnection state of the RF receiving module 851 and the second power source module 853. Under the connection state of the second switch control component 855, the RF receiving module 851 being operably connected to the second power source module 853. Under the disconnection state of the second switch control component 855, the RF receiving module 851 being disconnected from the second power source module 853.

When the transceiving module 850 is set in the slot 861, the first switch 844 and the second switch 854 press against each other, the first switch control component 846 and the second switch control component 855 undergo a first elastic deformation and a second elastic deformation, respectively. The first switch control component 846 may be set to the connection state by the first elastic deformation. The second switch control component 855 may also set to the connection state by the second elastic deformation.

FIG. 11A is a schematic diagram illustrating an exemplary MR apparatus according to some embodiments of the present disclosure. As shown in FIG. 11, the MR apparatus 1100 may include a local coil 1110, a plurality of relay components 1120, a terminal device 1130, and a table 1140.

As shown in FIG. 11A, a subject may be positioned on the table 1140. The local coil 1110 may be placed close to the subject, or a portion thereof. As used herein, a coil being placed close to a subject indicates that the coil is positioned in the vicinity of or on the subject such that the coil can receive MR signals from the subject, or a portion thereof. For example, the local coil 1110 may be a soft coil. When the MR apparatus 1100 scans the chest of the subject, the table 1140 supporting the subject may be moved into a bore of the MR apparatus 1100, and the local coil 1110 may be covered on or wrapped about an upper portion of the subject.

In some embodiments, the local coil 1110 may include one or more coil sections. Each of the one or more coil sections may be a portion of the local coil 1110. Merely for illustration, the local coil 1110 may have an array including 3×3 coil sections 1111, for example, as illustrated in FIG. 11B, which is a schematic diagram of the local coil 1110.

In some embodiments, a coil section 1111 may include a coil element, a first directional communication module, one or more sensors, and at least one first transceiving module. FIG. 11C is a schematic diagram of the coil section 1111. As shown in FIG. 11C, the coil section 1111 may include a coil element 1112, a first directional communication module including a first directional transmitting antenna 1113 and a first directional receiving antenna 1114, one or more sensors 1115, and at least one first transceiving module 1116. It should be noted that the schematic diagram illustrated in FIG. 11C is provided as an example, not intended to be limiting. The coil element 1112 may receive MR signals from a region of the subject. In some embodiments, a coil element may be a set or array of coil units. A coil unit refers to a device or component (e.g., an induction coil) that is configured to receive MR signals from a local region of the subject. In some embodiments, a coil element may include at least one coil unit. The at least one coil unit may be arranged in a line, a circle, a triangle, a square, etc., which is not limited in the present disclosure.

In some embodiments, a count (or number) and/or an arrangement of the at least one coil unit of a coil element of each coil section may be the same. For instance, a coil element of each coil section of the local coil 1110 may include 9 coil units arranged in a 3×3 array. In some embodiments, a count (or number) and/or an arrangement of the at least one coil unit of a coil element of each coil section may be different. For instance, a coil element of a first coil section of the local coil 1110 may include 16 coil units arranged in a 4×4 array. A coil element of a second coil section of the local coil 1110 may include 4 coil units arranged along a line, e.g., a 1×4 array.

The first directional communication module may transmit or receive electromagnetic waves in a first direction. The first direction refers to a specific direction in a 3D space (e.g., the space defined with reference to the coordinate system 1170). In some embodiments, the first directional communication module may be or include one or more first directional antennae. In some embodiments, the one or more first directional antennae may include at least one first directional transmitting antenna 1113 and at least one first directional receiving antenna 1114. The at least one first directional transmitting antenna 1113 may transmit electromagnetic waves in the first direction. Characteristics (e.g., an energy amplitude, a direction (e.g., the first direction)) of the electromagnetic waves transmitted by the at least one first directional transmitting antenna 1113 may be determined according to communication parameters (also referred to as transmitting parameters) of the at least one first directional transmitting antenna 1113. Accordingly, the characteristics of the electromagnetic waves transmitted by the at least one first directional transmitting antenna 1113 may be changed by adjusting one or more communication parameters of at least a part of the at least one first directional transmitting antenna 1113. The at least one first directional receiving antenna 1114 may receive electromagnetic waves in the first direction. Characteristics (e.g., the first direction) of the electromagnetic waves receivable by the at least one first directional receiving antenna 1114 may be determined according to communication parameters (also referred to as receiving parameters) of the at least one first directional receiving antenna 1114. Accordingly, the characteristics of the electromagnetic waves receivable by the at least one first directional receiving antenna 1114 may be changed by adjusting one or more communication parameters of at least a part of the at least one first directional receiving antenna 1114.

For instance, the one or more first directional antennae may be or include one or more first phased array antennae. The at least one first directional transmitting antenna 1113 may be or include a first phased array transmitting antenna. The at least one first directional receiving antenna 1114 may be or include a first phased array receiving antenna. The first phased array transmitting antenna may transmit electromagnetic waves in the first direction. The first phased array receiving antenna may receive electromagnetic waves in the first direction.

In some embodiments, the first phased array transmitting antenna may include a plurality of first transmitting units. Characteristics of the electromagnetic waves transmitted by the first phased array transmitting antenna may be determined according to communication parameters of the plurality of first transmitting units. Accordingly, the characteristics of the electromagnetic waves transmitted by the first phased array transmitting antenna may be changed by adjusting communication parameters of one or more of the plurality of first transmitting units. In some embodiments, the communication parameters may include a phase parameter and/or a gain factor. The phase parameter refer to at least one angle representing a direction or a vector in a 3D space (e.g., the space defined with reference to the coordinate system 1170). The gain factor refers to a coefficient for adjusting the energy amplitude of the transmitted electromagnetic waves. Merely for illustration purposes, the first direction in which the first phased array transmitting antenna transmits the electromagnetic waves may be determined based on phase parameters (e.g., phases) of the plurality of first transmitting units. Accordingly, the first direction in which the first phased array transmitting antenna transmits the electromagnetic waves may be changed by adjusting the phase parameter of at least one of the plurality of first transmitting units. An energy amplitude of the electromagnetic waves transmitted by the first phased array transmitting antenna may be determined based on a gain factor associated with the plurality of first transmitting units. Accordingly, the energy amplitude of the electromagnetic waves transmitted by the first phased array transmitting antenna may be changed by adjusting the gain factor.

The first phased array receiving antenna may include a plurality of first receiving units. Characteristics (e.g., the first direction) of the electromagnetic waves receivable by the first phased array receiving antenna may be determined according to communication parameters of the plurality of first receiving units. Accordingly, the characteristics of the electromagnetic waves receivable by the first phased array receiving antenna may be changed by adjusting communication parameters of one or more of the plurality of first receiving units. Merely for illustration purposes, the first direction in which the first phased array receiving antenna is configured to receive electromagnetic waves may be determined based on phase parameters (e.g., phases) of the plurality of first receiving units. Accordingly, the first direction in which the first phased array receiving antenna configured to receive the electromagnetic waves may be changed by adjusting the phase parameter of at least one of the plurality of first receiving units.

During the imaging process, the subject, or a portion thereof, may move (e.g., in the form of breath, heartbeats, gastrointestinal movement, body swings, etc.) relative to the MR apparatus. The local coil 1110 covered on or wrapped about the subject may also move, along with the movement of the subject, relative to the MR apparatus. The first directional communication module may be set on the local coil 1110. Thus, the first direction in which the first directional communication module is configured to transmit or receive electromagnetic waves may change. The one or more sensors 1115 may detect motion information of at least one component (e.g., the coil element, the at least one first transceiving module, and/or the first directional communication module) of the coil section 1111. The motion information may include a motion direction, a motion speed, a motion distance, an acceleration, a rotation angle, or the like, or any combination thereof. The motion information may be associated with one or more directions in the 3D space (e.g., an X direction, a Y direction, and/or a Z direction of the coordinate system 1170). In some embodiments, the one or more sensors 1115 may include an acceleration sensor, a gyroscope, a radar, a laser range finder, or the like, or any combination thereof. The one or more sensors 1115 may be operably coupled to (e.g., attached to or connected with) the at least one component of the coil section 1111 or a specific location of the MR apparatus 1100, and detect the motion information of the at least one component.

The at least one first transceiving module 1116 may transmit to or receive from data or signals at least one of the plurality of relay components 1120. In some embodiments, the at least one first transceiving module 1116 may be operably connected with the coil element 1112, the one or more sensors 1115, and the first directional communication module.

In some embodiments, the at least one first transceiving module 1116 may transmit data or signals to a relay component 1120 through the first directional communication module (e.g., the first phased array transmitting antenna) of the coil section 1111. The data or signals to be transmitted to the relay component 1120 may include MR signals received from the coil element, communication parameters of the first directional communication module (e.g., communication parameters of the plurality of first transmitting units of the first phased array transmitting antenna, communication parameters of the plurality of first receiving units of the first phased array receiving antenna, etc.), motion information detected by the one or more sensors, etc.

In some embodiments, the at least one first transceiving module 1116 may receive data or signals from the relay component 1120 through the first directional communication module (e.g., the first phased array transmitting antenna 1113) of the coil section 1111. The data or signals received from the relay component 1120 may include control instructions for controlling one or more components (e.g., the coil element 1112, the first directional communication module, the one or more motion sensors 1115, etc.) of the coil section 1111.

In order to improve stability and efficiency of the transmission of the data or signals between the at least one first transceiving module of the coil section 1111 and the relay component 1120, the at least one first transceiving module 1116 may further process the received data or signals and/or the data or signals to be transmitted. Merely by way of example, the at least one first transceiving module 1116 may include an AD converter, a digital signal processor (DSP), a data modulator, a data demodulator, a synchronization unit, etc. The AD converter may convert analog signals (e.g., the MR signals received by the coil element) into digital signals. The DSP may process the digital signals, e.g., by performing one or more processing operations such as a denoising, a filtering, etc. In some embodiments, the processing operations may also include data packing. For instance, the DSP may package digital signals converted from MR signals that coil elements of different coil sections 1111 receive into a signal.

The data modulator may modulate the processed digital signals of a first frequency into modulated signals of a second frequency. The data demodulator may demodulate data or signals (e.g., signals received from the relay component 1120) of the second frequency into demodulated signals of the first frequency. The first frequency refers to a frequency of data or signals transmitted between one or more components of the coil section 1111. The first frequency may be a relatively low frequency or frequency range, for example, 0.5 GigaByte per second (Gbps), 1 Gbps, 1.5 Gbps, 2 Gbps, 1-2 Gbps, or the like, or a combination thereof. The second frequency refers to a frequency of data or signals transmitted between the coil section 1111 and the relay component 1120. The second frequency may be a relatively high frequency or frequency range, for example, 40 Gbps, 45 Gbps, 50 Gbps, 55 Gbps, 60 Gbps, 40-50 Gbps, 50-60 Gbps, 40-60 Gbps, or the like, or a combination thereof, etc. Thus, the electromagnetic waves transmitted between the coil section 1111 and the relay component 1120 may be millimeter waves. Compared to waves of a relatively low frequency or frequency range, the millimeter waves may have a better focus effect during transmission, thus reducing or eliminating electromagnetic waves transmitted to the subject and avoiding interferences with other wireless communication that are simultaneously occurring in a same spatial range where the millimeter waves are present.

The synchronization unit may synchronize phases of the MR signals. During the transmission between the coil section 1111 and the relay component 1120, phases of the MR signals may fluctuate. In some embodiments, the synchronization unit may include a clock unit or a clock circuit. The synchronization unit may synchronize the phases of the MR signals based on a synchronization signal generated by the clock unit or clock circuit.

The plurality of relay components 1120 may serve as transfer nodes between the one or more coil sections 1111 of the local coil 1110 and the terminal device 1130. The plurality of relay components 1120 may be set on an inner surface 1150 of a bore of the MR apparatus 1100. At least a part of the plurality of relay components 1120 may be operably connected to the one or more coil sections 1111 via point-to-point wireless communications. The plurality of relay components 1120 may also be operably connected to the terminal device 1130 via a wired connection. Exemplary wired connections may include a metal cable, an optical fiber, a hybrid cable, or the like, or any combination thereof. In some embodiments, the connection between each of the plurality of relay components 1120 and the terminal device 1130 may be an optical fiber 1160. In some embodiments, each of the plurality of relay components 1120 may include a second directional communication module, at least one second transceiving module, etc.

The second directional communication module may transmit or receive electromagnetic waves in a second direction. The second direction refers to a specific direction in the 3D space (e.g., the space defined with reference to the coordinate system 1170). In some embodiments, the second directional communication module may be or include one or more second directional antennae. In some embodiments, the one or more second directional antennae may include at least one second directional transmitting antenna 1122 and at least one second directional receiving antenna 1123. The at least one second directional transmitting antenna 1122 may transmit electromagnetic waves in the second direction. The at least one second directional receiving antenna 1123 may receive electromagnetic waves in the second direction.

For instance, the one or more second directional antennae may be or include one or more second phased array antennae. The at least one second directional transmitting antenna 1122 may be or include a second phased array transmitting antenna. The at least one second directional receiving antenna 1123 may be or include a second phased array receiving antenna. The second phased array transmitting antenna may transmit electromagnetic waves in the second direction. The second phased array receiving antenna may receive electromagnetic waves in the second direction.

In some embodiments, the second phased array transmitting antenna may include a plurality of second transmitting units. Characteristics (e.g., an energy amplitude, a direction (e.g., the second direction)) of the electromagnetic waves transmitted by the second phased array transmitting antenna may be determined according to communication parameters of the plurality of second transmitting units. Accordingly, the characteristics of the electromagnetic waves transmitted by the second phased array transmitting antenna may be changed by adjusting communication parameters of one or more of the plurality of second transmitting units. Merely for illustration purposes, the second direction in which the second phased array transmitting antenna transmits the electromagnetic waves may be determined based on phase parameters (e.g., phases) of the plurality of second transmitting units. Accordingly, the second direction in which the second phased array transmitting antenna transmits the electromagnetic waves may be changed by adjusting the phase parameter of at least one of the plurality of second transmitting units. An energy amplitude of the electromagnetic waves transmitted by the second phased array transmitting antenna may be determined based on a gain factor associated with the plurality of second transmitting units. Accordingly, the energy amplitude of the electromagnetic waves transmitted by the second phased array transmitting antenna may be changed by adjusting the gain factor.

The second phased array receiving antenna may include a plurality of second receiving units. Characteristics (e.g., the second direction) of the electromagnetic waves receivable by the second phased array receiving antenna may be determined according to communication parameters of the plurality of second receiving units. Accordingly, the characteristics of the electromagnetic waves receivable by the second phased array receiving antenna may be changed by adjusting communication parameters of one or more of the plurality of second receiving units. Merely for illustration purposes, the second direction in which the second phased array receiving antenna configured to receive the electromagnetic waves may be determined based on phase parameters (e.g., phases) of the plurality of second receiving units. Accordingly, the second direction in which the second phased array receiving antenna receives the electromagnetic waves may be changed by adjusting the phase parameter of at least one of the plurality of second receiving units.

As for a relay component 1120 that is operably connected to a coil section 1111 of the local coil 1110, the at least one second transceiving module of the relay component 1120 may receive data or signals from the coil section 1111, and transmit data or signals to be transmitted to the terminal device 1130. The data or signals received from the coil section 1111 may include the MR signals received from the coil element, the communication parameters of the first directional communication module (e.g., communication parameters of the plurality of first transmitting units of the first phased array transmitting antenna, communication parameters of the plurality of first receiving units of the first phased array receiving antenna, etc.), the motion information detected by the one or more sensors, etc. The data or signals to be transmitted to the terminal device 1130 may include data or signals associated with the relay component 1120 and/or at least a portion of the received data or signals. The data or signals associated with the relay component 1120 may include, for example, communication parameters of the second directional communication module of the relay component 1120.

The at least one second transceiving module of the relay component 1120 may also receive data or signals from the terminal device 1130, and transmit data or signals to be transmitted to the coil section 1111. The data or signals received from the terminal device 1130 may include control instructions for controlling one or more components of the coil section 1111 and/or the relay component 1120. Merely by way of example, the control instructions may include a control instruction for adjusting communication parameters of the first directional communication module of the coil section 1111 and/or the second directional communication module of the relay component 1120, an initiation control instruction, etc. The data or signals to be transmitted to the coil section 1111 may include at least a portion of the received data or signals, e.g., the control instructions for controlling one or more components of the coil section 1111.

In order to improve stability and efficiency of the transmission of the data or signals between the at least one second transceiving module of the relay component 1120 and the coil section 1111 or the terminal device 1130, the at least one second transceiving module may further process the received data or signals and/or the data or signals to be transmitted. Merely by way of example, the at least one second transceiving module may include an AD converter, a data modulator, a data demodulator, a photoelectric transducer, etc. The photoelectric transducer may convert the data or signals in the form of electric signals into optical signals. The optical signals may be transmitted to the terminal device 1130 via the optical fiber 1160.

In some embodiments, the plurality of relay components 1120 may be embedded in or attached to the inner surface 1150 of the bore of the MR apparatus 1100. The plurality of relay components 1120 may be arranged evenly (e.g., equidistantly spaced). In some embodiments, a count of the plurality of relay components 1120 may be greater than a count of the one or more coil sections 1111 such that the point-to-point wireless connection between each of the one or more coil sections 1111 and one of the plurality of relay components 1120 may be established when the one or more coil sections 1111 are located at different locations.

The terminal device 1130 may be connected to the plurality of relay components 1120. For example, the terminal device 1130 may be connected to the plurality of relay components 1120 through wired connections (e.g., the optical fiber 1160). In some embodiments, the terminal device 1130 may be implemented by the computing device 300 or the mobile device 400. The terminal device 1130 may include at least one processor.

The terminal device 1130 may receive data or signals transmitted from the plurality of relay components 1120, and generate MR images or instructions for controlling at least a part of the one or more coil sections and/or the plurality of relay components 1120. For example, the terminal device 1130 may obtain the MR signals received by the one or more coil sections 1111, and reconstruct an MR image of the subject based on the MR signals. As another example, the terminal device 1130 may obtain the motion information of at least one component of the coil section 1111, and generate, based on the motion information, control instructions for adjusting communication parameters of the first directional communication module of a coil section 1111 and the second directional communication module of a relay component 1120, so that a first direction of the first directional communication module of the coil section 1111 is consistent with a second direction of the second directional communication module of the relay component 1120. In some embodiments, an intersection angle between the first direction and the second direction may be determined. A determination may be made as to whether the intersection angle is below an angle threshold may be made. If the intersection angle is below the angle threshold, it may be determined that the first direction of the first directional communication module of the coil section 1111 is consistent with the second direction of the second directional communication module of a relay component 1120 such that the coil section 1111 is wirelessly connected to the relay components 1120 through the first directional communication module of the coil section 1111 and the second directional communication module of the relay component 1120. The angle threshold may be determined by a user, according to default settings of the MR apparatus 1100, etc. In this case, the point-to-point wireless communication between the first directional communication module of the coil section 1111 and the second direction of the second directional communication module of the relay component 1120 may be established.

More descriptions regarding the adjustment of the communication parameters of the first directional communication module of the coil section 1111 and the second directional communication module of the relay component 1120 can be found elsewhere in the present disclosure. See, for example, FIG. 13 and the descriptions thereof.

Figure 12:
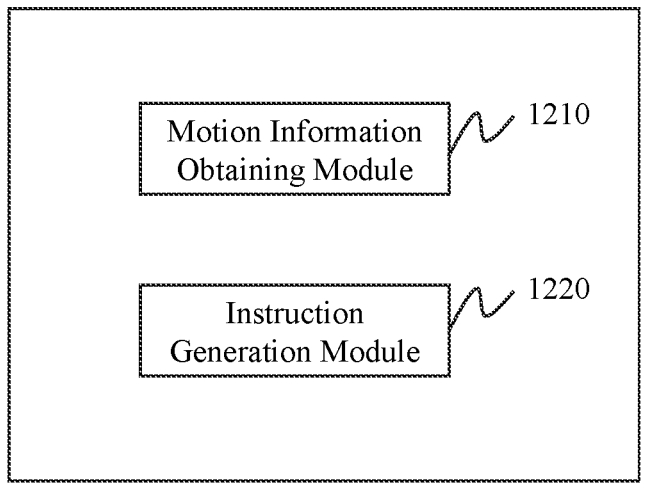
FIG. 12 is a block diagram illustrating an exemplary terminal device according to some embodiments of the present disclosure.

FIG. 12 is a block diagram illustrating an exemplary terminal device 1200 according to some embodiments of the present disclosure. As illustrated in FIG. 12, the terminal device 1200 may include a motion information obtaining module 1210 and an instruction generation module 1220. Each of the modules described above may be a hardware circuit that is designed to perform certain actions, e.g., according to a set of instructions stored in one or more storage media, and/or any combination of the hardware circuit and the one or more storage media. The terminal device 1200 provides an exemplary implementation of the terminal 1130 illustrated in FIG. 11A.

The motion information obtaining module 1210 may obtain, through the relay component connected to the coil section, motion information of at least one component of the coil section. During the imaging process, the subject or a portion thereof may move relative to the MR apparatus 1100. The local coil 1110 covered on or wrapped about the subject may also move relative to the MR apparatus 1100. The first directional communication module may be set on the local coil 1110. Thus, the first direction in which the first directional communication module transmits or receives electromagnetic waves may change. The one or more sensors (e.g., an acceleration sensor, a gyroscope) of the coil section 1111 may detect motion information of the at least one component (e.g., the coil element, the at least one first transceiving module, and/or the first directional communication module) of the coil section 1111. The terminal device 1130 may be operably connected to the relay component 1120 through the optical fiber 1160. The relay component 1120 may be operably connected to the coil section 1111 through the directional wireless connection between the first directional communication module of the coil section 1111 and the second directional communication module of the relay component 1120. The coil section 1111 (e.g., the at least one first transceiving module) may transmit the motion information detected by the one or more sensors of the coil section 1111 to the relay component 1120 through the directional wireless connection. The relay component 1120 (e.g., the at least one second transceiving module) further transmit the motion information to the terminal device 1130 through the optical fiber 1160.

The instruction generation module 1220 may generate, based on the motion information, control instructions for adjusting communication parameters of the first directional communication module of the coil section and the second directional communication module of the relay component, so that the first direction of the first directional communication module of the coil section may be consistent with the second direction of the second directional communication module of relay component. In some embodiment, the instruction generation module 1220 may obtain phase parameters of the second directional communication module of the relay component 1120. The second directional communication module of the relay component 1120 may transmit electromagnetic waves to the first directional communication module of the coil section 1111. The instruction generation module 1220 may obtain current motion information of the at least one component of the coil section 1111. The instruction generation module 1220 may determine a motion trend of the at least one component of the coil section based on the motion information. In order to adjust the first direction of the first directional communication module of the coil section 1111 to be consistent with the second direction of the second directional communication module of relay component 1120 in real time, the motion trend of the at least one component may be used to adjust phase parameters of the first directional communication module of the coil section 1111 and the second directional communication module of the relay component 1120. The instruction generation module 1220 may generate, based on the motion information and the phase parameters of the second directional communication module of the relay component 1120, control instructions for adjusting communication parameters of the first directional communication module of the coil section and the second directional communication module of the relay component.

In some embodiments, the instruction generation module 1220 may obtain a first energy amplitude of the electromagnetic waves transmitted from the second directional communication module of the relay component 1120 to the first directional communication module of the coil section 1111. The instruction generation module 1220 may determine a first gain factor of the first energy amplitude based on one or more amplitude adjustment parameters. In some embodiments, the instruction generation module 1220 may determine the first gain factor of the first energy amplitude so that a product of the first gain factor and the first energy amplitude (also referred to as compensated first energy amplitude) is between the upper threshold and the lower threshold, and the compensated first energy amplitude may be close to the typical value. The upper threshold and/or the lower threshold may be determined based on actual needs for the first energy amplitude and the second energy amplitude. In some embodiments, the instruction generation module 1220 may obtain a second energy amplitude of electromagnetic waves transmitted from the first directional communication module of the coil section 1111 to the second directional communication module of the relay component 1120. The instruction generation module 1220 may determine a second gain factor of the second energy amplitude based on the one or more amplitude adjustment parameters.

In some embodiments, to initiate the imaging process of the subject, the instruction generation module 1220 may be configured to generate an initiation control instruction. The initiation control instruction may be generated and performed by the plurality of relay components 1120 and/or the local coil 1110 before the local coil 1110 receives the MR signals from the subject. The initiation control instruction may include directing a second directional communication module of each of the plurality of relay components 1120 to transmit electromagnetic waves in a second direction at a maximum power level to activate at least one of the one or more coil sections 1111. According to the initiation control instruction, communication parameters of second directional communication modules of at least a part of the plurality of relay components and first directional communication modules of the activated coil sections may be determined according to a beam scanning algorithm. According to the beam scanning algorithm, the instruction generation module 1220 may generate control instructions for traversing phase parameters of the second directional communication modules of at least a part of the plurality of relay components and first directional communication modules of the activated coil sections in certain ranges until the second direction of each of the second directional communication modules of at least a part of the plurality of relay components is consistent with the first direction of a corresponding first directional communication module of an activated coil section. In some embodiments, a first energy amplitude of electromagnetic waves transmitted from the second directional communication module of each of the at least a part of the plurality of relay components and/or a second energy amplitude of electromagnetic waves transmitted from the first directional communication module of each of the activated coil sections to the second directional communication module of the relay component 1120 may be compensated. The instruction generation module 1220 may transmit the initiation control instruction to each of the plurality of relay components 1120.

The modules in the processing device 120 may be connected to or communicated with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units. For example, the above-mentioned modules may be integrated into a console (not shown). Via the console, a user may set parameters for receiving MR signals from a subject, controlling imaging processes, adjusting reconstruction protocols for reconstruction of an image, viewing images, etc. As another example, the processing device 120 may include a storage module (not shown) configured to store information and/or data (e.g., ultrasound signals, images) associated with the above-mentioned modules.

Figure 13:
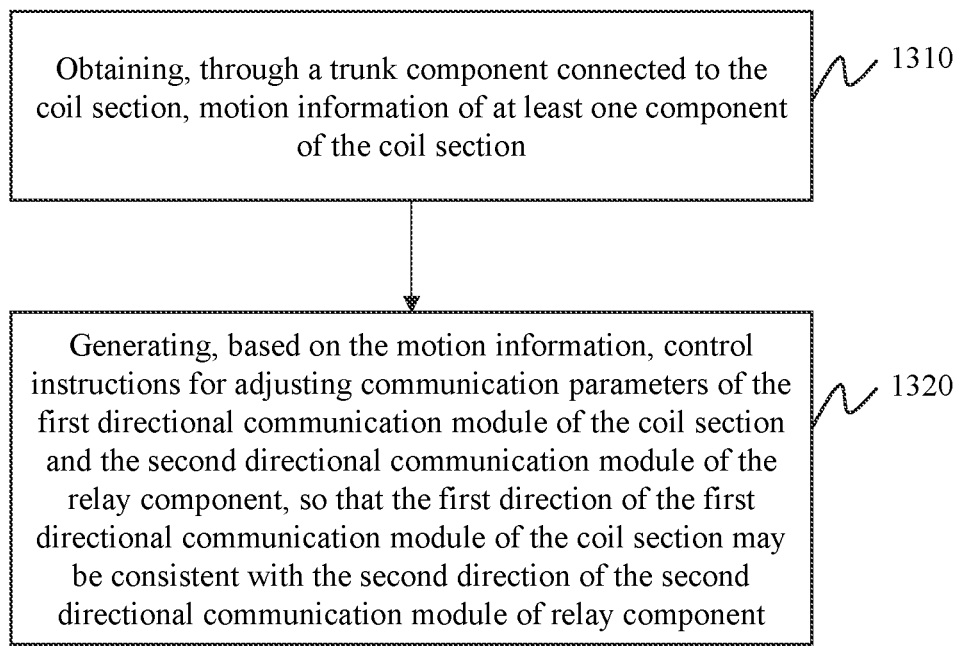
FIG. 13 is a schematic flowchart illustrating an exemplary process for generating control instructions for adjusting communication parameters of a first directional communication module of a coil section and a second directional communication module of a relay component operably connected to the coil section according to some embodiments of the present disclosure.

FIG. 13 is a schematic flowchart illustrating an exemplary process for generating control instructions for adjusting communication parameters of a first directional communication module of a coil section and a second directional communication module of a relay component connected to the coil section according to some embodiments of the present disclosure. In some embodiments, process 1300 may be implemented as a set of instructions (e.g., an application) stored in the storage device 130, storage 320, or storage 490. The processing device 120, the processor 210, the processor 310, and/or the processor in the terminal device 1130 may execute the set of instructions, and when executing the instructions, the processing device 120, the processor 210, the processor 310, and/or the processor in the terminal device 1130 may be configured to perform the process 1300. The operations of the illustrated process presented below are intended to be illustrative. In some embodiments, the process 1300 may be accomplished with one or more additional operations not described and/or without one or more of the operations discussed. Additionally, the order of the operations of the process 1300 illustrated in FIG. 13 and described below is not intended to be limiting. For illustration purposes, the process 1300 may be described in connection with the MR apparatus 1100 as illustrated in FIG. 11A.

In 1310, the terminal device 1130 (e.g., the motion information obtaining module 1210) may obtain, through the relay component connected to the coil section, motion information of at least one component of the coil section.

During the imaging process, the subject or a portion thereof may move (e.g., in the form of breaths, body movements, etc.) relative to the MR apparatus 1100. The local coil 1110 covered on or wrapped about the subject may also move relative to the MR apparatus 1100. The first directional communication module may be set on the local coil 1110. Thus, the first direction in which the first directional communication module transmits or receives electromagnetic waves may change. The one or more sensors (e.g., an acceleration sensor, a gyroscope) of the coil section 1111 may detect motion information of the at least one component (e.g., the coil element, the at least one first transceiving module, and/or the first directional communication module) of the coil section 1111. The motion information may include a motion direction, a motion speed, a motion distance, an acceleration, a rotation angle, or the like, or any combination thereof. The motion information may be associated with one or more directions in the 3D space (e.g., an X direction, a Y direction, and/or a Z direction of the coordinate system 1170). In some embodiments, the motion information may be represented as a matrix or a vector. For example, the motion information may be represented as ($\Delta x$, $\Delta y$, $\Delta z$, $\Delta\theta_x$, $\Delta\theta_y$, $\Delta\theta_z$), where $\Delta x$, $\Delta y$, and $\Delta z$ denote motion distances along the X direction, the Y direction, and the Z direction, respectively, with reference to the coordinate system 1170, and $\Delta\theta_x$, $\Delta\theta_y$, and $\Delta\theta_z$ denote rotation angle about the X direction, the Y direction, and the Z direction, respectively, with reference to the coordinate system 1170. The motion information of at least one component of the coil section may be acquired by the one or more sensors in real time.

The terminal device 1130 may be operably connected to the relay component 1120 through the optical fiber 1160. The relay component 1120 may be operably connected to the coil section 1111 through the directional wireless connection between the first directional communication module of the coil section 1111 and the second directional communication module of the relay component 1120. The coil section 1111 (e.g., the at least one first transceiving module) may transmit the motion information detected by the one or more sensors of the coil section 1111 to the relay component 1120 through the directional wireless connection. The relay component 1120 (e.g., the at least one second transceiving module) further transmit the motion information to the terminal device 1130 through the optical fiber 1160.

In 1320, the terminal device 1130 (e.g., the instruction generation module 1220) may generate, based on the motion information, control instructions for adjusting communication parameters of the first directional communication module of the coil section and the second directional communication module of the relay component, so that the first direction of the first directional communication module of the coil section may be consistent with the second direction of the second directional communication module of relay component.

In some embodiments, the communication parameters may include one or more phase parameters, a gain factor, etc. The phase parameters of the first directional communication module of the coil section 1111 and the second directional communication module of the relay component 1120 may be determined based on the motion information of the at least one component of the coil section 1111. The gain factor may be determined based on one or more amplitude adjustment parameters. The one or more amplitude adjustment parameters may include an upper threshold, a lower threshold, a typical value, etc. After the communication parameters of the first directional communication module of the coil section 1111 and the second directional communication module of the relay component 1120 are adjusted, the first direction of the first directional communication module of the coil section 1111 may be consistent with the second direction of the second directional communication module of relay component 1120. In this case, the point-to-point wireless communication between the first directional communication module of the coil section 1111 and the second direction of the second directional communication module of relay component 1120 may be effective and stable.

In some embodiment, the processing device 120 may obtain phase parameters of the second directional communication module of the relay component 1120. The second directional communication module of the relay component 1120 may transmit electromagnetic waves to the first directional communication module of the coil section 1111. The processing device 120 may obtain current motion information of the at least one component of the coil section 1111. The processing device 120 may determine a motion trend of the at least one component of the coil section based on the motion information. In order to adjust the first direction of the first directional communication module of the coil section 1111 to be consistent with the second direction of the second directional communication module of relay component 1120 in real time, the motion trend of the at least one component may be used to adjust phase parameters of the first directional communication module of the coil section 1111 and the second directional communication module of the relay component 1120. The processing device 120 may generate, based on the motion information and the phase parameters of the second directional communication module of the relay component 1120, control instructions for adjusting communication parameters of the first directional communication module of the coil section and the second directional communication module of the relay component.

In some embodiments, a first energy amplitude of electromagnetic waves transmitted from the second directional communication module of the relay component 1120 to the first directional communication module of the coil section 1111 and/or a second energy amplitude of electromagnetic waves transmitted from the first directional communication module of the coil section 1111 to the second directional communication module of the relay component 1120 may be compensated such that the point-to-point wireless communication between the first directional communication module of the coil section 1111 and the second direction of the second directional communication module of relay component 1120 may be effective and stable. In some embodiments, the processing device 120 may obtain a first energy amplitude of the electromagnetic waves transmitted from the second directional communication module of the relay component 1120 to the first directional communication module of the coil section 1111. The processing device 120 may determine a first gain factor of the first energy amplitude based on one or more amplitude adjustment parameters. In some embodiments, the processing device 120 may determine the first gain factor of the first energy amplitude so that a product of the first gain factor and the first energy amplitude (also referred to as compensated first energy amplitude) is between the upper threshold and the lower threshold, and the compensated first energy amplitude may be close to the typical value. The upper threshold and/or the lower threshold may be determined based on actual needs for the first energy amplitude and the second energy amplitude. In some embodiments, the upper threshold and the lower threshold may be empirical values. The typical value may be a mean value of the upper threshold and the lower threshold. In some embodiments, a difference between the compensated first energy amplitude and the typical value may be determined. If the difference between the compensated first energy amplitude and the typical value is below a threshold value, the processing device 120 may determine that the compensated first energy amplitude is close to the typical value.

In some embodiments, the processing device 120 may obtain a second energy amplitude of electromagnetic waves transmitted from the first directional communication module of the coil section 1111 to the second directional communication module of the relay component 1120. The processing device 120 may determine a second gain factor of the second energy amplitude based on the one or more amplitude adjustment parameters. For example, the processing device 120 may determine the second gain factor of the second energy amplitude so that a product of the second gain factor and the second energy amplitude (also referred to as compensated second energy amplitude) may be between the upper threshold and the lower threshold, and the compensated second energy amplitude may be close to the typical value.

Figure 14:
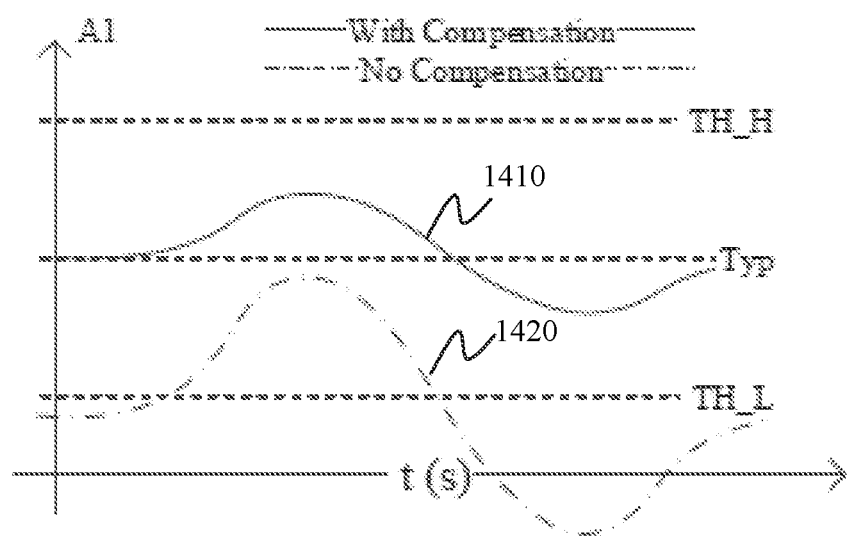
FIG. 14 illustrates an exemplary curve of a compensated first energy amplitude according to some embodiments of the present disclosure.

Merely for illustration, an exemplary curve of a compensated first energy amplitude is illustrated FIG. 14. The compensated first energy amplitude A1 may change with the time t. The compensated first energy amplitude 1410 may be between the upper threshold TH_H and the lower threshold TH_L, and the compensated first energy amplitude 1410 may be close to the typical value Typ. In comparison, the first energy amplitude without compensation 1420 may be out of the range defined by the upper threshold TH_H and the lower threshold TH_L. In addition, the first energy amplitude without compensation 1420 may have a larger variation than the compensated first energy amplitude 1410.

In some embodiments, to initiate the imaging process of the subject, the processing device 120 may generate an initiation control instruction. The initiation control instruction may be generated and performed by the plurality of relay components 1120 and/or the local coil 1110 before the local coil 1110 receives the MR signals from the subject. The initiation control instruction may include directing a second directional communication module of each of the plurality of relay components 1120 to transmit electromagnetic waves in a second direction at a maximum power level to activate at least one of the one or more coil sections 1111. Merely for illustration, a coil section 1111 may include a power supply device. The power supply device may include a power detector, a comparator, a power supply control unit (e.g., a relay), and a power source (e.g., a battery). The power detector may detect a power level of a first directional communication module (e.g., the first phased array receiving antenna and/or the first phased array transmitting antennae) of the coil section 1111. The comparator may determine whether the power level of the first directional communication module exceeds a threshold. The threshold may be an operating power value (e.g., a beam power value of electromagnetic waves received by the first phased array receiving antenna) or power value range of the first directional communication module. The relay may activate a first group of components of the coil section 1111 if the power level of the first directional communication module exceeds the threshold. The first group of components of the coil section 1111 may include components of the coil section 1111 for operating (e.g., imaging). For example, the first group of components may be or include all the components of the coil section 1111. The coil section 1111 may be activated.

The relay may activate a second group of components of the coil section 1111 if the power level of the first directional communication module is below the threshold. The second group of components of the coil section 1111 may include components of the coil section 1111 for determining whether the power level of the first directional communication module exceeds the threshold. For example, the second group of components may be or include the power detector, the comparator, the relay, the first phased array receiving antenna, etc. The coil section 1111 may be hibernating. When the second directional communication module of each of the plurality of relay components 1120 transmits electromagnetic waves in a second direction at a maximum power level of the relay component 1120, the at least one of the one or more coil sections 1111 may be activated.

According to the initiation control instruction, communication parameters of second directional communication modules of at least a part of the plurality of relay components and first directional communication modules of the activated coil sections may be determined according to a beam scanning algorithm. According to the beam scanning algorithm, the processing device 120 may generate control instructions for traversing phase parameters of the second directional communication modules of at least a part of the plurality of relay components and first directional communication modules of the activated coil sections in certain ranges until the second direction of each of the second directional communication modules of at least a part of the plurality of relay components is consistent with the first direction of a corresponding first directional communication module of an activated coil section. In some embodiments, a first energy amplitude of electromagnetic waves transmitted from the second directional communication module of each of the at least a part of the plurality of relay components and/or a second energy amplitude of electromagnetic waves transmitted from the first directional communication module of each of the activated coil sections to the second directional communication module of the relay component 1120 may be compensated. The processing device 120 may transmit the initiation control instruction to each of the plurality of relay components 1120.

It should be noted that the above description is provided for the purposes of illustration, not intended to limit the scope of the present disclosure. For persons having ordinary skills in the art, multiple variations and modifications may be reduced to practice in the light of the present disclosure. However, those variations and modifications do not depart from the scope of the present disclosure. For example, the processing device 120 may obtain phase parameters of the first directional communication module of the coil section 1111. The processing device 120 may obtain current motion information of the at least one component of the coil section 1111. The processing device 120 may determine a motion trend of the at least one component of the coil section based on the motion information. In order to adjust the first direction of the first directional communication module of the coil section 1111 to be consistent with the second direction of the second directional communication module of relay component 1120 in real time, the motion trend of the at least one component may be used to adjust phase parameters of the first directional communication module of the coil section 1111 and the second directional communication module of the relay component 1120. The processing device 120 may generate, based on the motion information and the phase parameters of the first directional communication module of the coil section 1111, control instructions for adjusting communication parameters of the first directional communication module of the coil section and the second directional communication module of the relay component.

Figure 15:
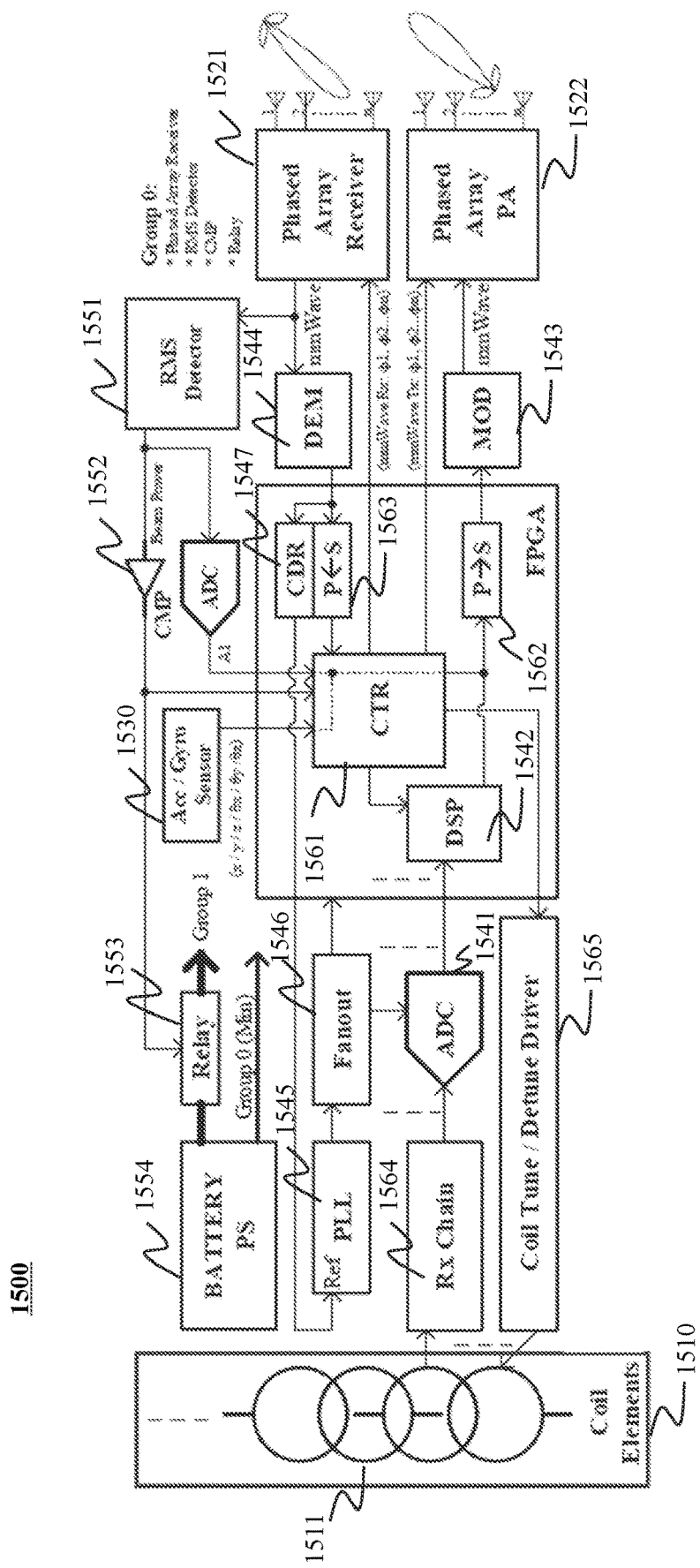
FIG. 15 is a schematic diagram illustrating an exemplary coil section of a local coil of an MR apparatus according to some embodiments of the present disclosure.

FIG. 15 is a schematic diagram illustrating an exemplary coil section of a local coil of an MR apparatus according to some embodiments of the present disclosure. The coil section 1500 may include a coil element 1510. The coil element 1510 may include a plurality of coil units 1511. The coil element 1510 may receive MR signals from a subject. The coil section 1500 may include a first phased array receiver (PARX) 1521 and a first phased array transmitter (PATX) 1522. The first phased array receiver 1521 may be operably connected to a first phased array receiving antenna. The first phased array receiver 1521 may receive data or signals from a relay component connected to the coil section 1500 via the first phased array receiving antenna. The first phased array transmitter 1522 may be operably connected to a first phased array transmitting antennae. The first phased array transmitter 1522 may transmit data or signals to the relay component connected to the coil section 1500 via the first phased array transmitting antenna.

In some embodiments, the first phased array receiving antenna and the first phased array transmitting antennae may be located at different locations (e.g., a distance between the different locations exceeds a first distance threshold) in the coil section 1500. The first phased array receiver 1521 and the first phased array transmitter 1522 may also be located at different locations (e.g., a distance between the different locations exceeds a second distance threshold) in the coil section 1500. In this way, interferences between electromagnetic waves transmitted by the first phased array transmitting antennae and electromagnetic waves received by the first phased array receiving antennae may be reduced or avoided. In some embodiments, the first phased array receiving antenna and the first phased array transmitting antennae may be located in a same region (e.g., a distance between the different locations is below the first distance threshold) in the coil section 1500 or intertwined together. At this time, a frequency of the electromagnetic waves transmitted by the first phased array transmitting antenna (also referred to as first transmitting frequency) may be different from a frequency of electromagnetic waves received by the first phased array receiving antenna (also referred to as first receiving frequency). In some embodiments, a difference between the first transmitting frequency and the first receiving frequency may exceed a frequency threshold. In this way, interferences between electromagnetic waves transmitted by the first phased array transmitting antennae and electromagnetic waves received by the first phased array receiving antennae may be reduced or avoided. In some embodiments, the frequency threshold may be 20 GigaHertz (GHz), 25 GHz, 30 GHz, 35 GHz, 40 GHz etc.

The coil section 1500 may include one or more sensors 1530. The one or more sensors 1530 may detect motion information of at least one component of the coil section 1500. The one or more sensors 1530 may include an acceleration sensor, a gyroscope, etc.

The coil section 1500 may include a first transceiving module. The first transceiving module may transmit to or receive from data or signals the relay component 1120 connected to the coil section 1500. The coil element 1510, the one or more sensors 1530, the first phased array transmitting antenna, and/or the first phased array receiving antenna of the coil section 1500 may be operably connected to the first transceiving module. The first transceiving module may include an analog-to-digital converter (ADC) 1541, a digital signal processor (DSP) 1542, a data modulator (MOD) 1543, a data demodulator (DEM) 1544, and a synchronization unit. The ADC 1541 may convert the MR signals received by the coil element 1510 into digital signals. The DSP 1542 may process the digital signals (e.g., by packing the digital signals with other information). The MOD 1543 may modulate the processed digital signals of a first frequency into modulated signals of a second frequency. The first frequency refers to a frequency of data or signals transmitted between one or more components of the coil section 1111. The first frequency may be a relatively lower frequency or frequency range, for example, 0.5 GigaByte per second (Gbps), 1 Gbps, 1.5 Gbps, 2 Gbps, 1-2 Gbps, or the like, or a combination thereof. The second frequency refers to a frequency of data or signals transmitted between the coil section 1111 and the relay component 1120. The second frequency may be a relatively higher frequency or frequency range, for example, 40 Gbps, 45 Gbps, 50 Gbps, 55 Gbps, 60 Gbps, 40-50 Gbps, 50-60 Gbps, 40-60 Gbps, or the like, or a combination thereof, etc. The DEM 1544 may demodulate the processed digital signals of the second frequency into demodulated signals of the first frequency. The synchronization unit may synchronize phases of the MR signals. As shown in FIG. 15, the synchronization unit may include a phase-locked loop (PLL) 1545, a fanout unit 1546, and a clock synthesizer (CDR) 1547. The clock synthesizer 1547 may obtain or generate a clock signal. The PLL 1545 may be a feedback circuit for modulating phases, amplitudes, and/or frequencies of the MR signals based on the clock signal. The fanout unit 1546 may generate a clock driven signal. The coil section 1500 may include a power supply device. The power supply device may include a power detector 1551, a comparator 1552, a power supply control unit (e.g., a relay 1553), and a battery power supply 1554. The power detector 1551 may detect a power level of a first directional communication module (e.g., the first phased array receiving antenna and/or the first phased array transmitting antennae) of the coil section 1500. The comparator 1552 may determine whether the power level of the first directional communication module exceeds a threshold. The threshold may be an operating power value (e.g., a beam power value of electromagnetic waves received by the first phased array receiving antenna) or power value range of the first directional communication module. The relay 1553 may activate a first group of components (also referred to as Group 1) of the coil section 1500 in response to determining that the power level of the first directional communication module exceeds the threshold. The first group of components of the coil section 1500 may include components of the coil section 1500 for operating (e.g., imaging). For example, the first group of component may be or include all the components of the coil section 1500. The relay 1553 may activate a second group of components (also referred to as Group 2) of the coil section 1500 in response to determining that the power level of the first directional communication module is below the threshold. The second group of components of the coil section 1500 may include components of the coil section 1500 for determining whether the power level of the first directional communication module exceeds the threshold. For example, the second group of component may be or include the power detector 1551, the comparator 1552, the relay 1553, the first phased array receiver 1521, the first phased array receiving antenna, etc. In some embodiments, the coil section 1500 may further include an instruction translation and control module (CTR) 1561, a parallel to serial unit 1562, a serial to parallel unit 1563, a plurality of receiver chains 1564, a coil tune/detune driver 1565, etc. The instruction translation and control module 1561 may process the instructions from a terminal device received through the relay component connected to the coil section 1500. The parallel to serial unit 1562 may convert parallel data into serial data. The serial to parallel unit 1563 may convert serial data into parallel data. A receiver chain 1564 may correspond to a coil unit 1511. Each of the plurality of receiver chains 1564 may be operably connected to a corresponding coil unit 1511, and transmit an MR signal received by the coil unit 1511 to the ADC 1541. The coil tune/detune driver 1565 may generate a driving signal for adjusting frequencies of the coil units 1511.

In some embodiments, the MR signals acquired by the coil element 1510 in the coil section 1500 may be convert into digital signals by the ADC 1541. The digital signals may be processed by the DSP 1542 and processed digital signals may be generated. The processed digital signals, a first energy amplitude (A1) of the electromagnetic waves transmitted from a second directional communication module of the relay component to the first directional communication module of the coil section 1500, a second energy amplitude (A2) of electromagnetic waves transmitted from the first directional communication module of the coil section 1500 to the second directional communication module of the relay component, the motion information, and communication parameters of the first directional communication module (e.g., the first phased array receiving antenna and/or the first phased array transmitting antennae) may be packed. The packed data or signals may be modulated into modulated signals of the second frequency (e.g., frequency corresponding to millimeter waves) by the MOD 1543. The modulated signals may be transmitted to the first phased array transmitter 1522. The first phased array transmitting antennae connected to the first phased array transmitter 1522 may transmit the modulated signals to the relay component connected to the coil section 1500 via millimeter waves.

In some embodiments, the first phased array receiver 1521 may receive data or signals form millimeter waves received by the first phased array receiving antenna. The received signals may be demodulated into demodulated signals of the first frequency by the DEM 1544. The demodulated signals may be converted into serial signals. The serial signals may be translated by the CTR 1561 to extract control instructions and parameters, such as, a scanning location, a tuning/detuning control position, a frequency, a phase, a second energy amplitude, etc. The coil tune/detune driver 1565 may generate a driving signal for the coil units 1511 in the coil section 1500 based on the tuning/detuning control position. The demodulated signals may be extracted to obtain a clock signal by the CDR 1547. The clock signal may be transmitted to the PLL 1545, which may be determined as a reference clock to maintain a phase difference.

Figure 16:
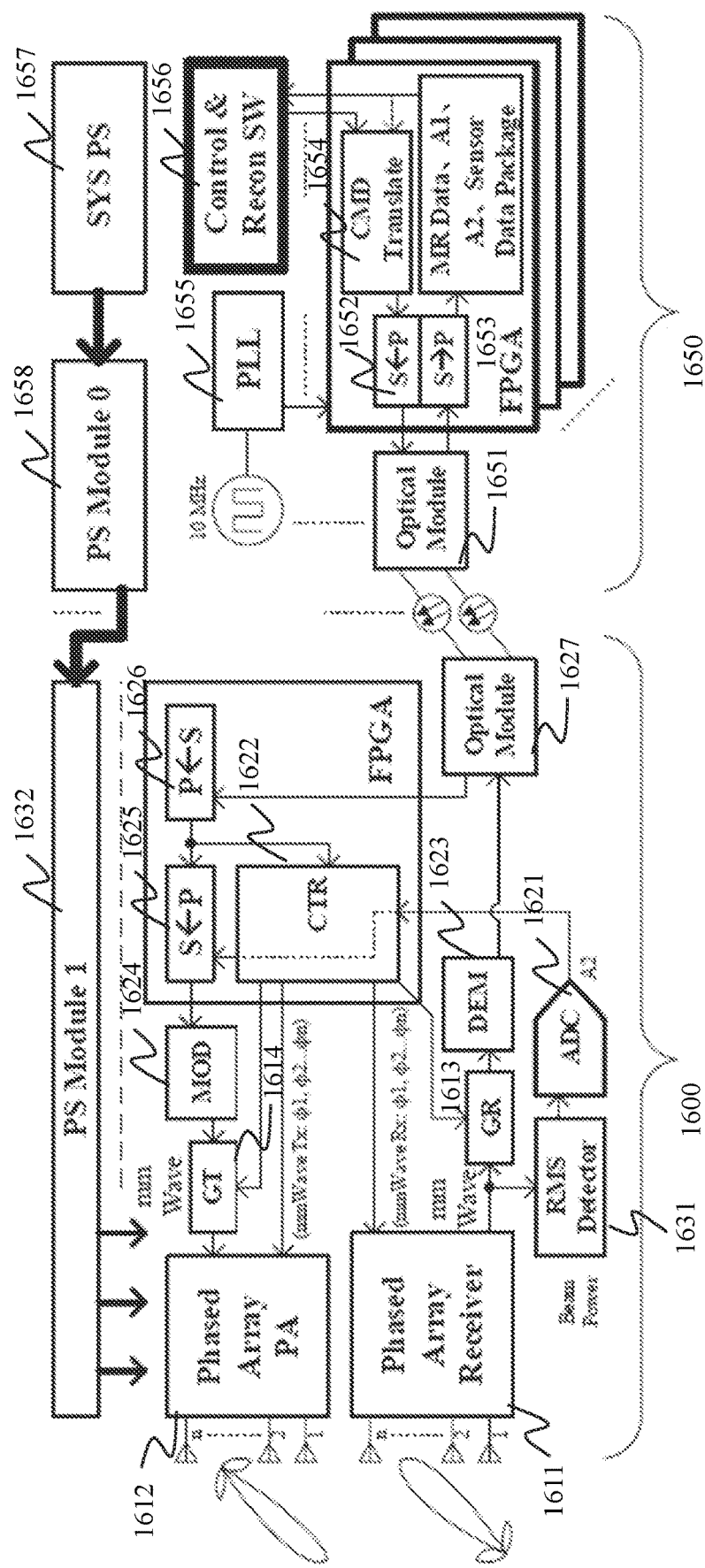
FIG. 16 is a schematic diagram illustrating an exemplary relay component and an exemplary terminal device according to some embodiments of the present disclosure.

FIG. 16 is a schematic diagram illustrating an exemplary relay component 1600 and an exemplary terminal device 1650 according to some embodiments of the present disclosure. The relay component 1600 may include a second phased array receiver 1611 and a second phased array transmitter 1612.

The second phased array receiver 1611 may be operably connected to a second phased array receiving antenna. The second phased array receiver 1611 may receive data or signals from a coil section connected to the relay component 1600 via the second phased array receiving antenna. The second phased array transmitter 1612 may be operably connected to a second phased array transmitting antennae. The second phased array transmitter 1612 may transmit data or signals to the coil section connected to the relay component 1600 via the second phased array transmitting antenna.

In some embodiments, the second phased array receiving antenna and the second phased array transmitting antennae may be located at different locations (e.g., a distance between the different locations exceeds a third distance threshold) in the relay component 1600. The second phased array receiver 1611 and the second phased array transmitter 1612 may also be located at different locations (e.g., a distance between the different locations exceeds a fourth distance threshold) in the relay component 1600. In this way, interferences between electromagnetic waves transmitted by the second phased array transmitting antennae and electromagnetic waves received by the second phased array receiving antennae may be reduced or avoided. In some embodiments, the second phased array receiving antenna and the second phased array transmitting antennae may be located in a same region (e.g., a distance between the different locations is below the third distance threshold) in the relay component 1600 or intertwined together. At this time, a frequency of the electromagnetic waves transmitted by the second phased array transmitting antenna (also referred to as second transmitting frequency) may be different from a frequency of electromagnetic waves received by the second phased array receiving antenna (also referred to as second receiving frequency). In some embodiments, a difference between the second transmitting frequency and the second receiving frequency may exceed a frequency threshold. In this way, interferences between electromagnetic waves transmitted by the second phased array transmitting antennae and electromagnetic waves received by the second phased array receiving antennae may be reduced or avoided. In some embodiments, the frequency threshold may be 20 GigaHertz (GHz), 25 GHz, 30 GHz, 35 GHz, 40 GHz etc.

A gain factor receiver 1613 may be connected to the phased array receiver 1611. The gain factor receiver 1613 may adjust the second energy amplitude of electromagnetic waves transmitted from a first directional communication module of the coil section to the second directional communication module of the relay component 1600. A gain factor transmitter 1614 may be connected to the phased array transmitter 1612. The gain factor transmitter 1614 may adjust the first energy amplitude of the electromagnetic waves transmitted from the second directional communication module of the relay component 1600 to the first directional communication module of the coil section. The gain factor receiver 1613 and/or the gain factor transmitter 1614 may be an amplifier, an attenuator, etc. The relay component 1600 may include an ADC 1621. The ADC 1621 may convert the MR signals into digital signals. The relay component 1600 may also include an instruction translation and control module 1622 may process instructions and/or parameters received from the coil section or the terminal device 1650. The relay component 1600 may further include a data demodulator (DEM) 1623 and a data modulator (MOD) 1624. The DEM 1623 may demodulate digital signals of a second frequency into demodulated signals of a first frequency. The MOD unit 1624 may be configured to modulate digital signals of the first frequency into modulated signals of the second frequency. The first frequency may be a relatively lower frequency or frequency range, for example, 0.5 GigaByte per second (Gbps), 1 Gbps, 1.5 Gbps, 2 Gbps, 1-2 Gbps, or the like, or a combination thereof. The second frequency refers to a frequency of data or signals transmitted between the coil section 1111 and the relay component 1120. The second frequency may be a relatively higher frequency or frequency range, for example, 40 Gbps, 45 Gbps, 50 Gbps, 55 Gbps, 60 Gbps, 40-50 Gbps, 50-60 Gbps, 40-60 Gbps, or the like, or a combination thereof, etc.

The relay component 1600 may also include a parallel to serial unit 1625, and a serial to parallel unit 1626. The parallel to serial unit 1625 may convert parallel data into serial data. The serial to parallel unit 1626 may convert serial data into parallel data.

The relay component 1600 may also include an optical module 1627. The optical module 1627 may receive data or signals from the terminal device 1650 or transmit data or signals to the terminal device 1650 in the form of optical signals. In some embodiments, the instruction translation and control module 1622, the parallel to serial unit 1625, and the serial to parallel unit 1626 may be integrated into a programmable logic module.

The relay component 1600 may further include a power supply device. The power supply device may include a power detector 1631 and a power supply module 1632. The power detector 1631 may be configured to detect a power level of the second directional communication module of the relay component 1600. The power supply module 1632 may supply power to the relay component 1600 based on the detected power level of the second directional communication module of the relay component 1600.

The terminal device 1650 may include a plurality of optical modules 1651. Each of the plurality of optical modules 1651 may receive the signals from a relay component 1600 or transmit the signals to a relay component 1600 in the form of optical signals. The terminal device 1650 may also include a parallel to serial unit 1652 and a serial to parallel unit 1653. The parallel to serial unit 1652 may convert parallel data into serial data. The serial to parallel unit 1653 may convert serial data into parallel data. The terminal device 1650 may also include an instruction translation module 1654. In some embodiments, the parallel to serial unit 1652, the serial to parallel unit 1653, and the instruction translation module 1654 may be integrated into a programmable logic module. In some embodiments, the terminal device 1650 may include a plurality of programmable logic modules. Each of the plurality of programmable logic modules may correspond to a relay component 1600. The terminal device 1650 may include a phase-locked loop (PLL) 1655. The PLL 1655 may be a feedback circuit for modulating phases, amplitudes, and/or frequencies of the MR signals based on a clock signal. The terminal device 1650 may also include a control and reconstruction unit 1656. The control and reconstruction unit 1656 may generate control instructions and reconstruct an MR image of a subject based on received MR signals. The terminal device 1650 may include a power supply device. The power supply device may include a system power supply module 1657 and a power supply module 1658. The power supply module 1658 may supply power to the terminal device 1650. The power supply module 1658 may be connected to a plurality of power supply modules 1632 and supply power to the plurality of power supply modules 1632.

In some embodiments, the control and reconstruction unit 1656 may transmit control instructions and/or parameters to the instruction translation module 1654. After the control instructions and/or parameters are translated, the translated control instructions and/or parameters may be transmitted to the parallel to serial unit 1652 to obtain serial digital signals. The serial digital signals may be transmitted to the optical module 1651, which is operably connected to the optical module 1627 of the relay component 1600. The optical module 1651 may convert the serial digital signals into optical signals and transmit the optical signals to the optical module 1627. The optical module 1627 may convert the received optical signals into serial digital signals. The serial to parallel unit 1626 may convert the serial digital signals into parallel digital signals. A portion of the parallel digital signals may enter the instruction translation and control module 1622 and be translated to phase parameters and a gain factor. Another portion of the parallel digital signals may enter the parallel to serial unit 1625 and be packaged together with a first energy amplitude of the electromagnetic waves transmitted from the second directional communication module of the relay component 1600 to the first directional communication module of the coil section. The packaged signals may be modulated into modulated signals of the second frequency by the MOD unit 1624. The modulated signals may be further adjusted by the gain factor transmitter 1614. The adjusted signals may be transmitted to a corresponding coil section by the phased array transmitter 1612 via the millimeter waves.

In some embodiments, a portion of data or signals received from a coil section may enter a power detector 1631 of the relay component 1600, and a power level may be obtained. The power level may be translated to obtain a second energy amplitude of electromagnetic waves transmitted from the first directional communication module of the coil section to the second directional communication module of the relay component 1600 by the ADC 1621. Another portion of the data or signals may be processed by the gain factor receiver 1613. The processed data or signals may be demodulated into demodulated signals of a first frequency by the DEM 1623. The demodulated signals may enter the optical module 1627 in the relay component 1600 and be converted into optical signals. The optical signals may include MR signals from the coil section, motion information, the first energy amplitude of the electromagnetic waves transmitted from the second directional communication module of the relay component 1600 to the first directional communication module of the coil section, the second energy amplitude of electromagnetic waves transmitted from the first directional communication module of the coil section to the second directional communication module of the relay component 1600. Then the optical signals may be transmitted to the terminal device 1650 for further processing.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "module," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method implemented on a computing device having a processor and a computer-readable storage device for operating a magnetic resonance (MR) apparatus in a scanning state and a non-scanning state, the method comprising:
obtaining an operating state of the MR apparatus,; and
selecting, from power supply devices, a power supply device for supplying power for at least one coil of the MR apparatus according to the obtained operating state of the MR apparatus, wherein the power supply devices include at least a battery, a wireless charging device, and a wired power source;

in response to determining that the operating state of the MR apparatus is the scanning state, disabling the wireless charging device and determining the battery as the selected power supply device for supplying the power for the at least one coil of the MR apparatus; and in response to determining that the operating state of the MR apparatus is the non-scanning state, determining the wireless charging device or the wired power source as the selected power supply device for supplying the power for the at least one coil of the MR apparatus.

2. The method of claim 1, wherein after the battery is determined as the selected power supply device, the method further includes:

generating an instruction for causing the battery to supply the power for the at least one coil of the MR apparatus.

3. The method of claim 1, wherein after the wireless charging device or the wired power source is determined as the selected power supply device, the method further includes:

generating an instruction for causing the wireless charging device or the wired power source to supply power for the at least one coil of the MR apparatus.

4. The method of claim 3, wherein the instruction further includes causing the wireless charging device or the wired power source to charge the battery.

5. The method of claim 1, wherein the obtaining an operating state of an MR apparatus includes:

obtaining scanning information of the MR apparatus; and
determining the operating state of the MR apparatus based on the scanning information.

6. The method of claim 5, wherein the scanning information includes scanning location information and scanning sequence information.

7. The method of claim 6, wherein the wireless charging device includes a plurality of power transmitting modules, and the method further includes:
determining a scanning location of the MR apparatus;
determining a coil of the MR apparatus corresponding to the scanning location from the at least one coil of the MR apparatus based on the scanning location information;
determining the power receiving module of the MR apparatus operably connected to the coil; and
identifying, from the plurality of power transmitting modules, a power transmitting module of the wireless charging device for transmitting power to the power receiving module operably connected to the coil.

8. The method of claim 7, wherein the identifying, from the plurality of power transmitting modules, a power transmitting module of the wireless charging device for transmitting power to the power receiving module operably connected to the coil includes:

obtaining a location of the power receiving module operably connected to the coil;
determining the distance between the location of the power receiving module and a location of each of the plurality of power transmitting modules of the wireless charging device; and
identifying, from the plurality of power transmitting modules, the power transmitting module for transmitting the power to the power receiving module operably connected to the coil, the identified power transmitting module corresponding to the smallest distance among the plurality of power transmitting modules.

9. The method of claim 1, wherein the wireless charging device includes a plurality of power transmitting modules, and the method further comprises:

determining a power receiving module of the MR apparatus operably connected to the at least one coil; and
identifying, from the plurality of power transmitting modules, a power transmitting module operably connected to the coil, the identified power transmitting module corresponding to a smallest distance among distances each of which is between one of the plurality of power transmitting modules and the power receiving module.

10. The method of claim 8, further comprises:

determining whether a count of the power transmitting module corresponding to the smallest distance equals to 1;
in response to determining that there are two or more power transmitting modules corresponding to the smallest distance, obtaining coil model information of the two or more power transmitting modules and the power receiving module, the coil model information of each of the two or more power transmitting modules and the power receiving module including at least one of a model number, a manufacturer, a device type, or a count or types of one or more components arranged in each of the two or more power transmitting modules and the power receiving module;
determining a model matching degree between each of the two or more power transmitting modules and the power receiving module based on the coil model information of the two or more power transmitting modules and the power receiving module; and
determining a power transmitting module among the two or more power transmitting modules corresponding to a largest model matching degree as the identified power transmitting module for transmitting the power to the power receiving module.

11. The method of claim 10, wherein the model matching degree between each of the two or more power transmitting modules and the power receiving module is determined according to a preset model matching degree algorithm, wherein the preset model matching degree algorithm includes:

for each item in the coil model information of the power transmitting module and the power receiving module, assigning the item with a weight; and
in response to determining that the item of the power transmitting module and the item of the power receiving module is the same, counting the weight corresponding to the item into the model matching degree between the power transmitting module and the power receiving module.

12. The method of claim 9, further comprises:

determining whether a count of the power transmitting module corresponding to the smallest distance equals to 1;
in response to determining that there are two or more power transmitting modules corresponding to the smallest distance, obtaining coil model information of the two or more power transmitting modules and the power receiving module, the coil model information of each of the two or more power transmitting modules and the power receiving module including at least one of a model number, a manufacturer, a device type, or a count or types of one or more components arranged in each of the two or more power transmitting modules and the power receiving module;

determining a model matching degree between each of the two or more power transmitting modules and the power receiving module based on the coil model information of the two or more power transmitting modules and the power receiving module; and determining a power transmitting module among the two or more power transmitting modules corresponding to a largest model matching degree as the identified power transmitting module for transmitting the power to the power receiving module.

13. The method of claim 12, wherein the model matching degree between each of the two or more power transmitting modules and the power receiving module is determined according to a preset model matching degree algorithm, wherein the preset model matching degree algorithm includes:

for each item in the coil model information of the power transmitting module and the power receiving module, assigning the item with a weight; and in response to determining that the item of the power transmitting module and the item of the power receiving module is the same, counting the weight corresponding to the item into the model matching degree between the power transmitting module and the power receiving module.

* * * * *